United States Patent
Bennett et al.

(10) Patent No.: US 8,922,545 B2
(45) Date of Patent: Dec. 30, 2014

(54) THREE-DIMENSIONAL DISPLAY SYSTEM WITH ADAPTATION BASED ON VIEWING REFERENCE OF VIEWER(S)

(75) Inventors: James D. Bennett, Hroznetin (CZ); Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 859 days.

(21) Appl. No.: 12/982,069

(22) Filed: Dec. 30, 2010

(65) Prior Publication Data

US 2011/0157168 A1  Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*G06T 15/00* (2011.01)
*H04N 13/00* (2006.01)
(Continued)

(52) U.S. Cl.
CPC ....... *H04N 13/0497* (2013.01); *H04N 13/0059* (2013.01); *H04N 13/0411* (2013.01);
(Continued)

(58) Field of Classification Search
CPC ...... G06F 3/14; H04N 13/0413; H04N 13/00; H04N 13/0048; G09G 3/20; G09G 5/003; G09G 5/14; G09G 2300/023; G09G 2370/04

USPC .............. 345/6, 418, 419; 349/15; 359/626; 362/97.1

See application file for complete search history.

(56) References Cited

U.S. PATENT DOCUMENTS

| 4,829,365 A | 5/1989 | Eichenlaub |
| 5,615,046 A | 3/1997 | Gilchrist |

(Continued)

FOREIGN PATENT DOCUMENTS

| EP | 0833183 A1 | 4/1998 |
| EP | 1662808 A1 | 5/2006 |

(Continued)

OTHER PUBLICATIONS

Fono et al, EyeWindows: Evaluation of Eye-Controlled Zooming Windows for Focus Selection, Apr. 2005, pp. 151-160.*

(Continued)

*Primary Examiner* — Phu K Nguyen
(74) *Attorney, Agent, or Firm* — Fiala & Weaver P.L.L.C.

(57) ABSTRACT

A display system that presents three-dimensional content to a viewer is described herein. The display system includes a screen assembly having one or more adaptable display characteristics relating to the presentation of three-dimensional content, first circuitry that at least assists in producing reference information corresponding to at least one aspect of a viewing reference of the viewer, and second circuitry that causes modification of at least one of the one or more adaptable display characteristics, the modification corresponding at least in part to the reference information. The viewing reference of the viewer may comprise one or more of a location of the viewer relative to the screen assembly, a head orientation (tilt and/or rotation) of the viewer, and a point of gaze of the viewer. The first circuitry may comprise, for example, viewer-located circuitry and/or other circuitry that is communicatively connected to the second circuitry for providing the referencing information thereto.

11 Claims, 31 Drawing Sheets

(51) Int. Cl.
*H04N 13/04* (2006.01)
*G09G 3/20* (2006.01)
*H04N 21/435* (2011.01)
*H04N 21/235* (2011.01)
*H04N 21/41* (2011.01)
*G09G 3/00* (2006.01)
*G06F 3/14* (2006.01)
*G03B 35/24* (2006.01)
*G09G 5/14* (2006.01)
*G09G 5/00* (2006.01)

(52) U.S. Cl.
CPC ...... *H04N 13/0468* (2013.01); *H04N 13/0454* (2013.01); *G09G 3/20* (2013.01); *H04N 21/435* (2013.01); *H04N 13/0029* (2013.01); *H04N 13/0409* (2013.01); *H04N 21/235* (2013.01); *G09G 2370/04* (2013.01); *H04N 21/4122* (2013.01); *H04N 13/0048* (2013.01); *G09G 5/14* (2013.01); *G09G 3/003* (2013.01); *H04N 13/0404* (2013.01); *G06F 3/14* (2013.01); *G09G 2300/023* (2013.01); *H04N 2013/0463* (2013.01); *H04N 2013/0465* (2013.01); *H04N 13/0447* (2013.01); *G03B 35/24* (2013.01); *H04N 13/0055* (2013.01); *H04N 13/0456* (2013.01); *G09G 5/003* (2013.01); *G09G 2320/028* (2013.01); *H04N 13/0413* (2013.01)
USPC ................. 345/419; 345/6; 345/418; 349/15; 359/626; 362/97.1

(56) References Cited

U.S. PATENT DOCUMENTS

| | | | |
|---|---|---|---|
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A | 4/2000 | Hamagishi | |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,697,687 B1 | 2/2004 | Kasahara et al. | |
| 6,710,920 B1 | 3/2004 | Mashitani et al. | |
| 6,909,555 B2* | 6/2005 | Wohlstadter | 359/626 |
| 7,030,903 B2 | 4/2006 | Sudo | |
| 7,038,698 B1 | 5/2006 | Palm et al. | |
| 7,091,471 B2 | 8/2006 | Wenstrand et al. | |
| 7,123,213 B2 | 10/2006 | Yamazaki et al. | |
| 7,190,518 B1 | 3/2007 | Kleinberger et al. | |
| 7,359,105 B2 | 4/2008 | Jacobs et al. | |
| 7,440,193 B2 | 10/2008 | Gunasekaran et al. | |
| 7,511,774 B2 | 3/2009 | Lee et al. | |
| 7,626,644 B2* | 12/2009 | Shestak et al. | 349/15 |
| 7,646,451 B2 | 1/2010 | Vogel et al. | |
| 7,692,859 B2 | 4/2010 | Redert et al. | |
| 7,885,079 B2 | 2/2011 | Chen et al. | |
| 7,911,442 B2 | 3/2011 | Wang et al. | |
| 7,924,456 B1 | 4/2011 | Kahn et al. | |
| 7,954,967 B2* | 6/2011 | Kashiwagi et al. | 362/97.1 |
| 7,997,783 B2 | 8/2011 | Song et al. | |
| 8,040,952 B2 | 10/2011 | Park et al. | |
| 8,044,983 B2 | 10/2011 | Nonaka et al. | |
| 8,049,710 B2 | 11/2011 | Shestak et al. | |
| 8,072,411 B2 | 12/2011 | Chen et al. | |
| 8,139,024 B2 | 3/2012 | Daiku | |
| 8,154,686 B2 | 4/2012 | Mather et al. | |
| 8,154,799 B2 | 4/2012 | Kim et al. | |
| 8,174,564 B2 | 5/2012 | Kim et al. | |
| 8,183,788 B2 | 5/2012 | Ma | |
| 8,209,396 B1 | 6/2012 | Raman et al. | |
| 8,233,034 B2 | 7/2012 | Sharp et al. | |
| 8,284,119 B2* | 10/2012 | Kim et al. | 345/6 |
| 8,310,527 B2 | 11/2012 | Ko et al. | |
| 8,334,933 B2 | 12/2012 | Tsukada et al. | |
| 8,363,928 B1 | 1/2013 | Sharp | |
| 8,368,745 B2 | 2/2013 | Nam et al. | |
| 8,384,774 B2 | 2/2013 | Gallagher | |
| 8,400,392 B2 | 3/2013 | Kimura et al. | |
| 8,411,746 B2 | 4/2013 | Chen et al. | |
| 8,438,601 B2 | 5/2013 | Putterman et al. | |
| 8,441,430 B2 | 5/2013 | Lee | |
| 8,466,869 B2 | 6/2013 | Kobayashi et al. | |
| 8,482,512 B2 | 7/2013 | Adachi et al. | |
| 8,487,863 B2 | 7/2013 | Park et al. | |
| 8,525,942 B2 | 9/2013 | Robinson et al. | |
| 8,587,642 B2 | 11/2013 | Shestak et al. | |
| 8,587,736 B2 | 11/2013 | Kang | |
| 8,605,136 B2 | 12/2013 | Yu et al. | |
| 8,687,042 B2 | 4/2014 | Karaoguz et al. | |
| 8,766,905 B2 | 7/2014 | Adachi | |
| 8,823,782 B2 | 9/2014 | Karaoguz et al. | |
| 8,854,531 B2 | 10/2014 | Karaoguz et al. | |
| 2002/0010798 A1 | 1/2002 | Ben-Shaul et al. | |
| 2002/0037037 A1 | 3/2002 | Van Der Schaar | |
| 2002/0167862 A1 | 11/2002 | Tomasi et al. | |
| 2002/0171666 A1 | 11/2002 | Endo et al. | |
| 2003/0012425 A1 | 1/2003 | Suzuki et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |
| 2004/0252187 A1 | 12/2004 | Alden | |
| 2005/0073472 A1 | 4/2005 | Kim et al. | |
| 2005/0128353 A1 | 6/2005 | Young et al. | |
| 2005/0237487 A1 | 10/2005 | Chang | |
| 2005/0248561 A1 | 11/2005 | Ito et al. | |
| 2005/0259147 A1 | 11/2005 | Nam et al. | |
| 2006/0050785 A1 | 3/2006 | Watanabe et al. | |
| 2006/0087556 A1 | 4/2006 | Era | |
| 2006/0109242 A1 | 5/2006 | Simpkins | |
| 2006/0139448 A1 | 6/2006 | Ha et al. | |
| 2006/0139490 A1 | 6/2006 | Fekkes et al. | |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0271791 A1 | 11/2006 | Novack et al. | |
| 2007/0002041 A1 | 1/2007 | Kim et al. | |
| 2007/0008406 A1 | 1/2007 | Shestak et al. | |
| 2007/0008620 A1 | 1/2007 | Shestak et al. | |
| 2007/0052807 A1 | 3/2007 | Zhou et al. | |
| 2007/0072674 A1 | 3/2007 | Ohta et al. | |
| 2007/0085814 A1 | 4/2007 | Ijzerman et al. | |
| 2007/0096125 A1 | 5/2007 | Vogel et al. | |
| 2007/0097103 A1 | 5/2007 | Yoshioka et al. | |
| 2007/0097208 A1 | 5/2007 | Takemoto et al. | |
| 2007/0139371 A1 | 6/2007 | Harsham et al. | |
| 2007/0146267 A1 | 6/2007 | Jang et al. | |
| 2007/0147827 A1 | 6/2007 | Sheynman et al. | |
| 2007/0153916 A1 | 7/2007 | Demircin et al. | |
| 2007/0162392 A1 | 7/2007 | McEnroe et al. | |
| 2007/0258140 A1 | 11/2007 | Shestak et al. | |
| 2007/0270218 A1 | 11/2007 | Yoshida et al. | |
| 2007/0296874 A1 | 12/2007 | Yoshimoto et al. | |
| 2008/0025390 A1 | 1/2008 | Shi et al. | |
| 2008/0037120 A1 | 2/2008 | Koo et al. | |
| 2008/0043096 A1 | 2/2008 | Vetro et al. | |
| 2008/0043644 A1 | 2/2008 | Barkley et al. | |
| 2008/0068329 A1 | 3/2008 | Shestak et al. | |
| 2008/0126557 A1 | 5/2008 | Motoyama et al. | |
| 2008/0133122 A1 | 6/2008 | Mashitani et al. | |
| 2008/0150853 A1 | 6/2008 | Peng et al. | |
| 2008/0165176 A1 | 7/2008 | Archer et al. | |

(56) References Cited

U.S. PATENT DOCUMENTS

| | | |
|---|---|---|
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ideda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157167 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |

FOREIGN PATENT DOCUMENTS

| | | |
|---|---|---|
| EP | 1816510 A1 | 8/2007 |
| EP | 1993294 A2 | 11/2008 |
| WO | 2005/045488 A1 | 5/2005 |
| WO | 2007/024118 A1 | 3/2007 |
| WO | 2008126557 A1 | 10/2008 |
| WO | 2009/098622 A2 | 8/2009 |

OTHER PUBLICATIONS

Kuma et al, EyePoint: Practical Pointing and Selection Using Gaze and Keyboard, Apr. 2007, pp. 1-10.*
Ruddarraju et al, Perceptual User Interfaces using Vision-based Eye Tracking, ICMI, Nov. 2003, pp. 1-7.*
Ko et al, Facial Feature Tracking and Head Orientation-based Gaze Tracking, ETRI, 2000, pp. 1-4.*
"How browsers work", retrieved from <http://taligarsiel.com/Projects/howbrowserswork1.htm> on Oct. 21, 2010, 54 pages.
IEEE 100 The Authoritative Dictionary of IEEE Standards Terms Seventh Edition, entry for "engine", IEEE 100-2000, 2000, pp. 349-411.
IEEE 100 The Authoritative Dictionary of IEEE Standards Terms Seventh Edition, entry for "Web page", IEEE 100-2000, 2000, pp. 1269-1287.
Wikipedia entry on "Scripting language", available online at <http://en.wikipedia.org/wiki/Scripting_language>, retrieved on Aug. 16, 2012, 4 pages.
Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.
Peterka, Thomas, "Dynallax: Dynamic Parallax Barrier Autostereoscopic Display", Ph.D. Dissertation, University of Illinois at Chicago, 2007, 134 pages.
Yanagisawa et al., "A Focus Distance Controlled 3D TV", Proc. SPIE 3012, Stereoscopic Displays and Virtual Reality Systems IV, May 15, 1997, pp. 256-261.
EPO Communication received for European Patent Application No. 10016055.5, dated Apr. 5, 2013, 6 pages.
European search Report received for European Patent application No. 10016055.5, mailed on Apr. 12, 2011, 3 pages.
European Search Report received for European Patent application No. 10015984.7, mailed on May 3, 2011, 3 pages.
Yanaka, Kazuhisa "Stereoscopic Display Technique for Web3D Images", SIGGRAPH 2009, New Orleans, Louisiana, Aug. 3-7, 2009, 1 page.
Liao, et al., "The Design and Application of High-Resolution 3D Stereoscopic graphics Display on PC", Purdue University School of Science, 2000, pp. 1-7.
"Displaying Stereoscopic 3D (S3D) with Intel HD Graphics Processors for Software Developers", Intel, Aug. 2011, pp. 1-10.
Office Action received for Chinese Patent Application No. 201010619649.3, mailed on Oct. 11, 2014, 5 pages.

* cited by examiner

THREE-DIMENSIONAL DISPLAY SYSTEM WITH ADAPTATION BASED ON VIEWING REFERENCE OF VIEWER(S)

CROSS-REFERENCE TO RELATED APPLICATIONS

This application claims the benefit of U.S. Provisional Patent Application No. 61/291,818, filed on Dec. 31, 2009, and U.S. Provisional Patent Application No. 61/303,119, filed on Feb. 10, 2010. The entirety of each of these applications is incorporated by reference herein.

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/774,225, filed on May 5, 2010 and entitled "Controlling a Pixel Array to Support an Adaptable Light Manipulator";

U.S. patent application Ser. No. 12/774,307, filed on May 5, 2010 and entitled "Display with Elastic Light Manipulator";

U.S. patent application Ser. No. 12/845,409, filed on Jul. 28, 2010, and entitled "Display with Adaptable Parallax Barrier";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/845,461, filed on Jul. 28, 2010, and entitled "Display Supporting Multiple Simultaneous 3D Views";

U.S. patent application Ser. No. 12/982,020, filed on even date herewith and entitled "Backlighting Array Supporting Adaptable Parallax Barrier"; and U.S. patent application Ser. No. 12/982,031, filed on even date herewith and entitled "Coordinated Driving of Adaptable Light Manipulator, Backlighting and Pixel Array in Support of Adaptable 2D and 3D Displays."

BACKGROUND OF THE INVENTION

1. Field of the Invention

The present invention generally relates to displays systems that enable viewers to view images in three dimensions.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device of this type may be switched to a three-dimensional mode for viewing of three-dimensional images, and may be switched to a two-dimensional mode for viewing of two-dimensional images (and/or to provide a respite from the viewing of three-dimensional images).

A parallax barrier is another example of a device that enables images to be displayed in three-dimensions. A parallax barrier includes a layer of material with a series of precision slits. The parallax barrier is placed proximal to a display so that a user's eyes each see a different set of pixels to create a sense of depth through parallax. A disadvantage of parallax barriers is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional displays that utilize parallax barriers are also constrained in that the displays must be entirely in a two-dimensional image mode or a three-dimensional image mode at any time.

BRIEF SUMMARY OF THE INVENTION

A display system that presents three-dimensional content to a viewer is described herein. The display system includes a screen assembly having one or more adaptable display characteristics relating to the presentation of three-dimensional content, first circuitry that at least assists in producing reference information corresponding to at least one aspect of a viewing reference of the viewer, and second circuitry that causes modification of at least one of the one or more adaptable display characteristics, the modification corresponding at least in part to the reference information. The viewing reference of the viewer may comprise, for example, one or more of a location of the viewer relative to the screen assembly, a head orientation (tilt and/or rotation) of the viewer, and a point of gaze of the viewer. The first circuitry may comprise, for example, viewer-located circuitry and/or other circuitry that is communicatively connected to the second circuitry for providing the referencing information thereto. The display system, first circuitry, second circuitry and methods of operating the same are substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 3:
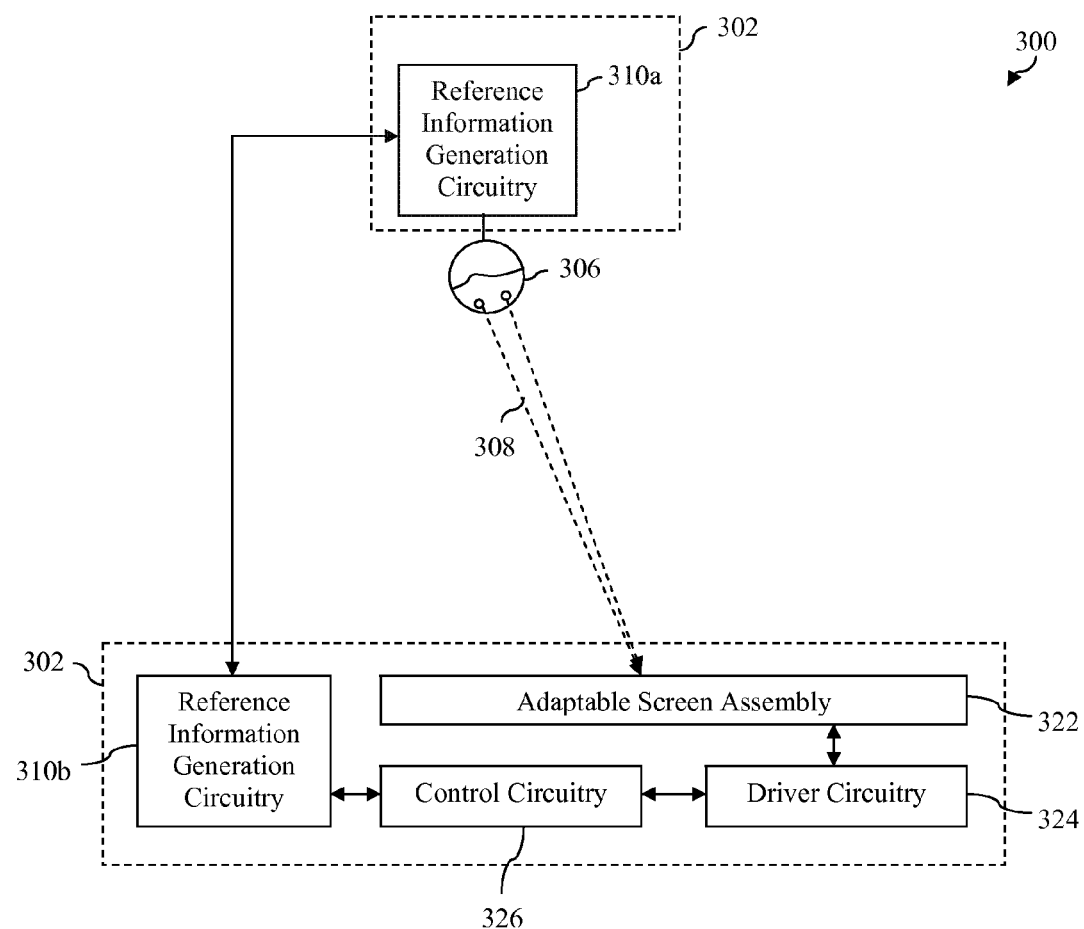

FIG. 3 is a block diagram of a display system in accordance with an embodiment that presents three-dimensional content to a viewer having a viewing reference, the display system including circuitry for generating reference information corresponding to the viewing reference and a screen assembly having at least one adaptable display characteristic that is modified based on at least one aspect of the viewing reference.

Figure 4:
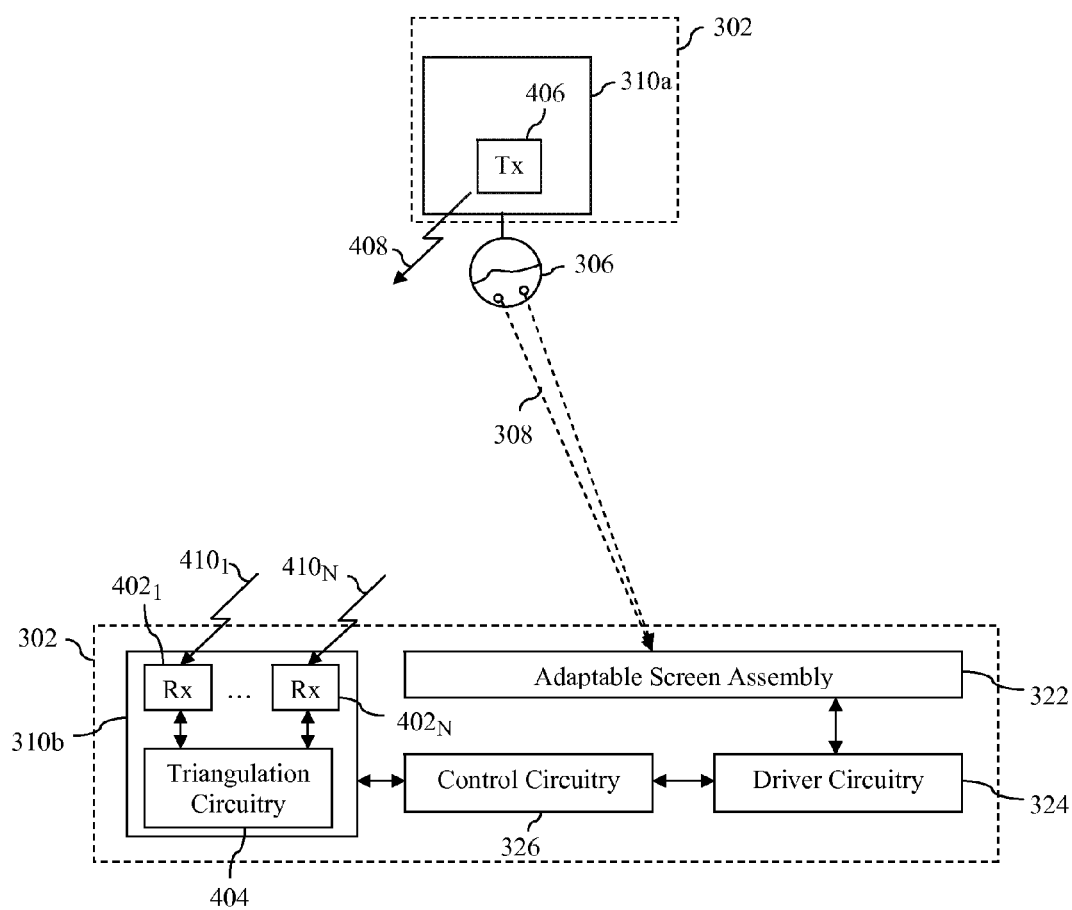

FIG. 4 is a block diagram of a display system in accordance with a first embodiment that includes reference information generation circuitry that implements a triangulation technique to determine an estimated location of a viewer.

Figure 5:
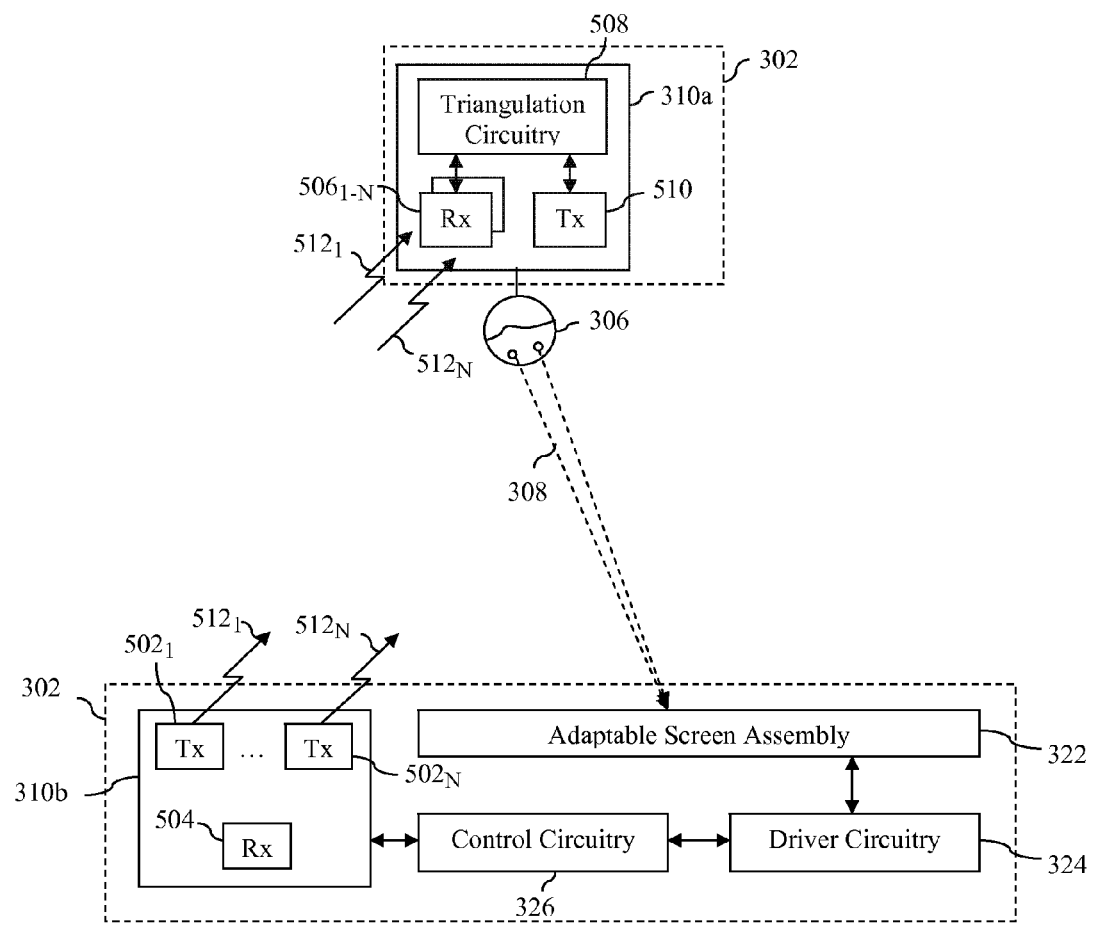

FIG. 5 is a block diagram of a display system in accordance with a second embodiment that includes reference information generation circuitry that implements a triangulation technique to determine an estimated location of a viewer.

Figure 6:
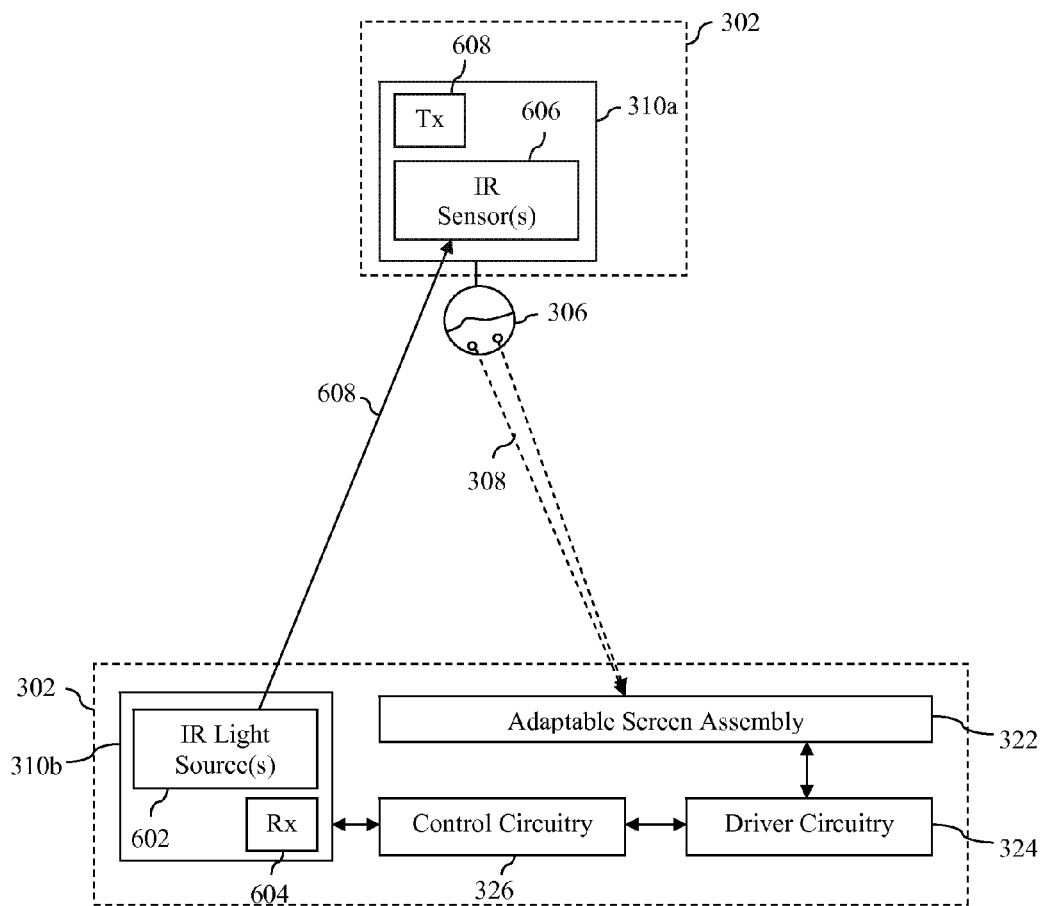

FIG. 6 is a block diagram of a display system in accordance with an embodiment that includes reference information generation circuitry that implements an infrared (IR) distance measurement system to help determine an estimated location of a viewer.

Figure 7:
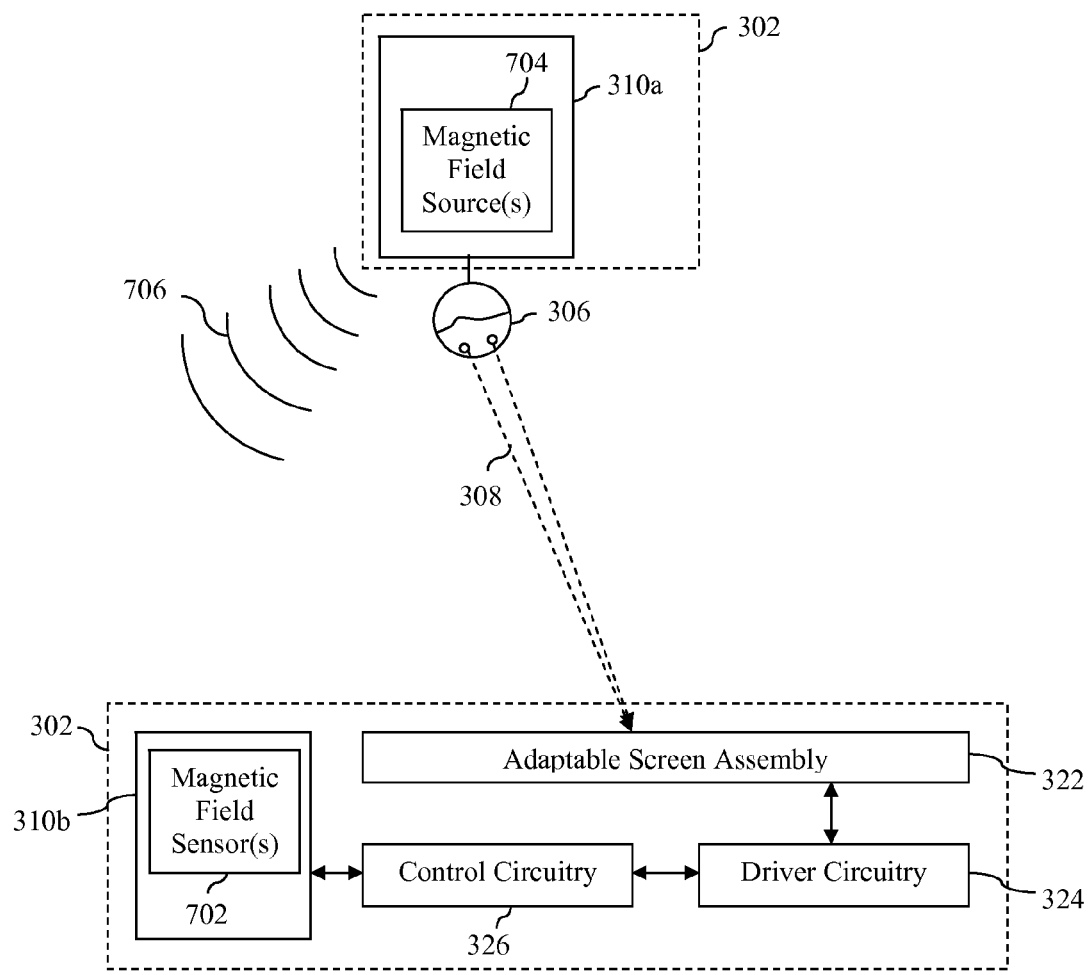

FIG. 7 is a block diagram of a display system in accordance with an embodiment that includes information generation circuitry that implements a magnetic field detection system to help determine an estimated location of viewer.

Figure 8:
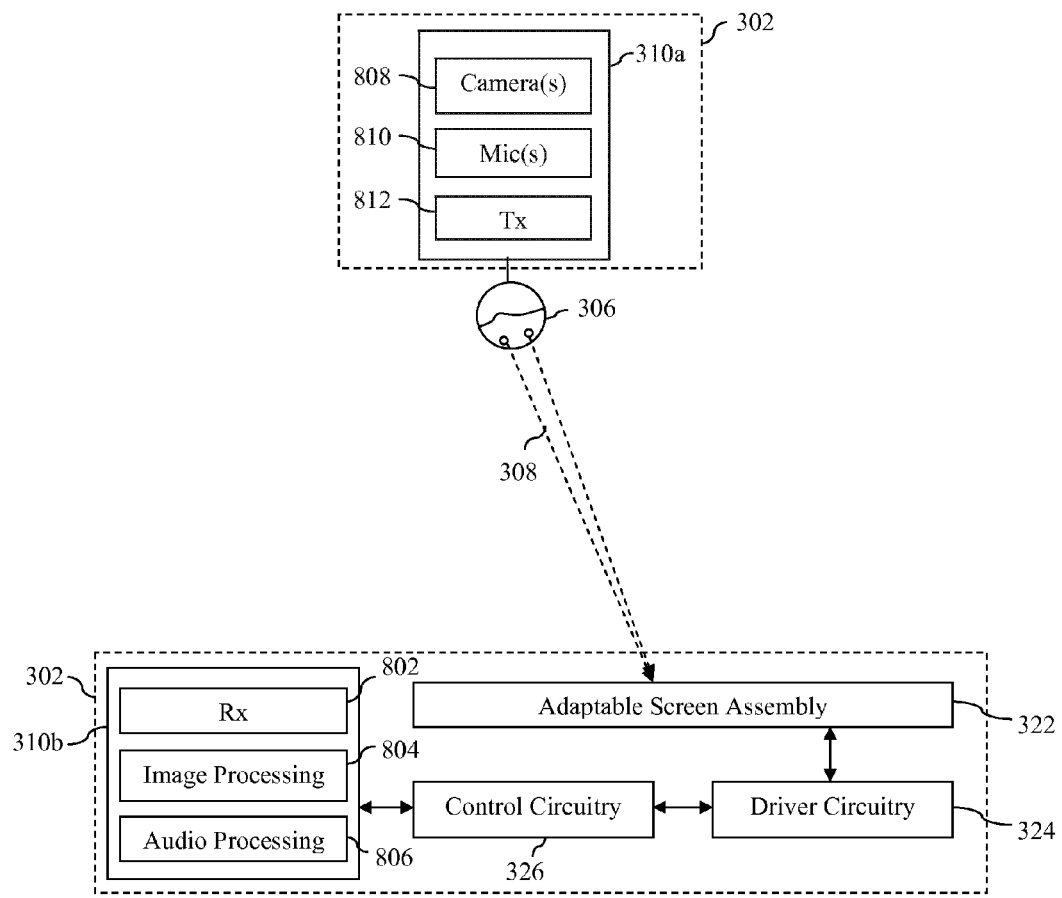

FIG. 8 is a block diagram of a display system in accordance with an embodiment that includes viewer-located reference information generation circuitry that includes one or more cameras and one or more microphones for facilitating the generation of reference information corresponding to at least one aspect of a viewing reference of a viewer.

Figure 9:
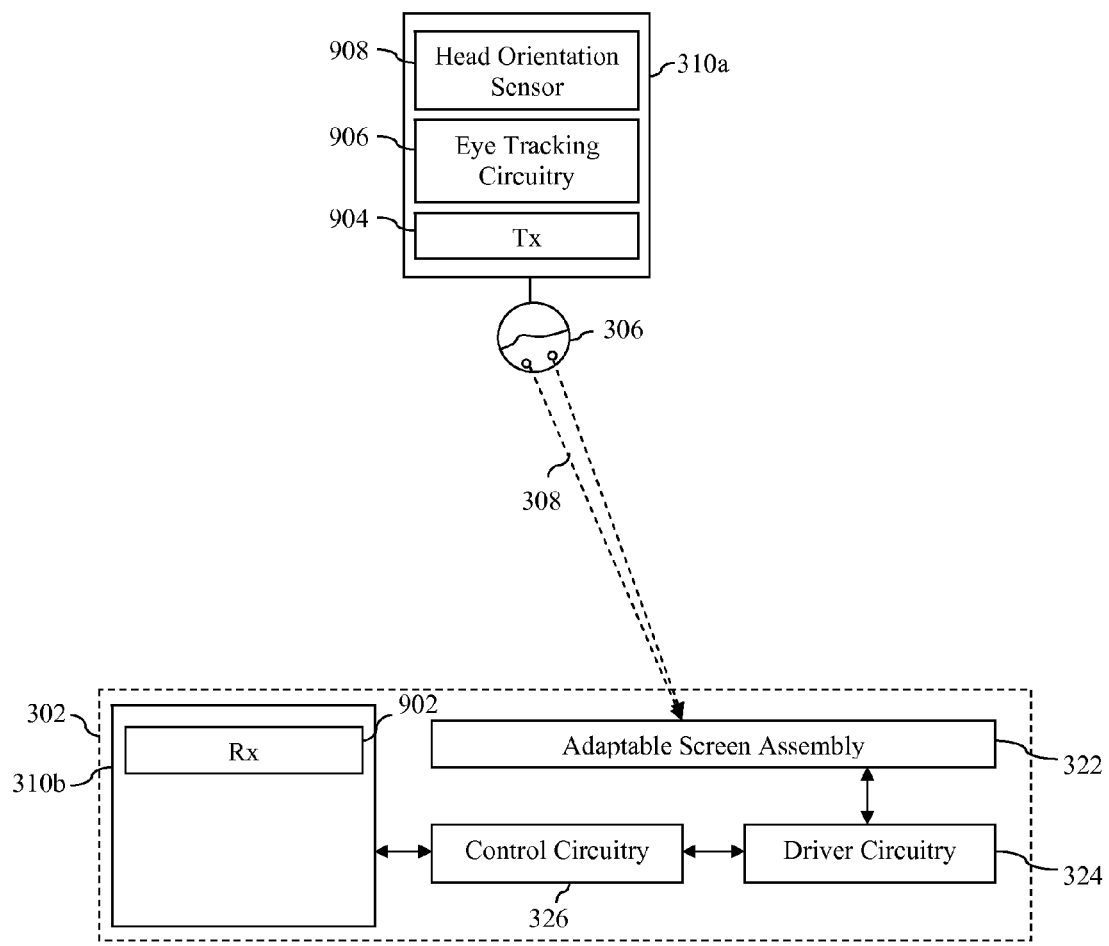

FIG. 9 is a block diagram of a display system in accordance with an embodiment that includes reference information generation circuitry that includes a head orientation sensor and eye tracking circuitry for determining a head orientation and point of gaze, respectively, of a viewer.

Figure 10:
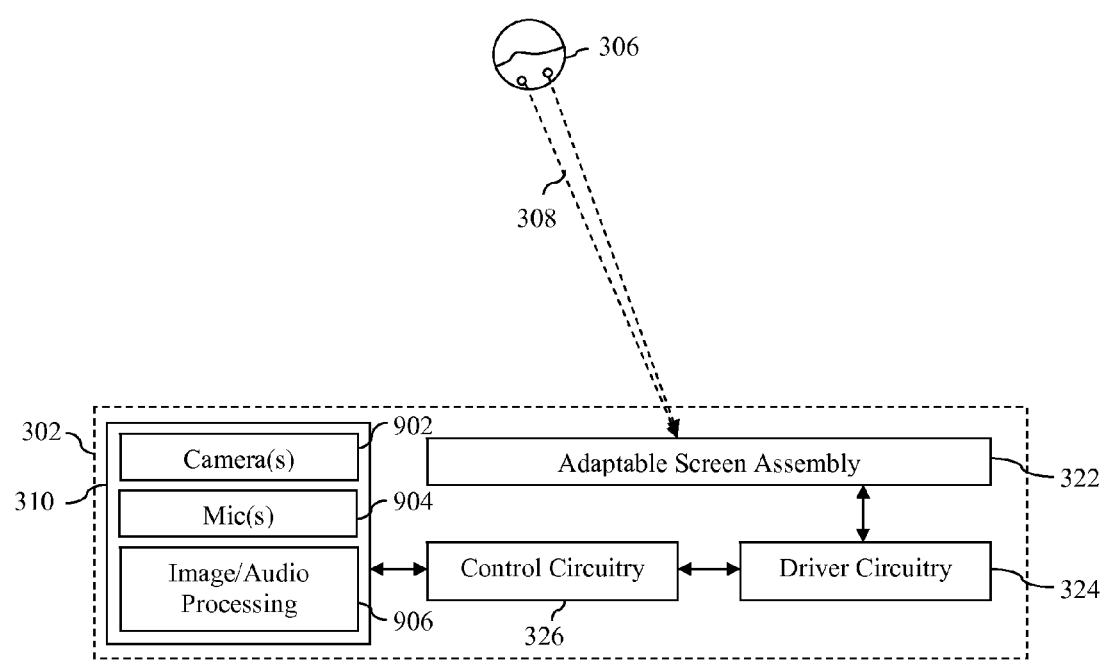

FIG. 10 is a block diagram of a display system in accordance with an embodiment in which non-viewer-located camera(s) and/or microphone(s) operate to generate reference information corresponding to at least one aspect of a viewing reference of a viewer.

Figure 11:
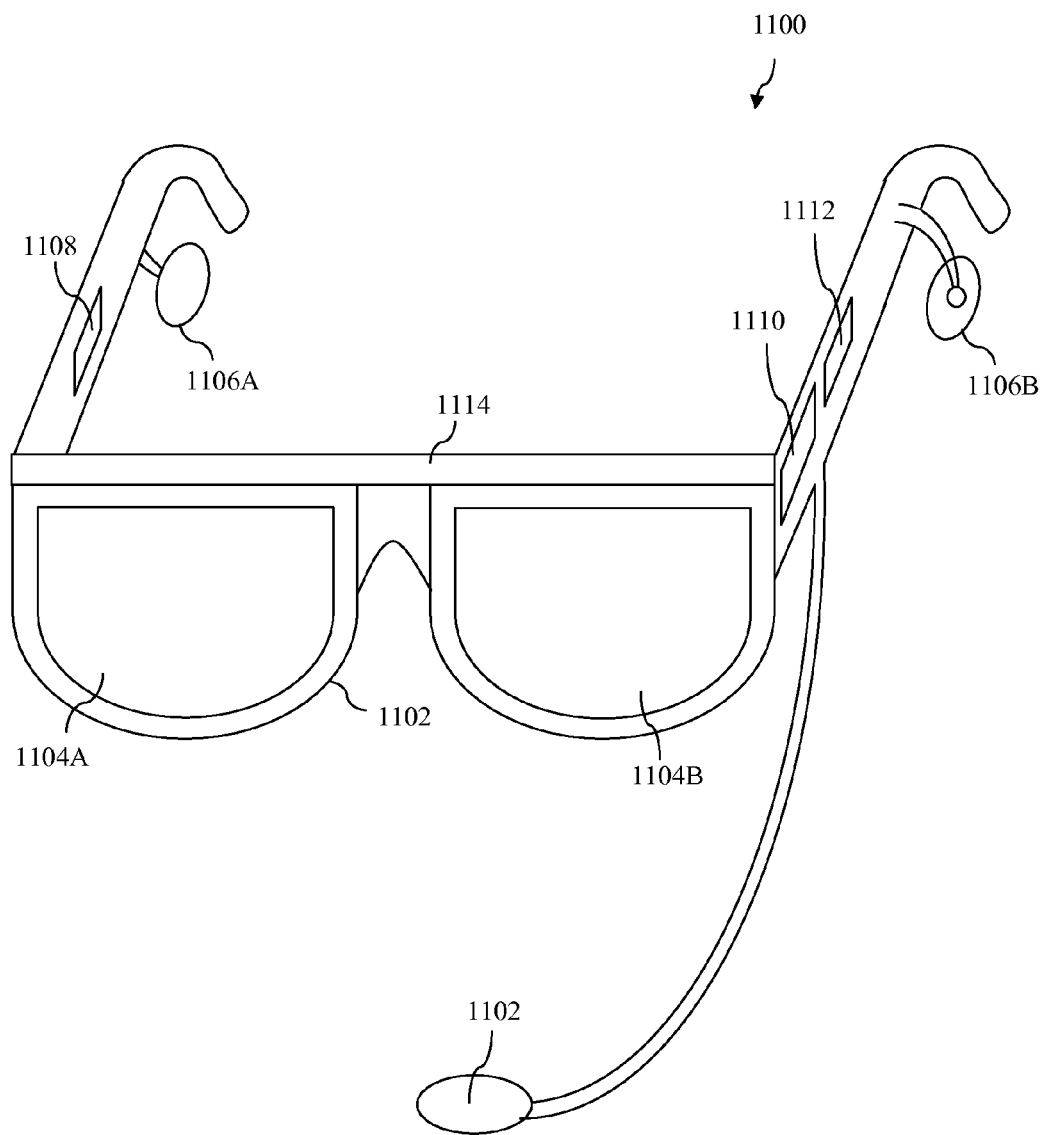

FIG. 11 depicts a headset in accordance with an embodiment that includes reference information generation circuitry for facilitating the generation of reference information corresponding to at least one aspect of a viewing reference of a viewer.

Figure 12A:
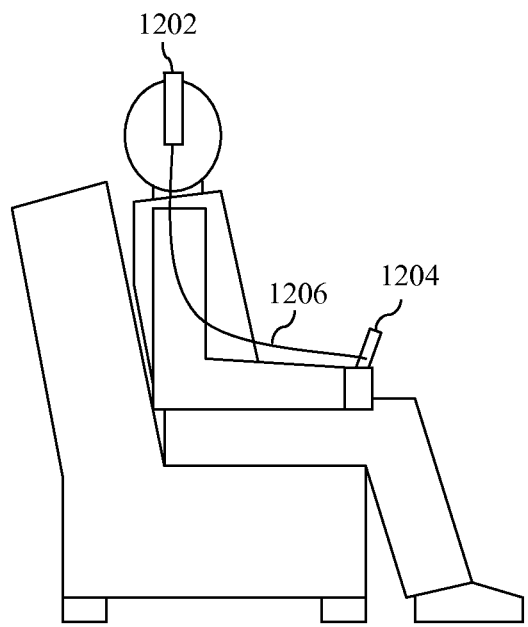

FIG. 12A depicts an embodiment in which reference information generation circuitry is distributed among a headset and a remote control that are connected to each other by a wired communication link.

Figure 12B:
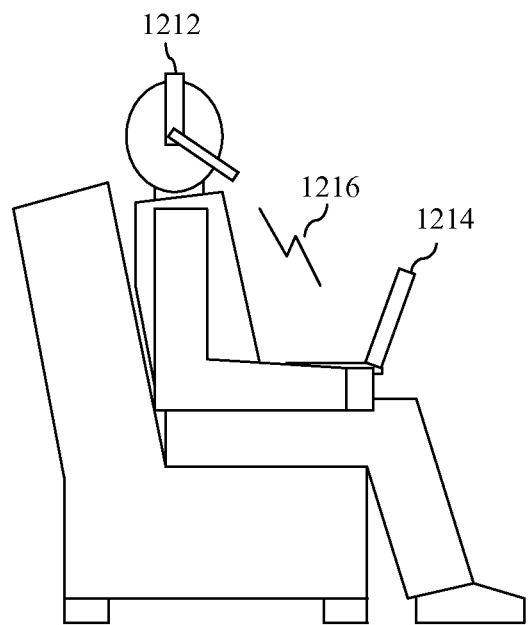

FIG. 12B depicts an embodiment in reference information generation circuitry is distributed among a headset and a laptop computer that are connected to each other by a wireless communication link.

Figure 13:
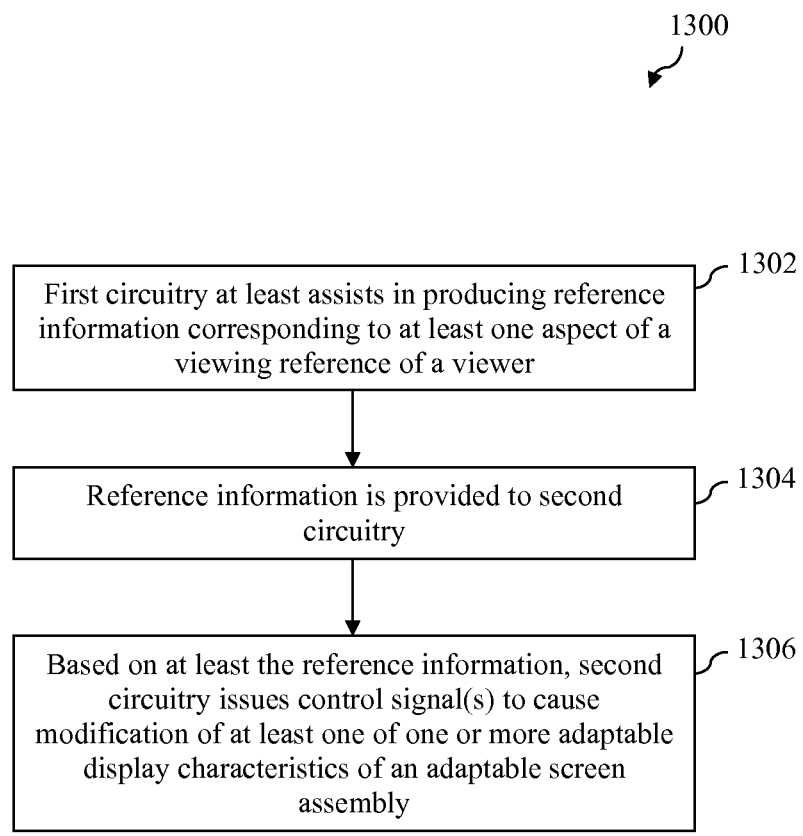

FIG. 13 depicts a flowchart of a method for presenting three-dimensional content to a viewer having a viewing reference in accordance with an embodiment, wherein the manner in which such content is presented is controlled in accordance with reference information concerning the first viewing reference.

Figure 14:
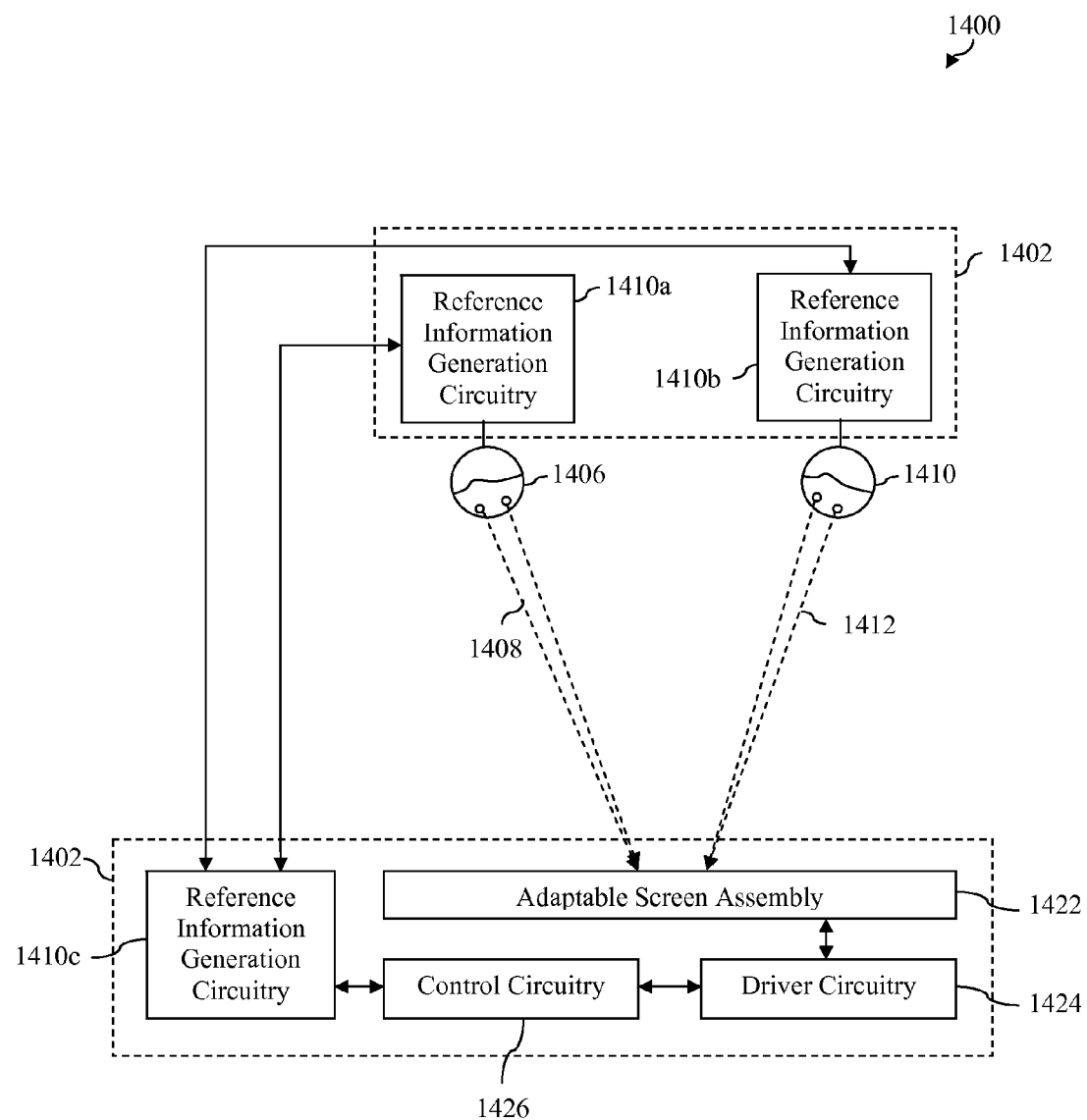

FIG. 14 is a block diagram of a display system in accordance with an embodiment that simultaneously presents first three-dimensional content to a first viewer having a first viewing reference and second three-dimensional content to a second viewer having a second viewing reference, wherein the manner in which such content is displayed is controlled in accordance with reference information concerning the first and second viewing references.

Figure 15:
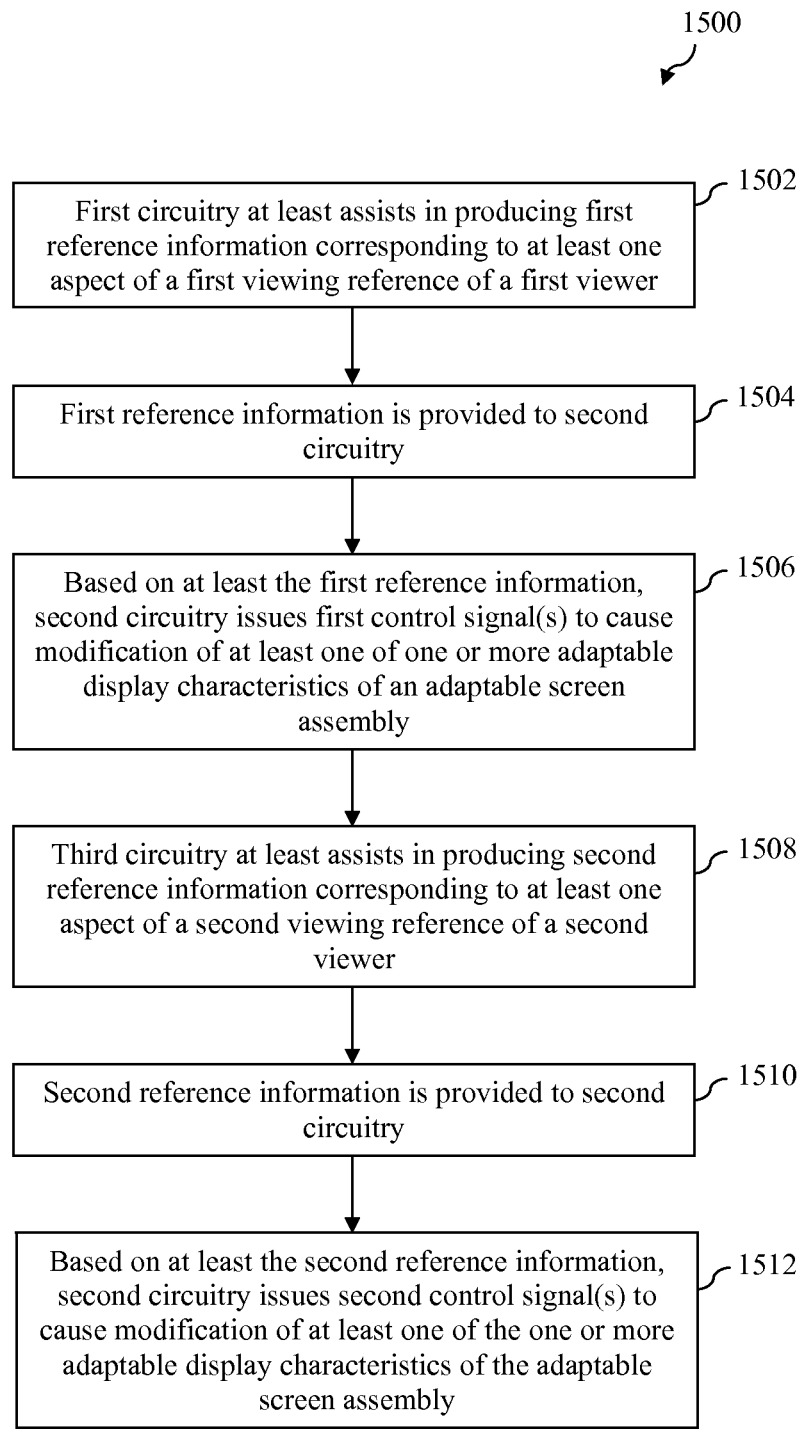

FIG. 15 depicts a flowchart of a method for presenting first three-dimensional content to a first viewer having a first viewing reference and simultaneously presenting second three-dimensional content to a second viewer having a second reference in accordance with an embodiment, wherein the manner in which such content is presented is controlled in accordance with reference information concerning the first and second viewing references.

Figure 16:
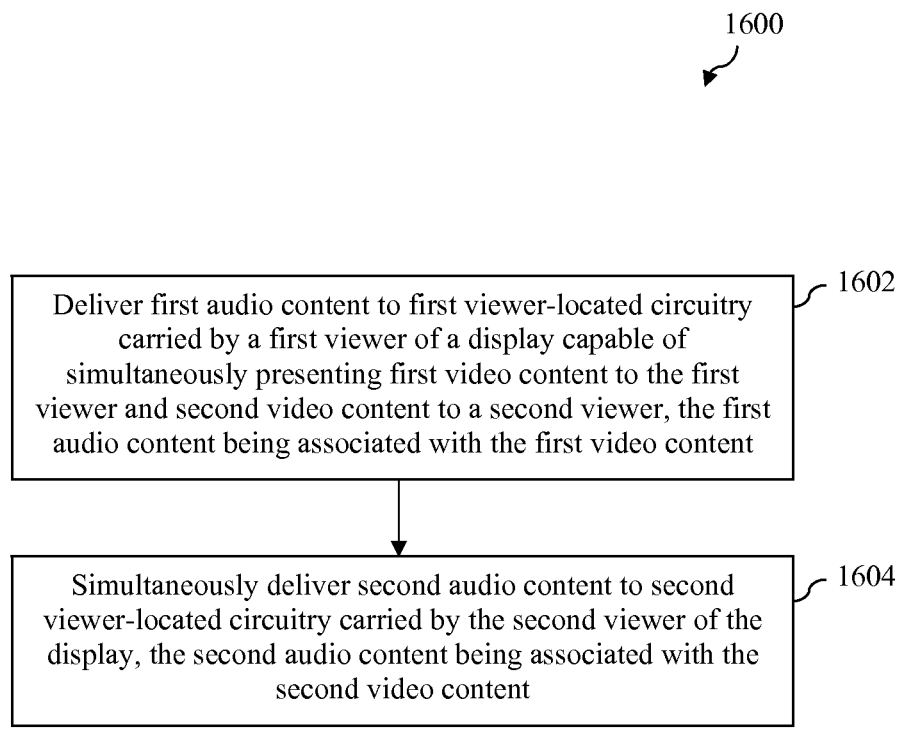

FIG. 16 depicts a flowchart of a method for delivering audio content to first and second viewers of a display capable of simultaneously presenting first video content to the first viewer and second video content to the second viewer in accordance with an embodiment.

Figure 17:
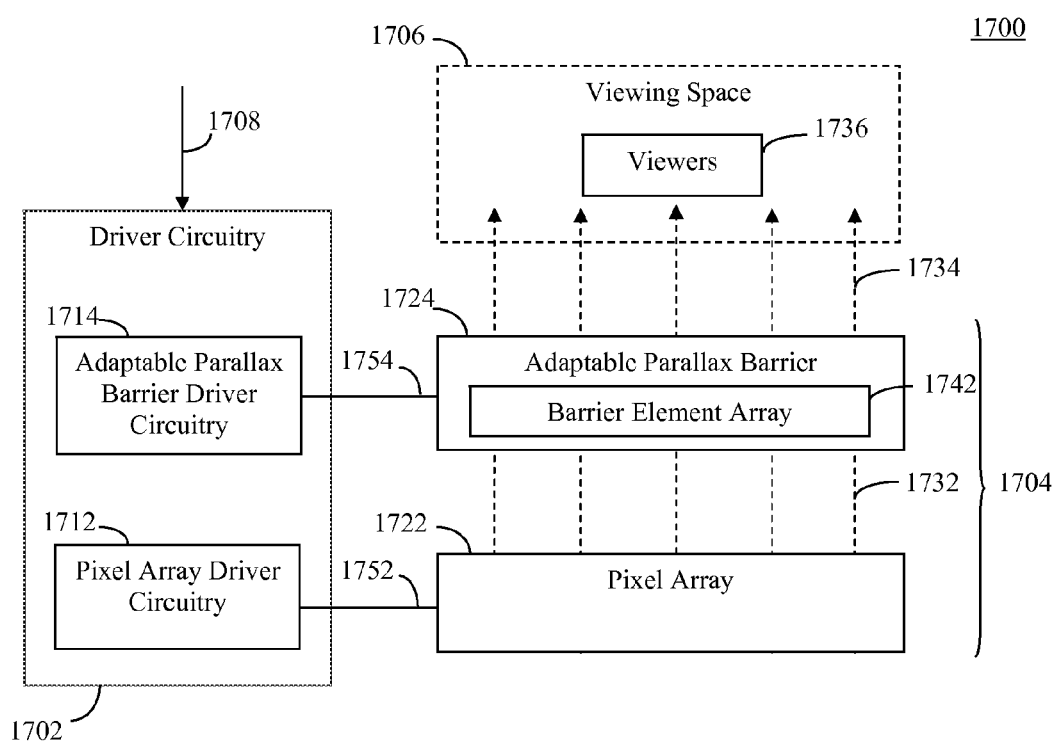

FIG. 17 is a block diagram of a display system in accordance with an embodiment that utilizes an adaptable parallax barrier to support multiple viewing configurations.

Figure 18:
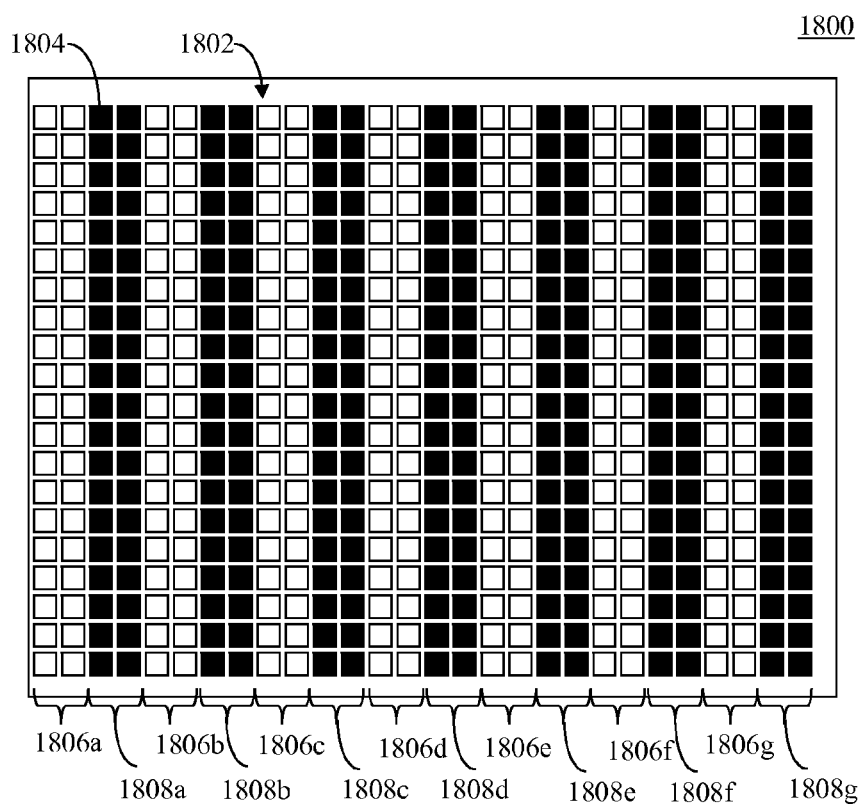

FIG. 18 illustrates an arrangement of an adaptable parallax barrier in accordance with an embodiment that supports a particular three-dimensional viewing configuration.

Figure 19:
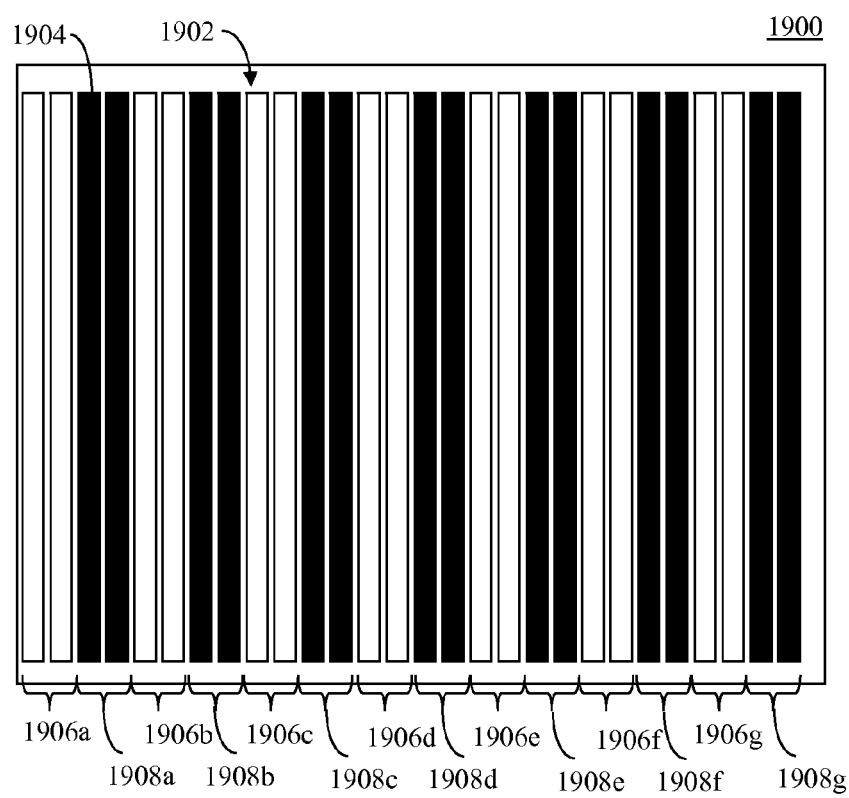

FIG. 19 illustrates an arrangement of an adaptable parallax barrier in accordance with an alternate embodiment that supports a particular three-dimensional viewing configuration.

Figure 20:
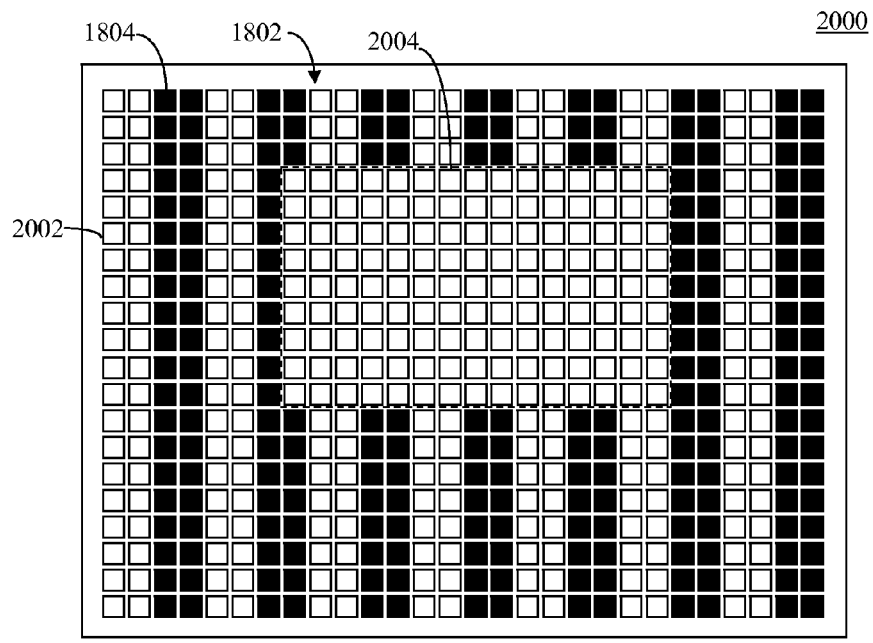

FIG. 20 illustrates an arrangement of an adaptable parallax barrier in accordance with an embodiment that supports a viewing configuration that mixes two-dimensional and three-dimensional viewing regions.

Figure 21:
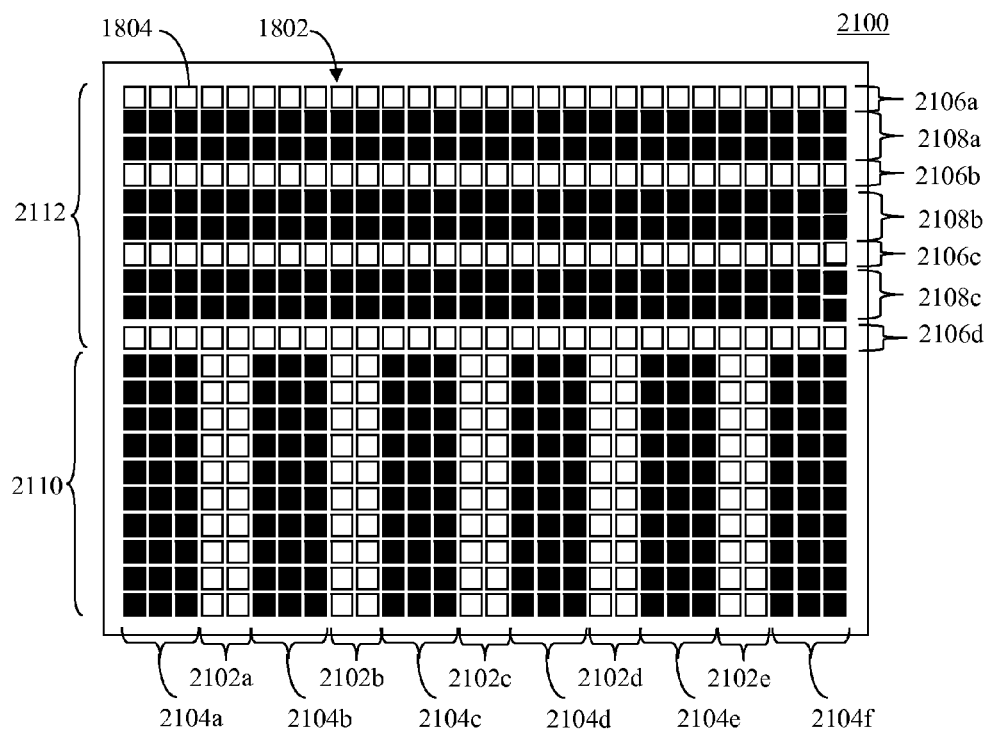

FIG. 21 illustrates an arrangement of an adaptable parallax barrier in accordance with an embodiment in which different orientations of transparent and opaque slits are used to simultaneously support different viewer orientations.

Figure 22:
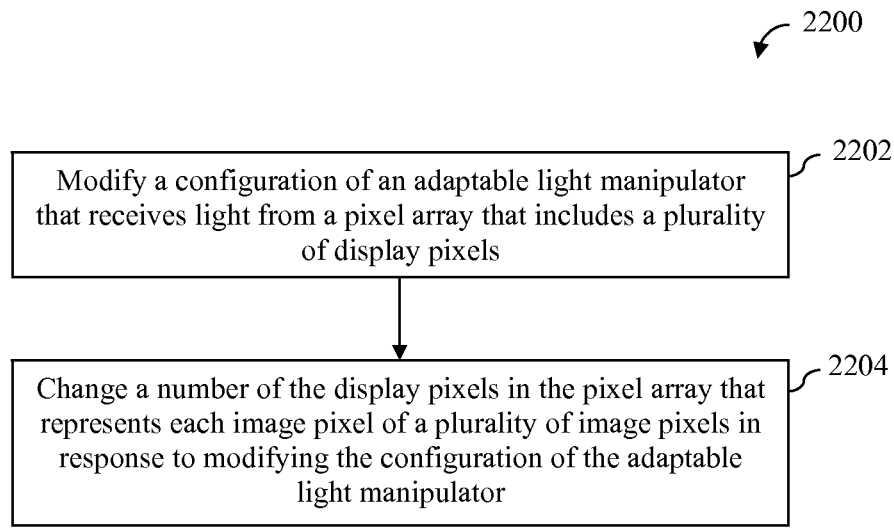

FIG. 22 depicts a flowchart of a method for controlling a pixel array to support a same viewing configuration as an adaptable light manipulator in accordance with an embodiment.

Figure 23:
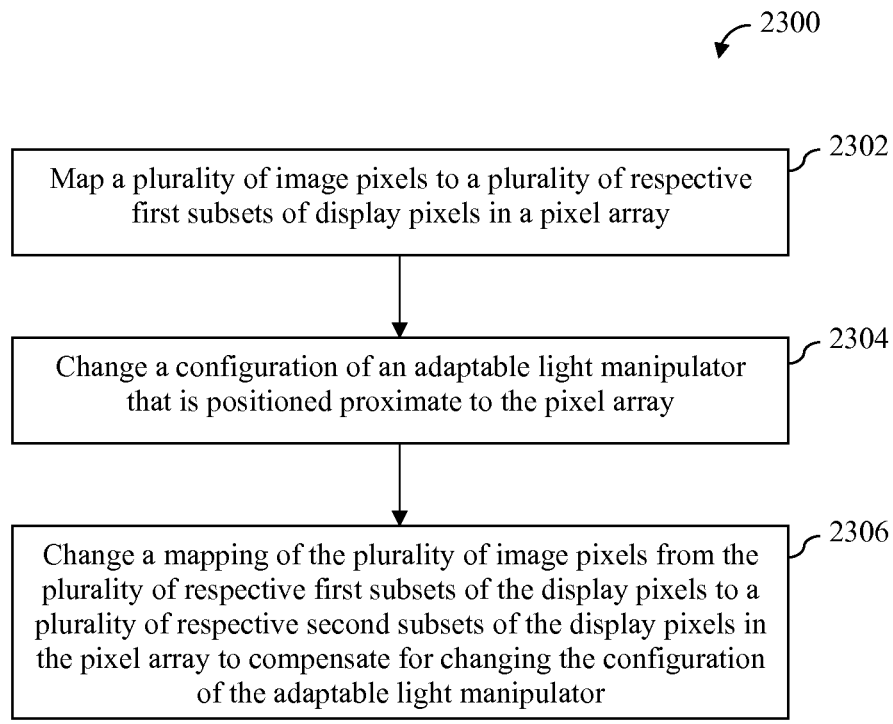

FIG. 23 depicts a flowchart of an alternate example method for controlling a pixel array to support a same viewing configuration as an adaptable light manipulator in accordance with an embodiment.

Figure 24:
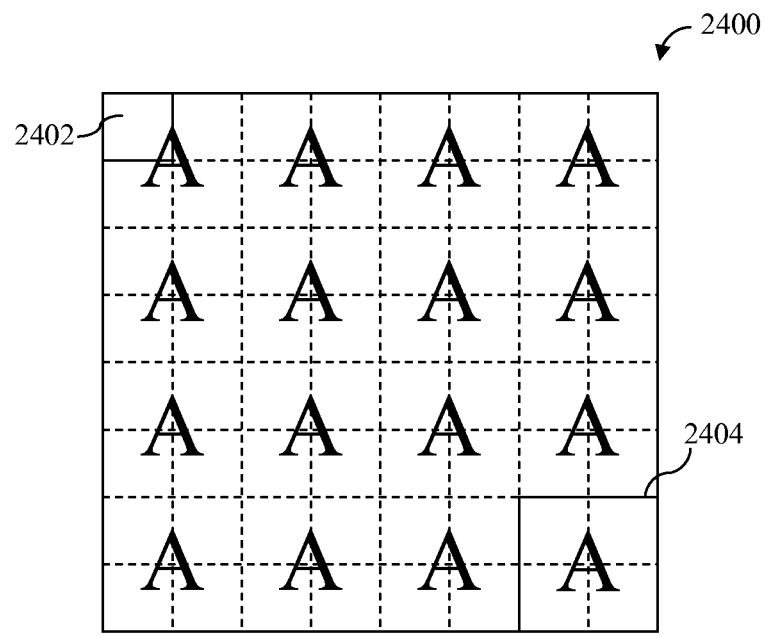

FIG. 24 illustrates a portion of a pixel array to which image pixels have been mapped to support a two-dimensional viewing configuration of an adaptable light manipulator in accordance with an embodiment.

Figure 25:
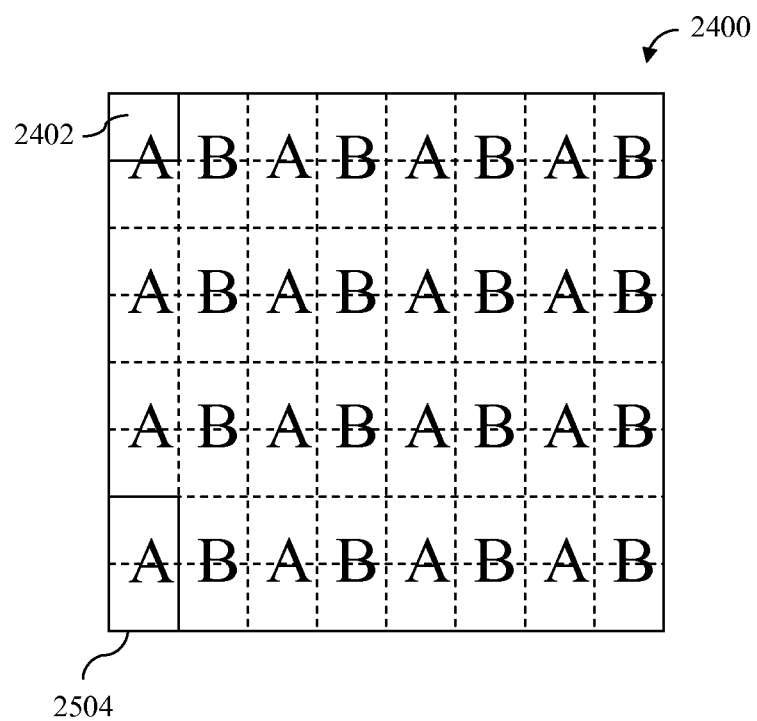

FIG. 25 illustrates how image pixels are mapped to the portion of the pixel array shown in FIG. 24 to support a first three-dimensional viewing configuration of an adaptable light manipulator in accordance with an embodiment.

Figure 26:
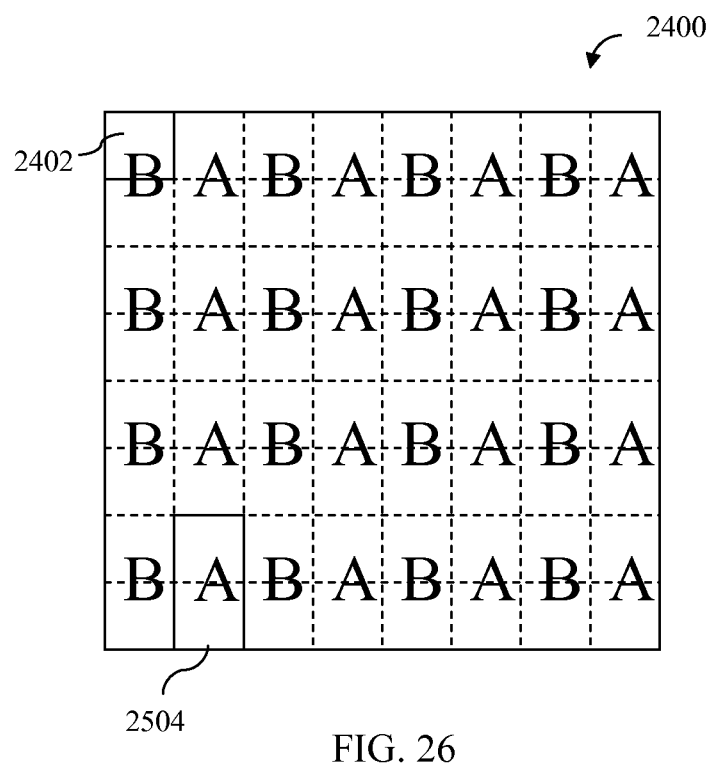

FIG. 26 illustrates how image pixels are mapped to the portion of the pixel array shown in FIGS. 24 and 25 to support a second three-dimensional viewing configuration of an adaptable light manipulator in accordance with an embodiment.

Figure 27:
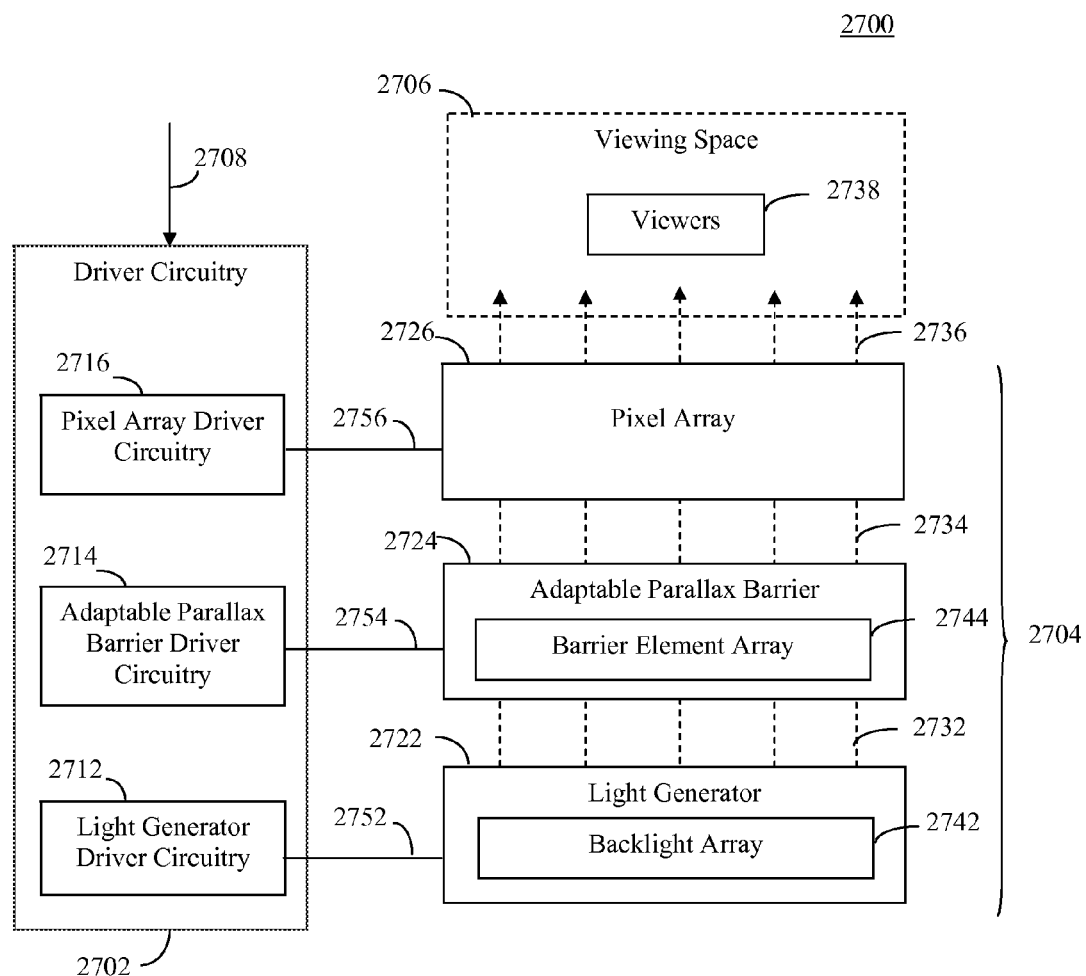

FIG. 27 is a block diagram of an example display system that utilizes an adaptable parallax barrier and a light generator to support multiple viewing configurations in accordance with an embodiment.

Figure 28:
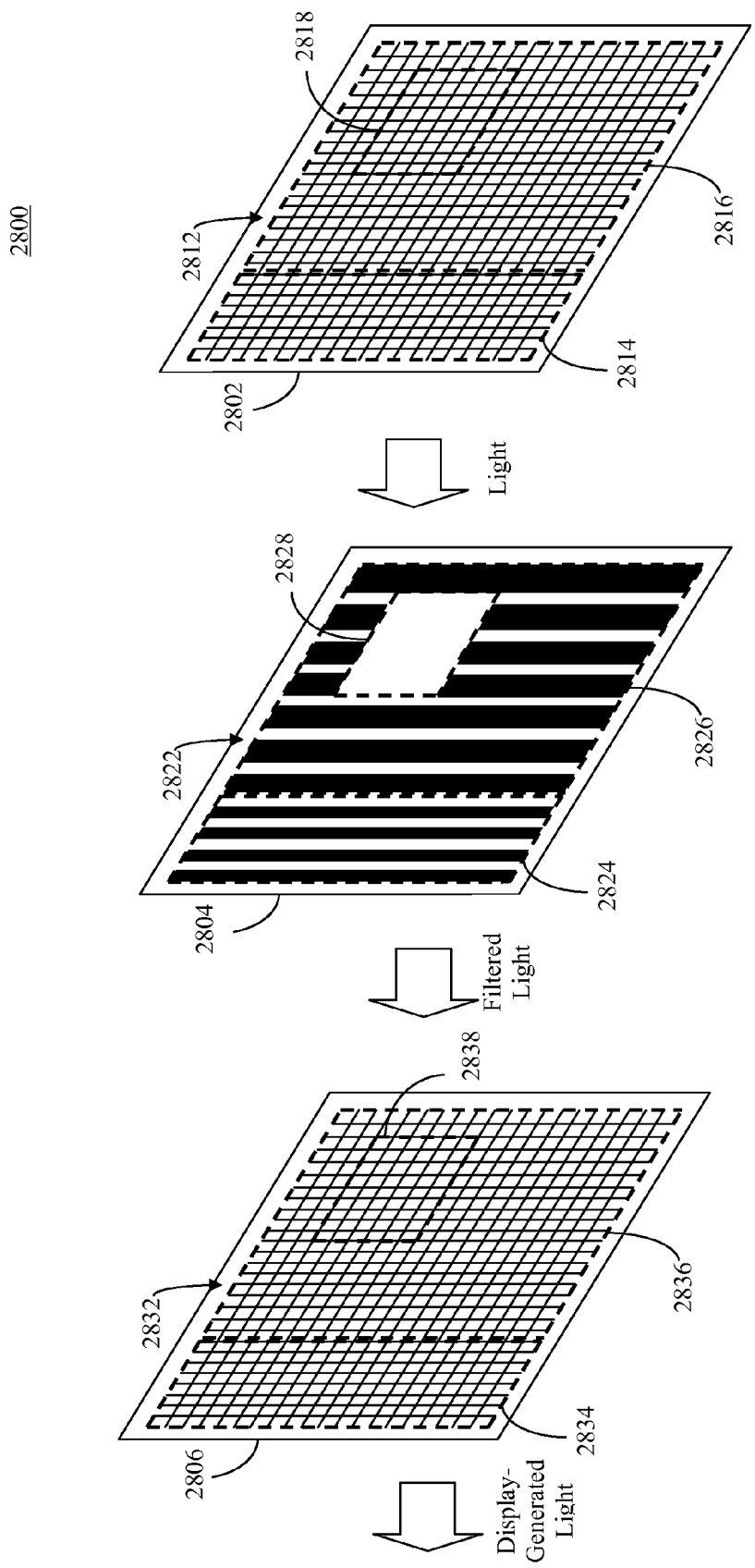

FIG. 28 provides an exploded view of a display system that utilizes a controllable backlight array to provide regional luminosity control in accordance with an embodiment.

Figure 29:
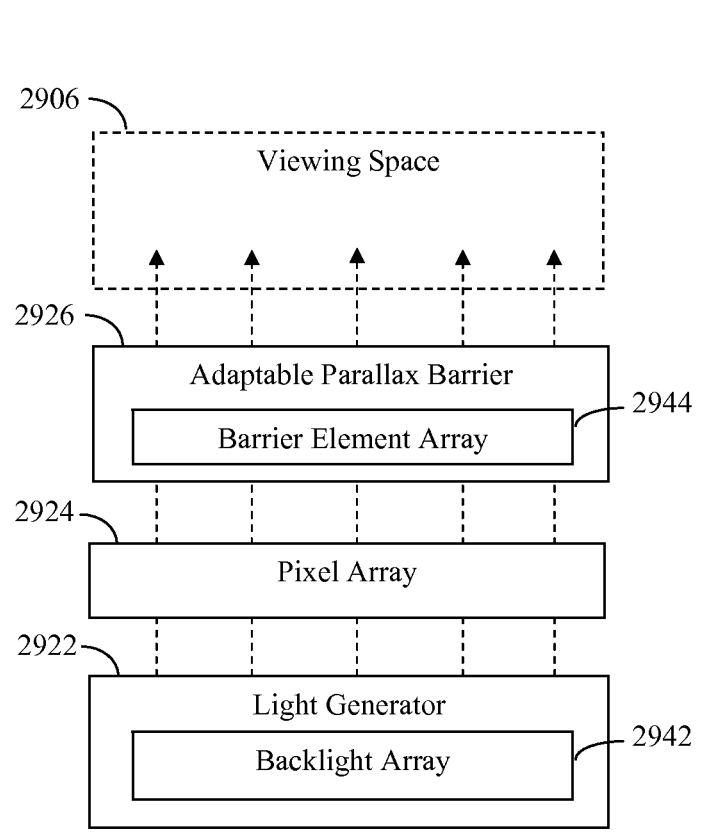

FIG. 29 is a block diagram of a display system that includes a pixel array disposed between a light generator and an adaptable parallax barrier in accordance with an embodiment.

Figure 30:
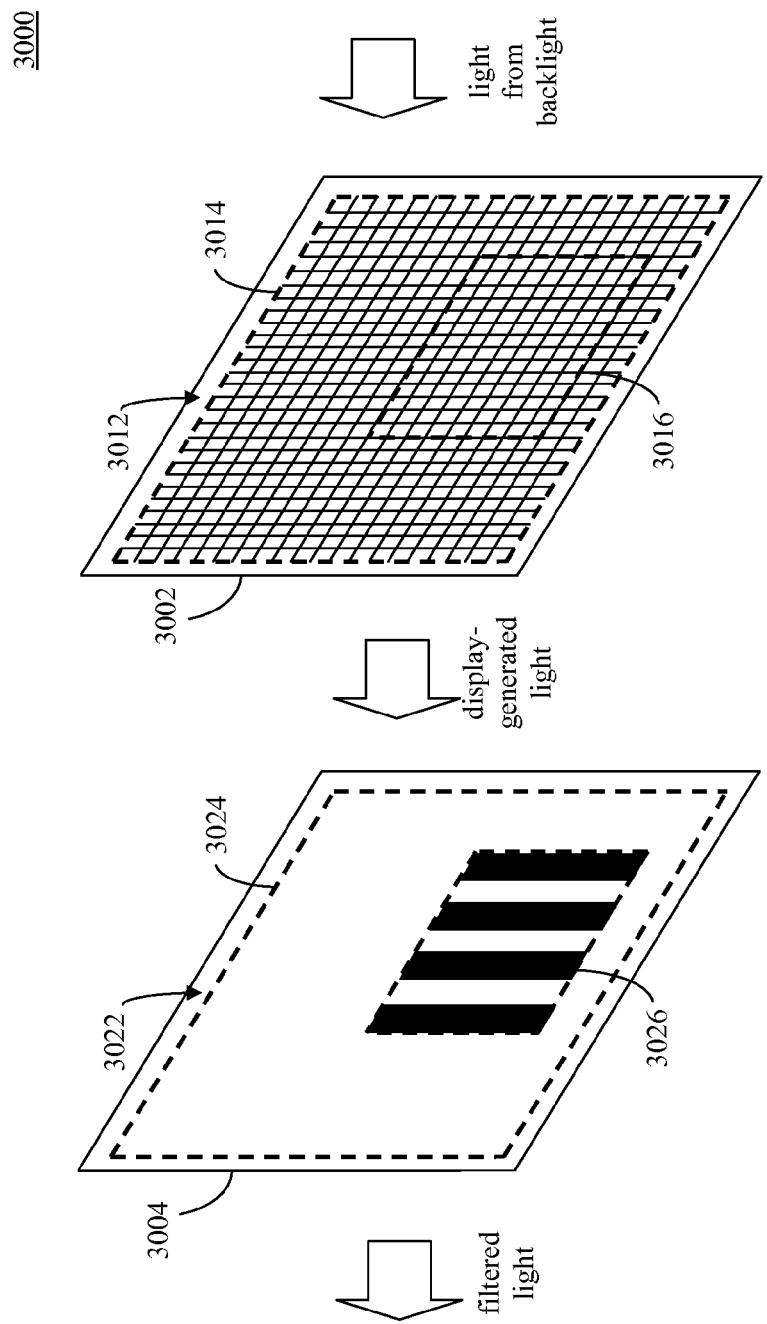

FIG. 30 provides an exploded view of a display system that implements a regional brightness control scheme based on pixel intensity in accordance with an embodiment.

Figure 31:
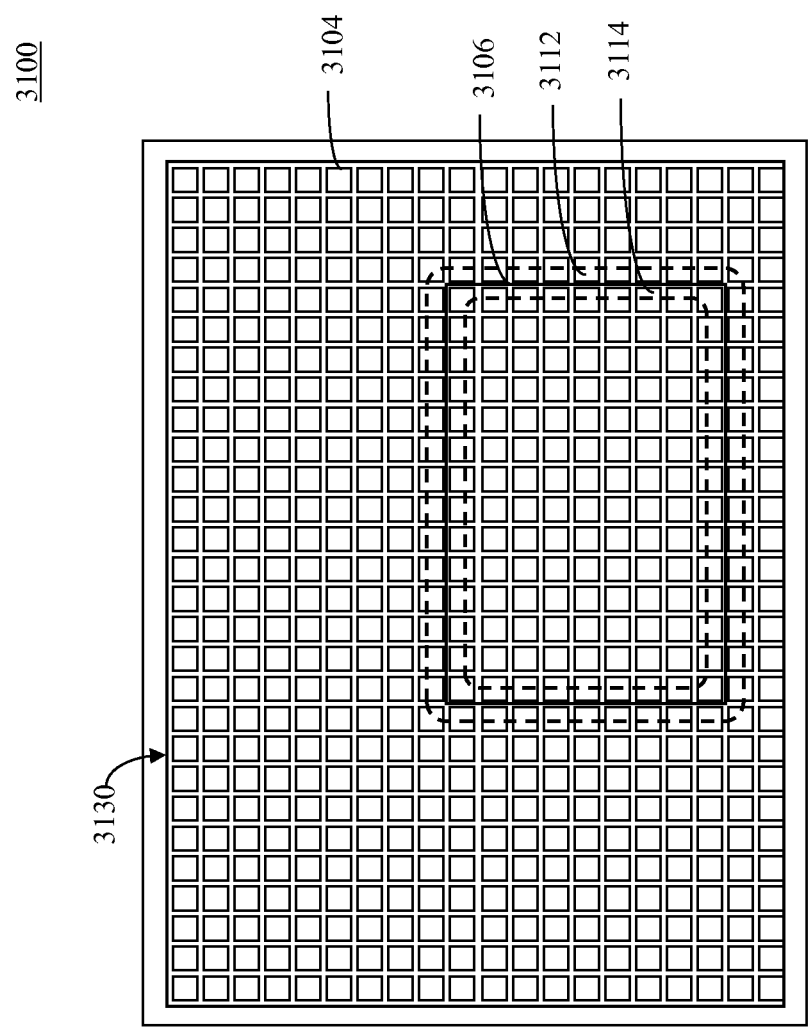

FIG. 31 illustrates a front perspective view of a display panel of a display system in accordance with an embodiment.

Figure 32:
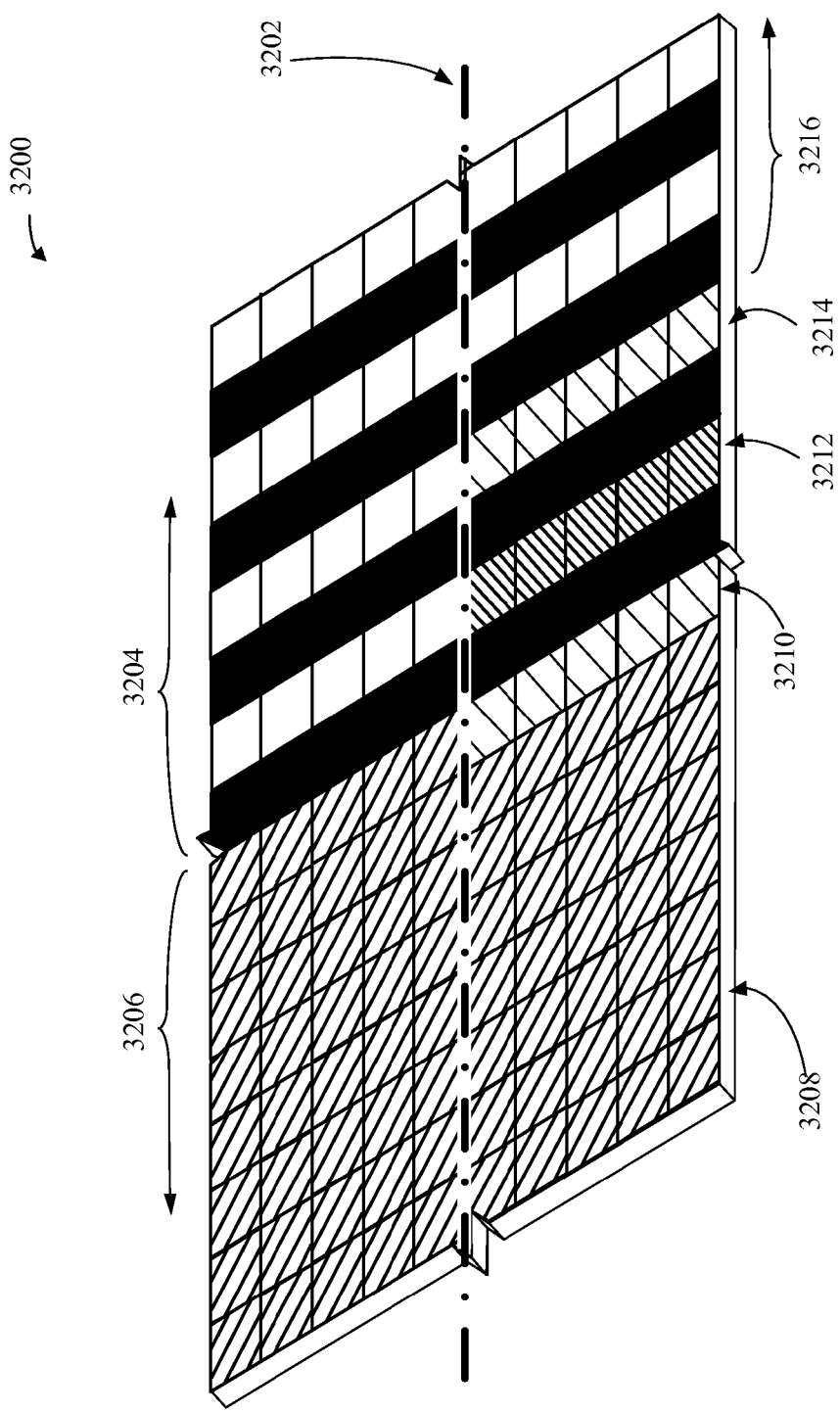

FIG. 32 illustrates two exemplary configurations of an adaptable light manipulator that includes a parallax barrier and a brightness regulation overlay in accordance with an embodiment.

Figure 33:
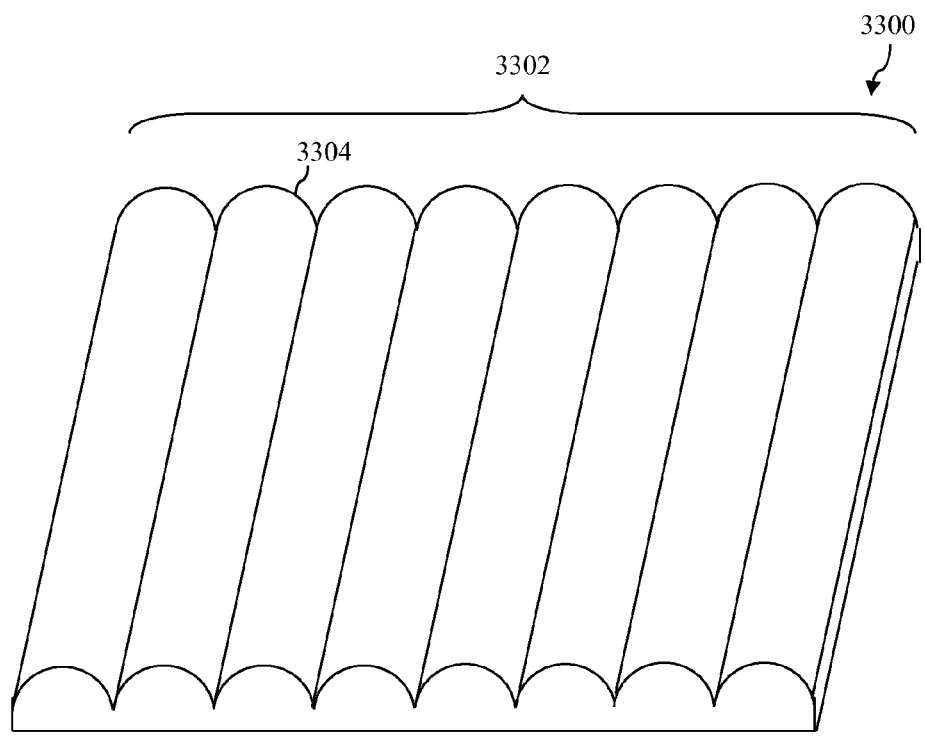

FIG. 33 shows a perspective view of an adaptable lenticular lens that may be used in a displays system in accordance with an embodiment.

Figure 34:
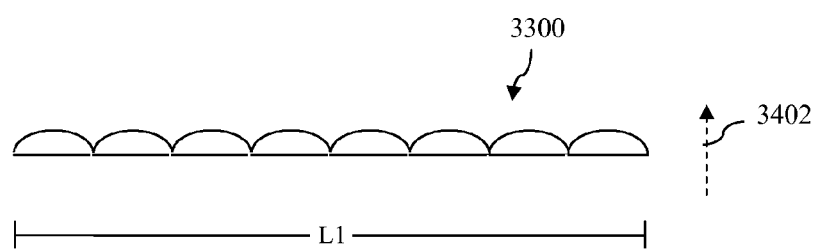

FIG. 34 shows a side view of the adaptable lenticular lens of FIG. 33.

Figure 35:
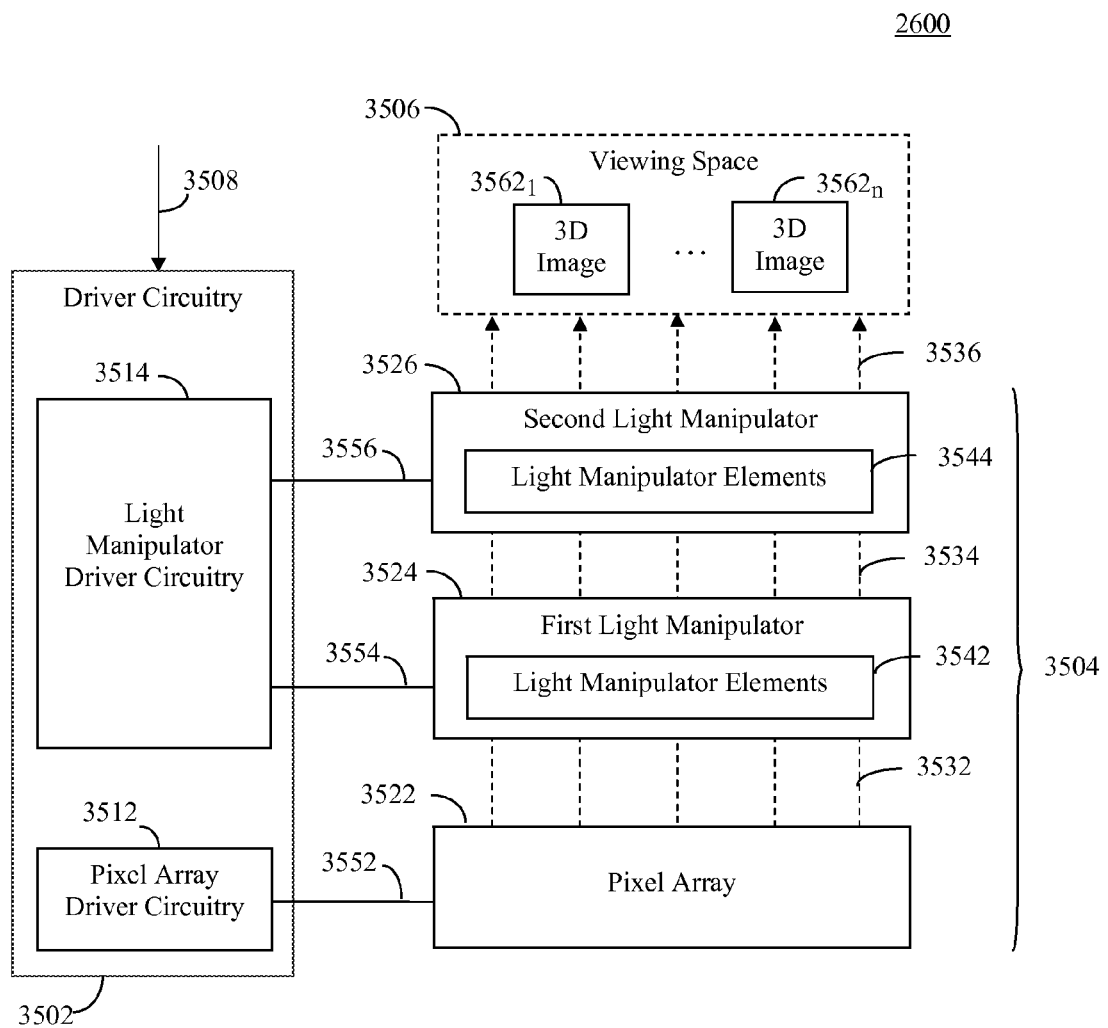

FIG. 35 is a block diagram of a display system that includes multiple light manipulator layers in accordance with an embodiment.

Figure 36:
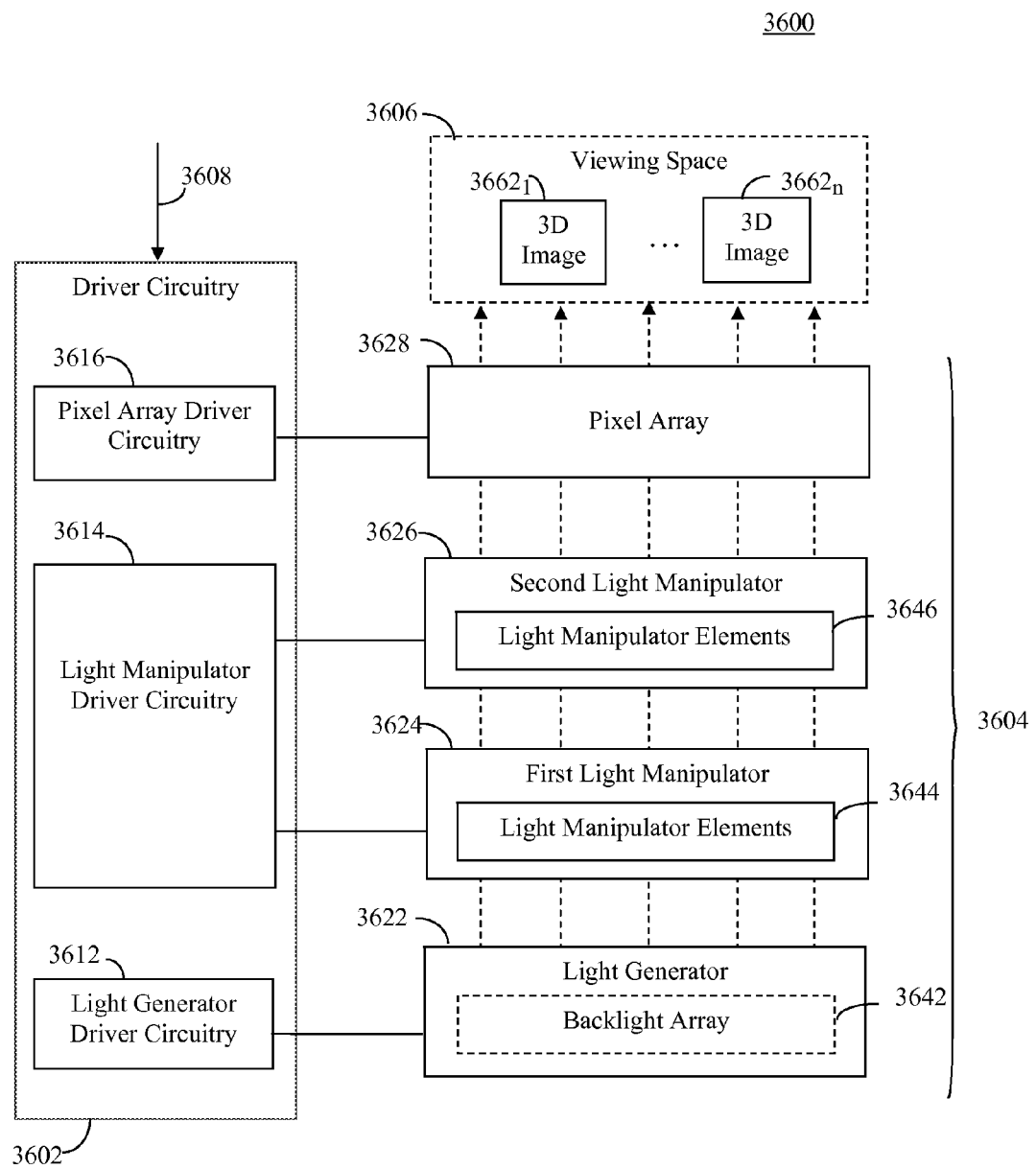

FIG. 36 is a block diagram of a display system that includes multiple light manipulator layers in accordance with an alternate embodiment.

Figure 37:
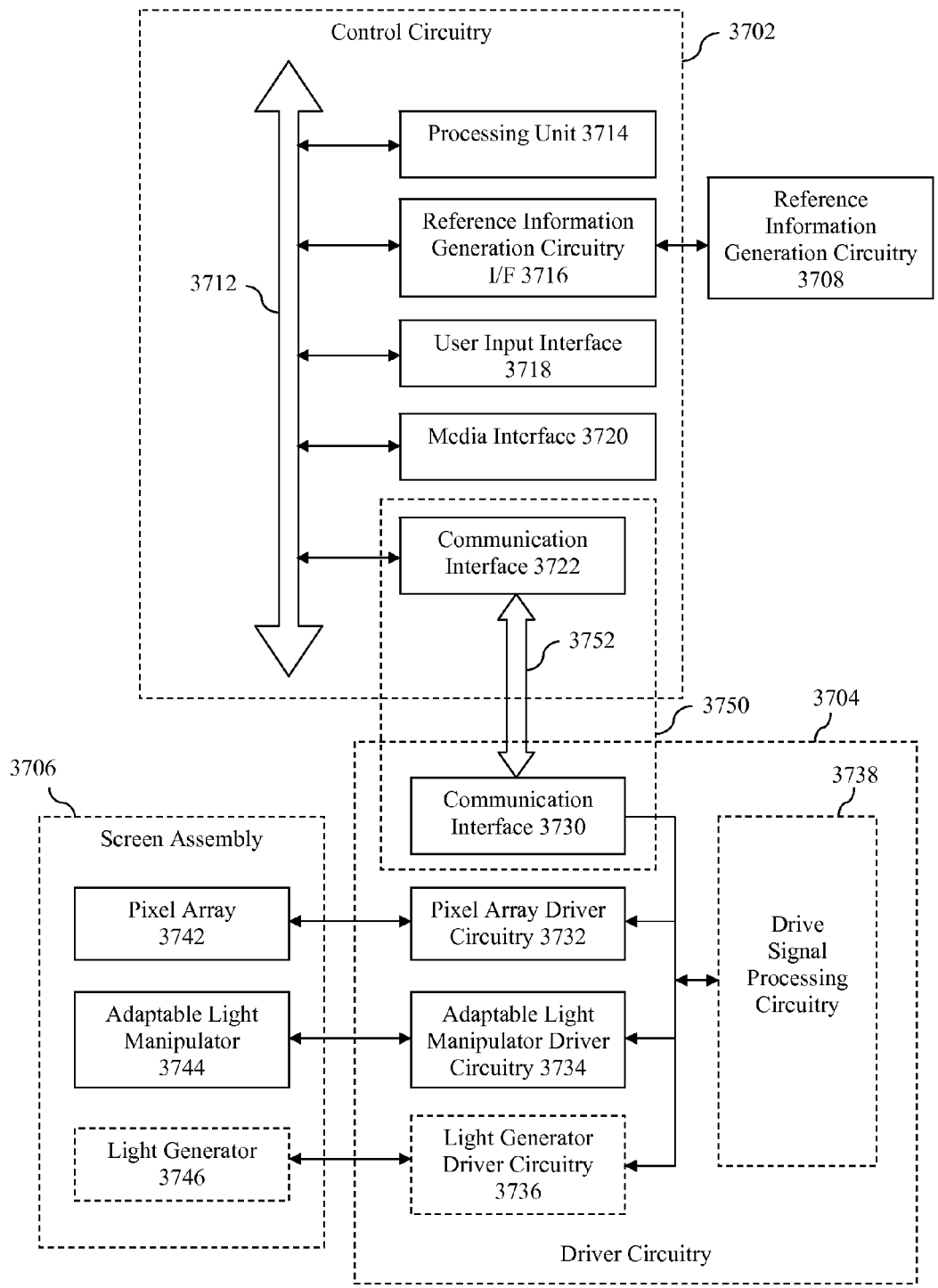

FIG. 37 is a block diagram of an example implementation of an adaptable two-dimensional/three-dimensional display system in accordance with an embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Figure 1:
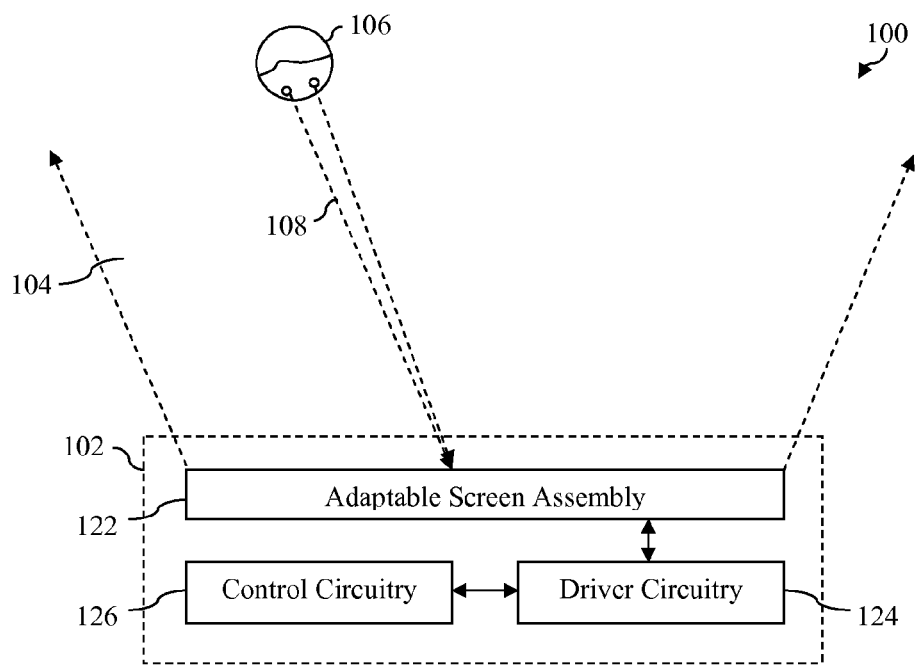
FIG. 1 is a block diagram of a first operating environment that may benefit from features provided by embodiments described herein.

FIG. 1 is a block diagram of a first example operating environment 100 that can benefit from embodiments of the present invention. As shown in FIG. 1, example operating environment 100 includes a display system 102 that comprises an adaptable screen assembly 122, driver circuitry 124, and control circuitry 126. Generally speaking, display system 102 operates to deliver light 104 that includes one or more viewable images to a viewing area that includes a first viewer 106. Display system 102 may comprise, for example and without limitation, a television, a projection system, a home theater system, a monitor, a computing device (e.g., desktop computer, laptop computer, tablet computer) or a handheld device (e.g., a cellular phone, smart phone, personal media player, personal digital assistant), wherein the computing device or handheld device has at least one attached or integrated display. Depending upon the implementation of display system 102, the elements thereof may be integrated into a single housing or may be distributed among multiple interconnected housings.

Adaptable screen assembly 122 is designed such that certain display characteristics associated therewith can be modified to support different viewing modes. For example, certain display characteristics associated with adaptable screen assembly 122 may be modified to selectively present images in a two-dimensional viewing mode or one or more three-dimensional viewing modes. For example, in certain implementations, display characteristics associated with screen assembly 122 may be modified to display a single image of certain subject matter to provide a two-dimensional view thereof, to display two images of the same subject matter viewed from different perspectives in a manner that provides a single three-dimensional view thereof, or to display a multiple of two images (e.g., four images, eight images, etc.) of the same subject matter viewed from different perspectives in a manner that simultaneously provides multiple three-dimensional views thereof, wherein the particular three-dimensional view perceived by a viewer is dependent at least in part upon the position of the viewer (also referred to herein as a "multi-view three-dimensional viewing mode").

Various examples of adaptable screen assemblies that can be modified to support such two-dimensional and three-dimensional viewing modes are described in the following commonly-owned, co-pending U.S. Patent Applications: U.S. patent application Ser. No. 12/774,307, filed on May 5, 2010 and entitled "Display with Elastic Light Manipulator"; U.S. patent application Ser. No. 12/845,409, filed on Jul. 28, 2010 and entitled "Display with Adaptable Parallax Barrier"; and U.S. patent application Ser. No. 12/845,461, filed on Jul. 28, 2010 and entitled "Display Supporting Multiple Simultaneous 3D Views." The entirety of each of these applications is incorporated by reference herein. Adaptable screen assembly 122 may be implemented in accordance with descriptions provided in the above-referenced applications.

In addition to the foregoing capabilities, adaptable screen assembly 122 may also be capable of simultaneously presenting two dimensional views and three-dimensional views in different regions of the same screen, respectively. By way of example, adaptable screen assembly 122 may be capable of simultaneously presenting a two-dimensional view of first content in a first region of a screen, and one or more three-dimensional views of second content in a second region of the screen. Adaptable screen assemblies having such capabilities are described in commonly-owned, co-pending U.S. patent application Ser. No. 12/845,440, filed on Jul. 28, 2010, and entitled "Adaptable Parallax Barrier Supporting Mixed 2D and Stereoscopic 3D Display Regions," the entirety of which is incorporated by reference herein.

A display characteristic of adaptable screen assembly 122 that may be modified to switch between different full-screen and regional two-dimensional and three-dimensional viewing modes may include a configuration of an adaptable light manipulator such as an adaptable parallax barrier. An adaptable lenticular lens may also be used as an adaptable light manipulator to switch between different full-screen three-dimensional viewing modes. Descriptions of such adaptable light manipulators and methods for dynamically modifying the same may be found in the aforementioned, incorporated U.S. patent application Ser. No. 12/774,307, filed on May 5, 2010 and entitled "Display with Elastic Light Manipulator" and U.S. patent application Ser. No. 12/845,409, filed on Jul. 28, 2010 and entitled "Display with Adaptable Parallax Barrier." For example, the degree of stretching of an adaptable lenticular lens may be modified in order to support certain three-dimensional viewing modes. As another example, barrier elements of an adaptable parallax barrier may be selectively placed in a blocking or non-blocking state in order to support certain full-screen and regional two-dimensional and three-dimensional viewing modes.

Another display characteristic of adaptable screen assembly 122 that may be modified to switch between different full-screen and regional two-dimensional and three-dimensional viewing modes may include the manner in which image content is mapped to display pixels of a pixel array, as described in commonly-owned, co-pending U.S. patent application Ser. No. 12/774,225, filed on May 5, 2010 and entitled "Controlling a Pixel Array to Support an Adaptable Light Manipulator," the entirety of which is incorporated by reference herein. Yet another display characteristic that may be modified to achieve such switching includes the manner in which backlighting is generated by a backlighting array or other non-uniform light generation element, as described in commonly-owned, co-pending U.S. patent application Ser. No. 12/982,020, filed on even date herewith and entitled "Backlighting Array Supporting Adaptable Parallax Barrier," the entirety of which is incorporated by reference herein.

The adaptation of the display characteristics of adaptable screen assembly 122 is carried out by sending coordinated drive signals to various elements (e.g., a non-uniform backlight generator, a pixel array and an adaptable light manipulator) that comprise adaptable screen assembly 122. This function is performed by driver circuitry 124 responsive to the receipt of control signals from control circuitry 126. A manner in which such coordinated drive signals may be generated is described in U.S. patent application Ser. No. 12/982,031, filed on even date herewith and entitled "Coordinated Driving of Adaptable Light Manipulator, Backlighting and Pixel Array in Support of Adaptable 2D and 3D Displays."

As also discussed in the foregoing, incorporated U.S. patent applications, display characteristics associated with an adaptable screen assembly, such as adaptable screen assembly 122, may be modified in order to present three-dimensional content to a viewer at a particular location and/or having a particular head orientation. For three-dimensional viewing systems that use light manipulators such as a parallax barrier or a lenticular lens, the viewer must be positioned in a well-defined location (referred to in the Background Section as a "sweet spot") in order to properly experience the three-dimensional effect. Certain display characteristics of adaptable screen assembly 122, such as the configuration of an adaptable light manipulator and/or the manner in which images are mapped to display pixels in a pixel array, can advantageously be modified in order to deliver a particular three-dimensional view to a viewer at a particular location. Such display characteristics may also be modified to deliver content to a viewer in a manner that corresponds to a current head orientation of the viewer (e.g. if the viewer's head is tilted at an angle, the content may be displayed at a similar angle). Additional display characteristics that may be modified in order to deliver a three-dimensional view to a viewer at a particular location include a distance and angular alignment between an adaptable light manipulator and a pixel array that together comprise adaptable screen assembly 122.

Thus, for example, with continued reference to FIG. 1, first viewer 106 may have a first viewing reference 108 with respect to adaptable screen assembly 122. First viewing reference 108 may comprise any of a number of aspects that affect how three-dimensional content displayed via adaptable screen assembly 122 will be perceived by viewer 106. Such aspects may include, for example and without limitation, a position or location of first viewer 106 relative to adaptable screen assembly 122, a head orientation of first viewer 106 and a point of gaze of first viewer 106. The position or location of first viewer 106 relative to adaptable screen assembly 122 may include a distance from adaptable screen assembly 122 or some reference point associated therewith, and such distance may include both horizontal distance and elevation. The position or location of first viewer 106 may also include eye locations of first viewer 106. The head orientation of first viewer 106 may include both a degree of tilt and rotation of the head of first viewer 106.

As discussed above, display system 102 is capable of modifying one or more adaptable display characteristics of adaptable screen assembly 122 to deliver a particular three-dimensional view to a particular location and/or to deliver a view having a particular orientation. Thus, display system 102 could benefit from being able to determine one or more aspects of first viewing reference 108 associated with first viewer 106 in order to deliver three-dimensional content to first viewer 106 in an optimized manner. Embodiments of the present invention to be described herein enable control circuitry 126 of display system 102 to receive information concerning one or more aspects of first viewing reference 108 and to use such information to cause a modification of at least one of the display characteristics of adaptable screen assembly 122 to cause three-dimensional content to be presented to first viewer 106 in an optimized manner. This modification may be caused by causing appropriate drive signals to be generated by driver circuitry 124.

Figure 2:
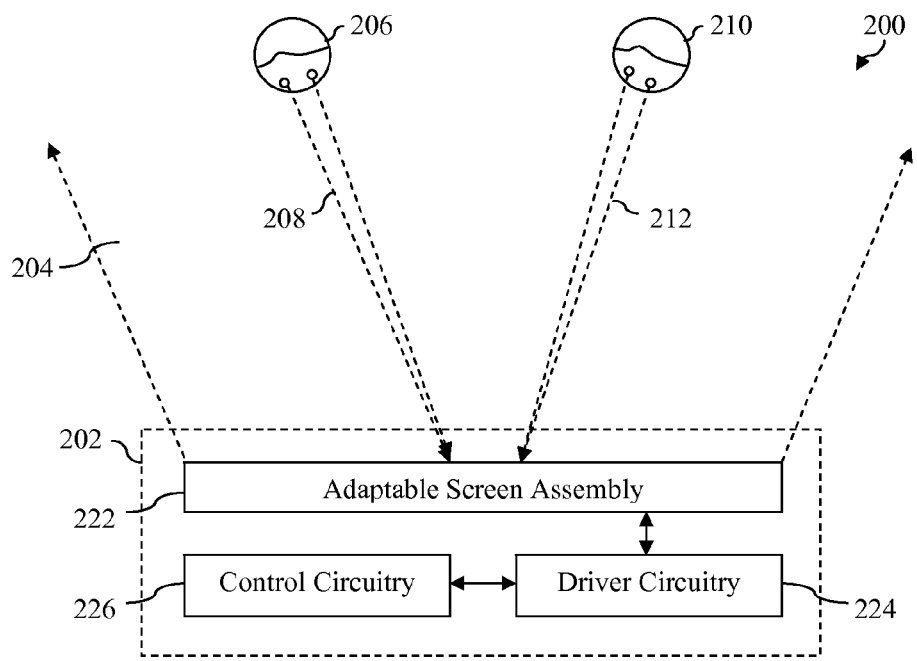
FIG. 2 is a block diagram of a second operating environment that may benefit from features provided by embodiments described herein.

FIG. 2 is a block diagram of a second example operating environment 200 that can benefit from embodiments of the present invention. As shown in FIG. 2, example operating environment 200 includes a display system 202 that comprises an adaptable screen assembly 222, driver circuitry 224, and control circuitry 226. Generally speaking, display system 202 operates to deliver light 204 that includes one or more viewable images to a viewing area that includes a first viewer 206 and a second viewer 210.

Display characteristics of adaptable screen assembly 222 may be modified to simultaneously present a first three-dimensional view of first content to first viewer 206 and a second three-dimensional view of second content to second viewer 210. Adaptable screen assemblies and manners of operating the same that can achieve this are described in the aforementioned, incorporated U.S. patent application Ser. No. 12/845,461, filed on Jul. 28, 2010 and entitled "Display Supporting Multiple Simultaneous 3D Views." Such display characteristics may include, but are not limited to, the configuration of one or more adaptable light manipulators, the manner in which images are mapped to display pixels in a pixel array, the distance between the pixel array and the adaptable light manipulator(s), the angular orientation of the adaptable light manipulator(s), and the like.

As shown in FIG. 2, first viewer 206 has a first viewing reference 208 with respect to adaptable screen assembly 222 and second viewer 210 has a second viewing reference 212 with respect to adaptable screen assembly 222. As noted above, a viewing reference may include a number of aspects, including but not limited to a position or location of a viewer relative to adaptable screen assembly 222, a head orientation of the viewer and a point of gaze of the viewer. Each of the aspects of viewing reference 208 can affect how first three-dimensional content displayed via adaptable screen assembly 222 will be perceived by first viewer 206 and each of the aspects of viewing reference 212 can affect how second three-dimensional content simultaneously displayed via adaptable screen assembly 222 will be perceived by second viewer 210.

As discussed above, display system 202 is capable of modifying one or more adaptable display characteristics of adaptable screen assembly 222 to simultaneously deliver first three-dimensional content to a first location and second three-dimensional content to a second location. Thus, display system 202 could benefit from being able to determine one or more aspects of first viewing reference 208 associated with first viewer 206 in order to deliver the first three-dimensional content to first viewer 206 in an optimized manner and to determine one or more aspects of second viewing reference 212 associated with second viewer 210 in order to deliver the second three-dimensional content to second viewer 210 in an optimized manner. Embodiments of the present invention to be described herein enable control circuitry 226 of display system 202 to receive information concerning one or more aspects of first viewing reference 208 and second viewing reference 212 and to use such information to cause a modification of at least one of the display characteristics of adaptable screen assembly 222 to cause first three-dimensional content to be presented to first viewer 206 and second three-dimensional content to be presented to second viewer 206 in an optimized manner. This modification may be caused by causing appropriate drive signals to be generated by driver circuitry 224.

II. Example Three-Dimensional Display Systems with Adaptation Based on Viewing Reference of Viewer(s)

FIG. 3 is a block diagram of an operating environment 300 that includes a display system 302 that presents three-dimensional content to a viewer 306 having a viewing reference 308 in accordance with an embodiment. As shown in FIG. 3, display system 302 includes an adaptable screen assembly 322, driver circuitry 324, control circuitry 326, reference information generation circuitry 310a and reference information generation circuitry 310b.

Generally speaking, display system 302 operates to deliver light that includes one or more viewable images to a viewing area that includes viewer 306. Display system 302 may include, for example and without limitation, a television, a projection system, a home theater system, a monitor, a computing device (e.g., desktop computer, laptop computer, tablet computer) or a handheld device (e.g., a cellular phone, smart phone, personal media player, personal digital assistant), wherein the computing device or handheld device has at least one attached or integrated display.

Adaptable screen assembly 322 is implemented in a like manner to adaptable screen assembly 122 described above in reference to FIG. 1. Accordingly, certain display characteristics associated therewith can be modified to selectively present images in a two-dimensional viewing mode, a three-dimensional viewing mode, or one or more multi-view three-dimensional viewing modes and to simultaneously present two dimensional views and three-dimensional views in different regions of the same screen, respectively. Furthermore, like adaptable screen assembly 122, adaptable screen assembly 322 has certain display characteristics that can be modified to deliver a particular three-dimensional view to a particular location and/or to deliver a view having a particular orientation. As discussed in the preceding section, the display characteristics that can be modified to achieve this may include but are not limited to a configuration of an adaptable light manipulator such as an adaptable parallax barrier or lenticular lens, a manner in which images are mapped to display pixels in a pixel array, and a distance and angular alignment between an adaptable light manipulator and a pixel array that together comprise adaptable screen assembly 322.

The adaptation of the display characteristics of adaptable screen assembly 322 may be carried out, in part, by the sending coordinated drive signals to various elements (e.g., a non-uniform backlight generator, a pixel array and an adaptable light manipulator) that comprise adaptable screen assembly 322. This function is performed by driver circuitry 324 responsive to the receipt of control signals from control circuitry 326. As noted in the previous section, the manner in which such coordinated drive signals may be generated is described in the aforementioned, incorporated U.S. patent application Ser. No. 12/982,031, filed on even date herewith and entitled "Coordinated Driving of Adaptable Light Manipulator, Backlighting and Pixel Array in Support of Adaptable 2D and 3D Displays."

Reference information generation circuitry 310a and 310b comprise components of display system 302 that operate in conjunction to produce reference information concerning at least one aspect of viewing reference 308 of viewer 306 with respect to adaptable screen assembly 322. Viewing reference 308 may comprise any of a number of aspects that affect how three-dimensional content displayed via adaptable screen assembly 322 will be perceived by viewer 306. Such aspects may include, for example and without limitation, a position or location of viewer 306 relative to adaptable screen assembly 322, a head orientation of viewer 306 and a point of gaze of viewer 306. The position or location of viewer 306 relative to adaptable screen assembly 322 may include a distance from adaptable screen assembly 322 or some reference point associated therewith, and such distance may include both horizontal distance and elevation. The position or location of viewer 306 may also include eye locations of viewer 306. The head orientation of viewer 306 may include both a degree of tilt and rotation of the head of viewer 306.

The reference information produced by reference information generation circuitry 310a and 310b is provided to control circuitry 324. Based on at least the reference information, control circuitry 326 causes modification of at least one of the display characteristics of adaptable screen assembly 322. This modification may be caused by causing appropriate drive signals to be generated by driver circuitry 324. Such modification may be performed, for example, to deliver a particular three-dimensional view to viewer 306 in accordance with one or more aspects of viewing reference 308. For example, such modification may be performed to deliver a particular three-dimensional view to an estimated location of viewer 306 (including an eye location of viewer 306) and/or in an orientation that corresponds to an orientation of viewer 306. Thus, by producing and providing such reference information to control circuitry 326, display system 302 is capable of delivering three-dimensional content to viewer 306 in an optimized manner.

Reference information generation circuitry 310a is intended to represent viewer-located circuitry that is situated on or near viewer 306. For example, reference information generation circuitry 310a may comprise circuitry that is incorporated into one or more portable devices or housings which are worn on or carried by viewer 306. Such portable devices or housings may include, but are not limited to, a headset, glasses, an earplug, a pendant, a wrist-mounted device, a remote control, a game controller, handheld personal devices (such as a cellular telephone, smart phone, personal digital assistant or the like) and portable computing device (such as a laptop computer, tablet computer or the like). Such viewer-located circuitry may be designed to leverage a proximity to the user to assist in generating the above-described reference information.

Reference information generation circuitry 310b is intended to represent circuitry that is not viewer-located. As will be discussed in reference to particular embodiments described herein, reference information generation circuitry 310b is configured to operate in conjunction with reference information generation circuitry 310a to generate the above-described reference information and to provide such reference information to control circuitry 326. In certain implementations, adaptable screen assembly 322, driver circuitry 324, control circuitry 326 and reference information generation circuitry 310b are all integrated within a single housing (e.g., a television or other display device). In alternate embodiments, adaptable screen assembly 322, driver circuitry 324 and at least some portion of control circuitry 326 is integrated within a first housing (e.g., a television) and reference information generation circuitry 310b and optionally some portion of control circuitry 326 is integrated within a second housing attached thereto, such as a set-top box, gateway device or media device. Still other arrangements and distributions of this circuitry may be used.

Various embodiments of display system 302 will now be described in reference to FIGS. 4-9. Each of these embodiments utilizes different implementations of reference information generation circuitry 310a and 310b to produce reference information for provision to control circuitry 326. These different implementations are described herein by way of example only and are not intended to be limiting.

For example, FIG. 4 is a block diagram of a first embodiment of display system 302 in which reference information generation circuitry 310a and 310b jointly implement a triangulation technique to determine an estimated location of viewer 306 relative to adaptable screen assembly 322. As shown in FIG. 4, in accordance with this embodiment, reference information generation circuitry 310a includes a transmitter 406 that is operable to transmit a location tracking signal 408. Location tracking signal 408 may comprise, for example, a radio frequency (RF) signal or other wireless signal. In further accordance with the embodiment shown in FIG. 4, reference information generation circuitry 310b includes a plurality of receivers $402_1$-$402_N$ and triangulation circuitry 404 connected thereto. Receivers $402_1$-$402_N$ are operable to receive corresponding versions $410_1$-$410_N$ of location tracking signal 408. Triangulation circuitry 404 is operable to determine an estimated location of viewer 306 based on characteristics of the received versions $410_1$-$410_N$ of location tracking signal 408. For example, triangulation circuitry 404 may determine the estimated location of viewer 306 by measuring relative time delays between the received versions $410_1$-$410_N$ of location tracking signal 408, although this is only an example. The estimated location of viewer 306 is then provided by triangulation circuitry 404 to control circuitry 326 as part of the above-described reference information.

Transmitter 406 is operable to transmit location tracking signal 408 on an on-going basis. For example, transmitter 406 may be configured to automatically transmit location tracking signal 408 on a periodic or continuous basis. Alternatively, transmitter 406 may intermittently transmit location tracking signal 408 responsive to certain activities of viewer 306 or other events. Triangulation circuitry 404 is operable to calculate an updated estimate of the location of viewer 306 based on the corresponding versions $410_1$-$410_N$ of location tracking signal 408 received over time. Since reference information generation circuitry 310a comprises viewer-located circuitry, as viewer 306 moves around the viewing area in front of adaptable screen assembly 322, triangulation circuitry 404 will be able to produce updated estimates of the location of viewer 306 and provide such updated estimates to control circuitry 326. Control circuitry 326 will then cause modification of at least one of the one or more adaptable display characteristics of adaptable screen assembly 322 so that three-dimensional content will be displayed in a manner that is suitable or optimized for viewing at the current estimated location of viewer 306.

As will be understood by persons skilled in the relevant art(s), to perform the triangulation function accurately, certain positioning of and/or spacing between receivers $402_1$-$402_N$ may be required. Depending upon the implementation, each of the receivers $402_1$-$402_N$ may be included at fixed spatially-dispersed locations within a single housing and the housing may be placed in a particular location to achieve satisfactory or optimal results. Alternatively, separate housings may be used to contain different ones of receivers $402_1$-$402_N$ and may be placed at different locations in or around the viewing area to achieve satisfactory or optimal results.

FIG. 5 is a block diagram of a second embodiment of display system 302 in which reference information generation circuitry 310a and 310b jointly implement a triangulation technique to determine an estimated location of viewer 306 relative to adaptable screen assembly 322. As shown in FIG. 5, in accordance with this embodiment, reference information generation circuitry 310b includes a plurality of transmitters $502_1$-$502_N$ that are operable to transmit a corresponding location tracking signal $512_1$-$512_N$. Location tracking signals $512_1$-$512_N$ may comprise, for example, RF signals or other wireless signals. In further accordance with the embodiment shown in FIG. 5, reference information generation circuitry 310a includes a plurality of receivers $506_1$-$506_N$ and triangulation circuitry 508 connected thereto. Receivers $506_1$-$506_N$ are operable to receive corresponding location tracking signals $512_1$-$512_N$. Triangulation circuitry 508 is operable to determine an estimated location of viewer 306 based on characteristics of the received location tracking signals $512_1$-$512_N$. For example, triangulation circuitry 508 may determine the estimated location of viewer 306 by determining a distance to each of transmitters $502_1$-$502_N$ based on the location signals received therefrom, although this is only an example. The estimated location of viewer 306 is then provided by triangulation circuitry 404 to reference information generation circuitry 310b via a wired or wireless communication channel established between a transmitter 510 of reference generation circuitry 310a and a receiver 504 of reference information generation circuitry 310b. Reference information generation circuitry 310b then provides the estimated location of viewer 306 to control circuitry 326 as part of the above-described reference information.

Transmitters $502_1$-$502_N$ are operable to transmit location tracking signals $512_1$-$512_N$ on an on-going basis. For example, transmitters $502_1$-$502_N$ may be configured to automatically transmit location tracking signals $512_1$-$512_N$ on a periodic or continuous basis. Alternatively, transmitters $502_1$-$502_N$ may intermittently transmit location tracking signals $512_1$-$512_N$ responsive to certain activities of viewer 306 or other events. Triangulation circuitry 508 is operable to calculate an updated estimate of the location of viewer 306 based on the versions of location tracking signals $512_1$-$512_N$ received over time. Since reference information generation circuitry 310a comprises viewer-located circuitry, as viewer 306 moves around the viewing area in front of adaptable screen assembly 322, triangulation circuitry 508 will be able to produce updated estimates of the location of viewer 306 and provide such updated estimates to reference information generation circuitry 310b for forwarding to control circuitry 326. Control circuitry 326 will then cause modification of at least one of the one or more adaptable display characteristics of adaptable screen assembly 322 so that three-dimensional content will be displayed in a manner that is suitable or optimized for viewing at the current estimated location of viewer 306.

As will be understood by persons skilled in the relevant art(s), to perform the triangulation function accurately, certain positioning of and/or spacing between transmitters $502_1$-$502_N$ may be required. Depending upon the implementation, each of the transmitters $502_1$-$502_N$ may be included at fixed locations within a single housing and the housing may be placed in a particular location to achieve satisfactory or optimal results. Alternatively, separate housings may be used to contain different ones of transmitters $502_1$-$502_N$ and may be placed at different locations in or around the viewing area to achieve satisfactory or optimal results.

FIG. 6 is a block diagram of a further embodiment of display system 302 in which reference information generation circuitry 310a and 310b jointly implement an infrared (IR) distance measurement system to help determine an estimated location of viewer 306 relative to adaptable screen assembly 322. As shown in FIG. 6, in accordance with this embodiment, reference information generation circuitry 310b includes one or more IR light sources 602 and reference information generation circuitry 310a includes one or more IR sensors 606. IR sensor(s) 606 are configured to sense IR light 608 emitted by IR light sources 602 and to analyze characteristics associated with such light to help generate information concerning an estimated location of viewer 306 with respect to adaptable screen assembly 322. The estimated location of viewer 306 may then be provided by reference information generation circuitry 310a to reference information generation circuitry 310b via a wired or wireless communication channel established between a transmitter 608 of reference generation circuitry 310a and a receiver 604 of reference information generation circuitry 310b. Reference information generation circuitry 310b then provides the estimated location of viewer 306 to control circuitry 326 as part of the above-described reference information. Control circuitry 326 will then cause modification of at least one of the one or more adaptable display characteristics of adaptable screen assembly 322 so that three-dimensional content will be displayed in a manner that is suitable or optimized for viewing at the current estimated location of viewer 306.

In alternate implementations, the IR distance measurement system may be implemented by incorporating one or more IR light sources into reference information generation circuitry 310b and incorporating one or more IR sensors into reference information generation circuitry 310a. In a still further implementation, reference information generation circuitry 310b includes one or more IR light sources for projecting IR light toward the viewing area and one or more IR sensors for sensing IR light reflected from objects in the viewing area. Characteristics of the IR light reflected from the objects in the viewing area may then be analyzed to help estimate a current location of viewer 306. A like system could also be implemented by reference information generation circuitry 310a, except that the IR light would be projected out from the viewer's location instead of toward the viewing area. Still other IR distance measurement systems may be used to generate the aforementioned reference information.

FIG. 7 is a block diagram of a further embodiment of display system 302 in which reference information generation circuitry 310a and 310b jointly implement a magnetic field detection system to help determine an estimated location of viewer 306 relative to adaptable screen assembly 322. As shown in FIG. 7, in accordance with this embodiment, reference information generation circuitry 310a includes one or more magnetic field sources 704 and reference information generation circuitry 310b includes one or more magnetic field sensors 702. Magnetic field sensor(s) 702 are configured to sense a magnetic field(s) generated by magnetic field source(s) 704 and to analyze characteristics associated therewith to help generate information concerning an estimated location of viewer 306 with respect to adaptable screen assembly 322. The estimated location of viewer 306 may then be provided by reference information generation circuitry 310b to control circuitry 326 as part of the above-described reference information. Control circuitry 326 will then cause modification of at least one of the one or more adaptable display characteristics of adaptable screen assembly 322 so that three-dimensional content will be displayed in a manner that is suitable or optimized for viewing at the current estimated location of viewer 306. Magnetic field sensor(s) 702 may comprise active or passive magnetic field sensor(s). In alternate implementations, the magnetic field detection system may be implemented by incorporating one or more magnetic field source(s) into reference information generation circuitry 310b and incorporating one or more magnetic field sensor(s) into reference information generation circuitry 310a. Still other magnetic field detection systems may be used to generate the aforementioned reference information.

FIG. 8 is a block diagram of a further embodiment of display system 302 in which reference information generation circuitry 310a includes one or more cameras and one or more microphones for facilitating the generation of the aforementioned reference information. In particular, as shown in FIG. 8, reference information generation circuitry 310a includes one or more cameras 808, one or more microphones 810, and a transmitter 812.

Camera(s) 808 operate to capture images of the viewing environment of viewer 306 and are preferably carried or mounted on viewer 306 in such a manner so as to capture images that correspond to a field of vision of viewer 306. These images are then transmitted by transmitter 812 to a receiver 802 in reference information generation circuitry 310b via a wired or wireless communication channel. Such images are then processed by image processing circuitry 804 within reference information generation circuitry 310b. Image processing circuitry 804 may process such images to determine a current estimated location and/or head orientation of viewer 306. For example, image processing circuitry 804 may compare such images to one or more reference images in order to determine a current estimated location and/or head orientation of viewer 306. The reference images may comprise, for example, images of adaptable screen assembly 322 or other objects or points of interest normally viewable by a viewer of display system 302 captured from one or more locations and at one or more orientations within the viewing area. As another example, image processing circuitry 804 may calculate measurements associated with representations of objects or points of interest captured in such images and then compare those measurements to known measurements associated with the objects or points of interest to determine a current estimated location and/or head orientation of viewer 306. Still other techniques may be used to process such images to determine an estimated current location and/or head orientation of viewer 306. Image processing circuitry 804 then provides the estimated location and/or head orientation of viewer 306 to control circuitry 326 as part of the above-described reference information. Control circuitry 326 will then cause modification of at least one of the one or more adaptable display characteristics of adaptable screen assembly 322 so that three-dimensional content will be displayed in a manner that is suitable or optimized for viewing at the current estimated location and/or in accordance with the estimated current head orientation of viewer 306.

It is noted that the images captured by camera(s) 808 and/or processed by image processing circuitry 804 need not comprise images of the type intended for viewing by human eyes. Rather, such images may comprise images of a resolution or frequency range that is beyond the rods/cones capability of the human eye.

In a further embodiment, images of adaptable screen assembly 322 captured by camera(s) 808 are processed by image processing circuitry 804 to determine or measure one or more qualities relating to how adaptable screen assembly is currently presenting two-dimensional or three-dimensional content to viewer 306. Such qualities may include but are not limited to image sharpness, brightness, contrast, resolution, and colors. Image processing circuitry 804 provides information concerning the determined or measured qualities to control circuitry 326. If control circuitry 326 determines that a particular quality of the presentation is not acceptable, control circuitry 326 can implement changes to one or more of the adaptable display characteristics of adaptable screen assembly 322 to adjust that particular quality until it is deemed acceptable. In this manner, display system 302 can implement an image-based feedback mechanism for improving the quality of presentation of two-dimensional and three-dimensional content to a viewer.

Microphone(s) 810 included within reference information generation circuitry 310a operate to capture one or more audio signal(s) which are transmitted by transmitter 812 to receiver 802 in reference information generation circuitry 310b. Such audio signal(s) are then processed by audio processing circuitry 806 within reference information generation circuitry 310b. Audio processing circuitry 806 may process such audio signal(s) to determine a current estimated location and/or head orientation of viewer 306. For example, audio processing circuitry 806 may process such audio signal(s) to determine a direction of arrival associated with one or more known audio source(s) (e.g., speakers) located in or around the viewing environment. Such directions of arrival may then be utilized to estimate a current location and/or head orientation of viewer 306. Still other techniques may be used to process such audio signal(s) to determine an estimated current location and/or head orientation of viewer 306. Audio processing circuitry 806 then provides the estimated location and/or head orientation of viewer 306 to control circuitry 326 as part of the above-described reference information. Control circuitry 326 will then cause modification of at least one of the one or more adaptable display characteristics of adaptable screen assembly 322 so that three-dimensional content will be displayed in a manner that is suitable or optimized for viewing at the current estimated location of viewer 306.

In a further embodiment, audio signal(s) captured by microphone(s) 810 are processed by audio processing circuitry 806 to determine or measure one or more qualities relating to how a sound system (not shown in FIG. 8) associated with display system 302 is currently presenting audio content to viewer 306. Such qualities may include but are not limited to loudness, balance, surround-sound and audio spatialization performance. Audio processing circuitry 806 provides information concerning the determined or measured qualities to control circuitry 326. If control circuitry 326 determines that a particular quality of the presentation is not acceptable, control circuitry 326 can implement changes to one or more settings or characteristics of the sound system to adjust that particular quality until it is deemed acceptable. In this manner, display system 302 can implement an audio-based feedback mechanism for improving the quality of presentation of audio content to a viewer.

In a still further embodiment, microphone(s) 810 may be used to allow viewer 306 to deliver voice commands for controlling certain aspects of display system 302, including the manner in which two-dimensional and three-dimensional content is presented via adaptable screen assembly 322. In accordance with such an embodiment, audio processing circuitry 806 may comprise circuitry for recognizing and extracting such voice commands from the audio signal(s) captured by microphone(s) 810 and passing the commands to control circuitry 326. In response to receiving such commands, control circuitry 326 may cause at least one of the one or more adaptable display characteristics of adaptable screen assembly 322 relating to the presentation of two-dimensional or three-dimensional content to be modified. Such voice commands may be used for other purposes as well, including controlling what content is delivered to viewer 306 via adaptable screen assembly 322.

In the embodiment of display system 302 shown in FIG. 8, image processing circuitry 804 and audio processing circuitry 806 are shown as part of reference information generation circuitry 310b. It is noted that in alternate embodiments, such circuitry may instead be included within reference information generation circuitry 310a. In accordance with still further embodiments, image processing circuitry and/or audio processing circuitry may be distributed among reference information generation circuitry 310a and 310b.

FIG. 9 is a block diagram of a further embodiment of display system 302 in which reference information generation circuitry 310a includes a head orientation sensor 908 and eye tracking circuitry 906 for determining a head orientation and point of gaze, respectively, of viewer 306. Head orientation sensor(s) 908 may include, for example and without limitation, an accelerometer or other device designed to detect motion in three-dimensions or tilting in a two-dimensional reference plane. Eye tracking circuitry 906 may comprise any system or device suitable for tracking the motion of the eyes of a viewer to determine a point of gaze therefrom. The determined head orientation and point of gaze of viewer 306 is transmitted by a transmitter 904 included in reference information generation circuitry 310a to a receiver 902 included in reference information generation circuitry 310b via a wired or wireless communication channel. The determined head orientation and point of gaze of viewer 306 may then be provided by reference information generation circuitry 310b to control circuitry 326 as part of the above-described reference information. Control circuitry 326 will then cause modification of at least one of the one or more adaptable display characteristics of adaptable screen assembly 322 so that three-dimensional content will be displayed in a manner that is suitable or optimized for viewing by viewer 306 in light of the determined head orientation and point of gaze of viewer 306.

FIG. 10 is a block diagram of a further embodiment of display system 302 in which reference information is generated entirely by non-viewer-located reference information generation circuitry 310. As shown in FIG. 10, reference information generation circuitry 310 includes one or more camera(s) 902 and one or more microphone(s) 904.

Camera(s) 902 operate to capture images of a viewing area in front of adaptable screen assembly 322. The images may be captured using ambient light or, alternatively, reference information generation circuitry 310 may include one or more light sources (e.g., IR light sources or other types of light sources) that operate to radiate light into the viewing area so that camera(s) 902 may capture light reflected from people and objects in the viewing area. The images captured by camera(s) 902 are processed by image/audio processing circuitry 906 to determine an estimated location of viewer 306. Similarly, microphone(s) 904 operate to capture audio signals from audio sources located in and around the viewing area in front of adaptable screen assembly 322. The audio signals captured by microphone(s) 904 are also processed by image/audio processing circuitry 906 to determine an estimated location of viewer 306. Image/audio processing circuitry 906 then provides the estimated location of viewer 306 to control circuitry 326 as part of the above-described reference information. Control circuitry 326 will then cause modification of at least one of the one or more adaptable display characteristics of adaptable screen assembly 322 so that three-dimensional content will be displayed in a manner that is suitable or optimized for viewing at the current estimated location of viewer 306.

The audio signal(s) captured by microphone(s) 906 may also be processed to detect and extract voice commands uttered by viewer 306, such voice commands being executed by control circuitry 324 to facilitate viewer control over at least one of the one or more adaptable display characteristics of adaptable screen assembly 322 relating to the presentation of two-dimensional or three-dimensional content. As noted above with respect to the embodiment shown in FIG. 8, such voice commands may be used for other purposes as well, including controlling what content is delivered to viewer 306 via adaptable screen assembly 322.

The various embodiments of reference information generation circuitry described above in regard FIGS. 4-9 have been provided herein by way of example only are not intended to be limiting. Persons skilled in the relevant art(s) will appreciate that other types of reference information generation circuitry may be used to produce reference information corresponding to at least one aspect of a viewing reference of a viewer. It is further noted that certain features of the reference information generation circuitry described in regard to FIGS. 4-9 may be combined to produce additional embodiments. For example, an embodiment may utilize a combination of triangulation, IR distancing, head orientation sensing and eye tracking to generate extremely precise reference information concerning a viewing reference of a viewer.

FIG. 11 depicts an example headset 1100 that may implement various features of reference information generation circuitry 310a as described above. As shown in FIG. 11, headset 1100 includes a frame 1102 that supports a right lens 1104A and a left lens 1104B. Right lens 1104A and left lens 1104B may comprise, for example, colored, polarizing, or shuttering lenses that enable a viewer to perceive certain types of three-dimensional content delivered by certain types of screen assemblies. Thus, lenses 1104A and 1104B can be used to control how video content that is rendered to a screen assembly is perceived by a viewer. In one embodiment, frame 1102 is mounted in such a manner that it can be flipped up and away from the eyes of a viewer wearing headset 1100 when the viewer does not desire or need to use such lenses.

As further shown in FIG. 11, headset 1100 also includes a right speaker 1106A and a left speaker 1106B. Such speakers can be used to deliver audio content to a viewer of a screen assembly, wherein the audio content is related to video content displayed on the screen assembly and viewable by the viewer. Such speakers can also deliver other types of audio content as well.

Headset 1100 further includes a microphone 1102. Microphone 1102 may be used to support any of the functionality described above in reference to microphone(s) 810 of FIG. 8. In certain alternate implementations, headset 1100 may include additional microphones beyond microphone 1102.

Headset 1100 still further includes a battery compartment 1110 for housing one or more batteries. Such battery or batteries may or may not be rechargeable depending upon the implementation. In a further embodiment, headset 1100 includes an interface for connecting to an external power source. The connection to the external power source may be made to deliver power to headset 1100 as well as to recharge the battery or batteries stored in battery compartment 1110.

Headset 1100 further includes a forward housing 1102, a right-side housing 1108 and a left-side housing 1112. These housings may be used to store any number of the various types of viewer-located reference information generation circuitry described above in reference to FIGS. 4-9. For example, in one embodiment, forward housing 1102 houses one or more cameras that support any of the functionality described above in reference to camera(s) 808 of FIG. 8 and each side housing stores a transmitter or receiver used for implementing a triangulation system for determining a location of a viewer wearing headset 1100. Such compartments may also be used to house circuitry used for implementing features relating to IR distancing, magnetic field detection, head orientation sensing, eye tracking, or the like, as described above.

Headset 1100 of FIG. 11 is merely one example of how reference information generation circuitry 310a may be worn by or carried by a user. Any of a wide variety of portable or wearable articles or devices may be used. Furthermore, reference information generation circuitry 310a may be distributed among multiple articles or devices worn or carried by a viewer.

For example, FIG. 12A depicts an implementation in which reference information generation circuitry 310a is distributed among a headset 1202 and a remote control 1204, which are connected to each other by a wired communication link in the form of a cable 1206. In accordance with this example, remote control 1204 may be connected to other portions of a display system (e.g., reference information generation circuitry 310b) via a wireless communication link and act as a conduit for communication between headset 1202 and such other portions. In further accordance with this example, headset 1202 may include speakers for delivering audio content to a viewer, as well as one or more cameras, a head orientation sensor, and an eye movement tracker which support functionality for determining a location, head orientation and point of gaze of a viewer, as described above. Information generated by these components can be delivered via remote control 1204 to other components of the display system for processing and/or can be processed by components within remote control 1204. Remote control 1204 may also include circuitry for supporting the production of reference information, such as for example, receivers or transmitters used to support triangulation-based viewer location, microphones, or the like.

FIG. 12B depicts a different implementation in which reference information generation circuitry is distributed among a headset 1212 and a laptop computer 1214, which are connected to each other by a wireless communication link 1216, such as for example a Bluetooth® connection. In accordance with this example, laptop computer 1214 may be connected to other portions of a display system (e.g., reference information generation circuitry 310*b*) via a wired or wireless communication link and act as a conduit for communication between headset 1212 and such other portions. In further accordance with this example, headset 1212 may include speakers for delivering audio content to a viewer as well as a microphone for capturing voice commands from a viewer and/or other audio content. Headset 1212 may also include one or more cameras, a head orientation sensor, and an eye movement tracker that support functionality for determining a location, head orientation and point of gaze of a viewer as described above. Information generated by these components can be delivered via laptop computer 1214 to other components of the display system for processing and/or can be processed by components within laptop computer 1214. Laptop computer 1214 may also include circuitry for supporting the production of reference information, such as for example, receivers or transmitters used to support triangulation-based viewer location, additional cameras and microphones, or the like.

FIGS. 12A and 12B provide merely a few examples of how reference information generation circuitry 310*a* may be distributed among multiple articles or devices worn or carried by a viewer. These examples are not intended to be limiting. Persons skilled in the relevant art(s) will appreciate that a large number of other variations may be used.

FIG. 13 depicts a flowchart 1300 of a method for presenting three-dimensional content to a viewer in accordance with an embodiment. The method of flowchart 1300 will be described herein with continued reference to operating environment 300 and display system 302 of FIG. 3. However, the method is not limited to that environment or system.

As shown in FIG. 13, the method of flowchart 1300 begins at step 1302, in which first circuitry at least assists in producing reference information corresponding to at least one aspect of a viewing reference of a viewer. The first circuitry may comprise, for example, reference information generation circuitry 310*a* and/or reference information generation circuitry 310*b* as described above. The viewing reference of the viewer may comprise any of a number of aspects that affect how three-dimensional content displayed via an adaptable screen assembly will be perceived by the viewer. As noted above, such aspects may include, for example and without limitation, a position or location of the viewer relative to the adaptable screen assembly, a head orientation of the viewer and a point of gaze of the viewer. The reference information may be produced using any of the approaches previously described herein as well as additional approaches not described herein.

At step 1304, the reference information produced during step 1302 is provided to second circuitry and, at step 1306, the second circuitry issues one or more control signals to cause modification of at least one of one or more adaptable display characteristics of an adaptable screen assembly, the modification corresponding at least in part to the reference information. The second circuitry may comprise, for example, control circuitry 326 as described above. Such control circuitry 326 may cause the modification of the at least one of the one or more adaptable display characteristics by sending one or more suitable control signals to driver circuitry 324. The one or more adaptable display characteristics may include, but are not limited to, a configuration of an adaptable light manipulator that forms part of the adaptable screen assembly, a manner in which images are mapped to display pixels in a pixel array that forms part of the adaptable screen assembly, and/or a distance and angular alignment between such an adaptable light manipulator and such a pixel array.

FIG. 14 is a block diagram of an operating environment 1400 that includes a display system 1402 that simultaneously presents first three-dimensional content to a first viewer 1406 having a first viewing reference 1408 and second three-dimensional content to a second viewer 1410 having a second viewing reference 1412 in accordance with an embodiment. As shown in FIG. 14, display system 1402 includes an adaptable screen assembly 1422, driver circuitry 1424, control circuitry 1426, reference information generation circuitry 1410*a*, reference information generation circuitry 1410*b* and reference information generation circuitry 1410*c*.

Generally speaking, display system 1402 operates to deliver light that includes one or more viewable images to a viewing area that includes first viewer 1406 and second viewer 1410. Display system 1402 may include, for example and without limitation, a television, a projection system, a home theater system, a monitor, a computing device (e.g., desktop computer, laptop computer, tablet computer) or a handheld device (e.g., a cellular phone, smart phone, personal media player, personal digital assistant), wherein the computing device or handheld device has at least one attached or integrated display.

Adaptable screen assembly 1422 is implemented in a like manner to adaptable screen assembly 222 described above in reference to FIG. 2. Accordingly, certain display characteristics associated therewith may be modified to simultaneously present a first three-dimensional view of first content to first viewer 1406 and a second three-dimensional view of second content to second viewer 1410. Adaptable screen assemblies and manners of operating the same that can achieve this are described in the aforementioned, incorporated U.S. patent application Ser. No. 12/845,461, filed on Jul. 28, 2010 and entitled "Display Supporting Multiple Simultaneous 3D Views." Such display characteristics may include, but are not limited to, the configuration of one or more adaptable light manipulators, the manner in which images are mapped to display pixels in a pixel array, the distance between the pixel array and the adaptable light manipulator(s), the angular orientation of the adaptable light manipulator(s), and the like.

The adaptation of the display characteristics of adaptable screen assembly 1422 may be carried out, in part, by the sending coordinated drive signals to various elements (e.g., a non-uniform backlight generator, a pixel array and an adaptable light manipulator) that comprise adaptable screen assembly 1422. This function is performed by driver circuitry 1424 responsive to the receipt of control signals from control circuitry 1426. As noted in the previous section, the manner in which such coordinated drive signals may be generated is described in the aforementioned, incorporated U.S. patent application Ser. No. 12/982,031, filed on even date herewith and entitled "Coordinated Driving of Adaptable Light Manipulator, Backlighting and Pixel Array in Support of Adaptable 2D and 3D Displays."

Reference information generation circuitry 1410*a* and 1410*c* comprise components of display system 1402 that operate in conjunction to produce first reference information concerning at least one aspect of first viewing reference 1408 of first viewer 1406 with respect to adaptable screen assembly 1422. Reference information generation circuitry 1410*b* and 1410*c* comprise components of display system 1402 that operate in conjunction to produce second reference information concerning at least one aspect of second viewing reference 1412 of second viewer 1410 with respect to adaptable screen assembly 1422. First viewing reference 1408 comprises one or more aspects that affect how first three-dimensional content displayed via adaptable screen assembly 1422 will be perceived by first viewer 1406. Second viewing reference 1412 comprises one or more aspects that affect how second three-dimensional content simultaneously displayed via adaptable screen assembly 1422 will be perceived by second viewer 1410. Example aspects of a viewing reference were described above.

The first reference information produced by reference information generation circuitry 1410a and 1410c is provided to control circuitry 1426. Based on at least the first reference information, control circuitry 1426 issues one or more first control signals to driver circuitry 1424 to modify at least one of the display characteristics of adaptable screen assembly 1422. Such modification may be performed, for example, to deliver the first three-dimensional content to first viewer 1406 in accordance with one or more aspects of first viewing reference 1408. The second reference information produced by reference information generation circuitry 1410b and 1410c is also provided to control circuitry 1426. Based on at least the second reference information, control circuitry 1426 issues one or more second control signals to driver circuitry 1424 to modify at least one of the display characteristics of adaptable screen assembly 1422. Such modification may be performed, for example, to deliver the second three-dimensional content to second viewer 1410 in accordance with one or more aspects of second viewing reference 1412.

Reference information generation circuitry 1410a is intended to represent viewer-located circuitry that is situated on or near first viewer 1406 while reference information generation circuitry 1410b is intended to represent viewer-located circuitry that is situated on or near second viewer 1410. Reference information generation circuitry 1410a and 1410b may include any of the components of reference information generation circuitry 310a described above in reference to FIGS. 3-9.

Reference information generation circuitry 1410c is intended to represent circuitry that is not viewer-located. Reference information generation circuitry 1410c is configured to interact with reference information generation circuitry 1410a to determine one or more aspects of first viewing reference 1408. Such interaction may involve for example, implementing any of the techniques described above in reference to FIGS. 3-9 to estimate a location, head orientation and/or point of gaze of viewer 1406. Reference information generation circuitry 1410c is further configured to interact with reference information generation circuitry 1410b to determine one or more aspects of second viewing reference 1408. Such interaction may involve for example, implementing any of the techniques described above in reference to FIGS. 3-9 to estimate a location, head orientation and/or point of gaze of viewer 1412. By operating in this manner, reference information generation circuitry 1410a, 1410b and 1410c can produce reference information about both viewing references 1408 and 1412. Such information can be used by control circuitry to optimize the delivery of the first three-dimensional content to first viewer 1406 and the simultaneous delivery of the second three-dimensional content to second viewer 1410.

FIG. 15 depicts a flowchart 1500 of a method for simultaneously presenting first three-dimensional content to a first viewer and second three-dimensional content to a second viewer in accordance with an embodiment. The method of flowchart 1500 will be described herein with continued reference to operating environment 1400 and display system 1402 of FIG. 14. However, the method is not limited to that environment or system.

As shown in FIG. 15, the method of flowchart 1500 begins at step 1502, in which first circuitry at least assists in producing first reference information corresponding to at least one aspect of a first viewing reference of a first viewer. The first circuitry may comprise, for example, reference information generation circuitry 1410a and/or reference information generation circuitry 1410c as described above. The first viewing reference of the first viewer may comprise any of a number of aspects that affect how first three-dimensional content displayed via an adaptable screen assembly will be perceived by the first viewer. As noted above, such aspects may include, for example and without limitation, a position or location of the first viewer relative to the adaptable screen assembly, a head orientation of the first viewer and a point of gaze of the first viewer. The first reference information may be produced using any of the approaches previously described herein as well as additional approaches not described herein.

At step 1504, the first reference information produced during step 1502 is provided to second circuitry and, at step 1506, the second circuitry issues one or more first control signals to cause modification of at least one of one or more adaptable display characteristics of an adaptable screen assembly based on at least the first reference information. The second circuitry may comprise, for example, control circuitry 1426 as described above. The one or more adaptable display characteristics may include, but are not limited to, a configuration of one or more adaptable light manipulators that form part of the adaptable screen assembly, a manner in which images are mapped to display pixels in a pixel array that forms part of the adaptable screen assembly, a distance between such pixel array and such adaptable light manipulator(s), an angular orientation of such adaptable light manipulator(s), and the like.

At step 1508, third circuitry at least assists in producing second reference information corresponding to at least one aspect of a second viewing reference of a second viewer. The third circuitry may comprise, for example, reference information generation circuitry 1410b and/or reference information generation circuitry 1410c as described above. The second viewing reference of the second viewer may comprise any of a number of aspects that affect how second three-dimensional content that is simultaneously displayed with the first three-dimensional content by the adaptable screen assembly will be perceived by the second viewer. As noted above, such aspects may include, for example and without limitation, a position or location of the second viewer relative to the adaptable screen assembly, a head orientation of the second viewer and a point of gaze of the second viewer. The second reference information may be produced using any of the approaches previously described herein as well as additional approaches not described herein.

At step 1510, the second reference information produced during step 1508 is provided to the second circuitry and, at step 1512, the second circuitry issues one or more second control signals to cause modification of at least one of the one or more adaptable display characteristics of the adaptable screen assembly based on the second reference information.

As noted above, display system 1402 is capable of simultaneously presenting first three-dimensional content to first viewer 1406 having first viewing reference 1408 and second three-dimensional content to second viewer 1410 having second viewing reference 1412. In accordance with such an embodiment, it may be desirable to ensure that each viewer is being delivered audio content that accords with the particular three-dimensional content they are currently viewing. To this end, in accordance with one embodiment, viewer-located reference information generation circuitry 1410a includes or is combined with audio circuitry that delivers first audio content to first viewer 1406 and viewer-located reference information generation circuitry 1410b includes or is combined with audio circuitry that simultaneously delivers second audio content to second viewer 1410 that is different than the first audio content. For example, the first audio content may comprise audio content associated with the first three-dimensional content that is being viewed by first viewer 1406 and the second audio content may comprise audio content associated with the second three-dimensional content that is being viewed by second viewer 1410. If such audio content is delivered via a headset, earbuds, or other device, each viewer may hear their own audio content without having to hear the audio content being delivered to the other viewer.

By way of further illustration, FIG. 16 depicts a flowchart 1600 of a method for delivering audio content to first and second viewers of a display capable of simultaneously presenting first video content to the first viewer and second video content to the second viewer. As shown in FIG. 16, the method of flowchart 1600 begins at step 1602 in which first audio content is delivered to first viewer-located circuitry (e.g., reference information generation circuitry 1410a of FIG. 14) carried by the first viewer of the display, the first audio content being associated with the first video content. At step 1604, second audio content is simultaneously delivered to second viewer-located circuitry (e.g., reference information generation circuitry 1410b of FIG. 14) carried by the second viewer of the display, the second audio content being associated with the second video content.

By providing separate channels for routing audio to first and second viewers 1406 and 1410, other benefits may be achieved. For example, first and second viewers 1406 and 1410 may each view the same video content but customize the corresponding audio content that is being delivered thereto in one or more ways including but not limited to content (e.g., choice of language) and audio settings (e.g., volume, mono vs. stereo sound, two-dimensional vs. three-dimensional audio, equalizer settings or the like). The customizations applied to the audio content delivered to first viewer 1406 need not be applied to the audio content delivered to second viewer 1410 and vice versa.

III. Example Display System Implementations

Example implementations of a display system in accordance with an embodiment will now be described. The exemplary embodiments described in this section may be used to implement display system 302 described above in reference to FIG. 3 and display system 1402 described above in reference to FIG. 14. Such example implementations may include display elements that enable multiple two-dimensional and three-dimensional viewing configurations. For example, as will be discussed below, such example implementations may include an adaptable light manipulator and pixel array, or an adaptable light manipulator, pixel array and non-uniform light generator.

A. Example Display Systems Using Adaptable Parallax Barriers

FIG. 17 is a block diagram of a display system 1700 that utilizes an adaptable parallax barrier to support multiple viewing configurations in accordance with an embodiment. As shown in FIG. 17, display system 1700 includes driver circuitry 1702 and a screen 1704, wherein screen 1704 include a pixel array 1722 and an adaptable parallax barrier 1724. As further shown in FIG. 17, driver circuitry 1704 includes pixel array driver circuitry 1712 and adaptable parallax barrier driver circuitry 1714.

Pixel array 1722 comprises a two-dimensional array of pixels (e.g., arranged as a grid or other distribution). Pixel array 1722 is a self-illuminating or light-generating pixel array such that the pixels of pixel array 1722 each emit light included in light 1732. Each pixel may be a separately addressable light source (e.g., a pixel of a plasma display, an LCD display, an LED display such as an OLED display, or of other type of display). Each pixel of pixel array 1722 may be individually controllable to vary color and intensity. In an embodiment, each pixel of pixel array 1722 may include a plurality of sub-pixels that correspond to separate color channels, such as a trio of red, green, and blue sub-pixels included in each pixel.

Adaptable parallax barrier 1724 is positioned proximate to a surface of pixel array 1722. Barrier element array 1742 is a layer of adaptable parallax barrier 1724 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 1742 may be configured such that light 1732 emanating from pixel array 1722 is filtered to produce filtered light 1734, wherein filtered light 1734 includes one or more two-dimensional and/or three-dimensional images that may be viewed by viewers 1736 in a viewing space 1706.

Depending upon the implementation, each barrier element may have a round, square, or rectangular shape, and barrier element array 1742 may have any number of rows of barrier elements that extend a vertical length of barrier element array 1742. In another embodiment, each barrier element may have a "band" shape that extends a vertical length of barrier element array 1742, such that barrier element array 1742 includes a single horizontal row of barrier elements. Each barrier element may include one or more of such bands, and different regions of barrier element array 1742 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 1702 receives control signals 1708 from control circuitry (not shown in FIG. 17). The control signals 1708 cause driver circuitry 1702 to place screen 1704 in a selected one of a plurality of different viewing configurations. In particular, based on control signals 1708, adaptable parallax barrier driver circuitry 1714 transmits drive signals 1754 that cause barrier element array 1742 to be placed in a state that supports the selected viewing configuration. The selected viewing configuration may be a particular two-dimensional viewing configuration, a particular three-dimensional viewing configuration, or a viewing configuration that supports the display of different types of two-dimensional and/or three-dimensional content in corresponding display regions.

For example, FIG. 18 shows an arrangement of an adaptable parallax barrier 1800 that supports a particular three-dimensional viewing configuration. Adaptable parallax barrier 1800 is an example of adaptable parallax barrier 1724 of FIG. 17. As shown in FIG. 18, adaptable parallax barrier 1800 includes a barrier element array 1802, which includes a plurality of barrier elements 1804 arranged in a two-dimensional array. Furthermore, as shown in FIG. 18, barrier element array 1802 includes a plurality of parallel strips of barrier elements 1804 that are selected to be non-blocking to form a plurality of parallel non-blocking strips (or "slits") 1806a-1806g. As shown in FIG. 18, parallel non-blocking strips 1806a-1806g (non-blocking slits) are alternated with parallel blocking strips 1808a-1808g of barrier elements 1804 that are selected to be blocking. In the example of FIG. 18, non-blocking strips 1806a-1806g and blocking strips 1808a-1808g each have a width (along the x-dimension) of two barrier elements 1804, and have lengths that extend along the entire y-dimension (twenty barrier elements 1804) of barrier element array 1802, although in other embodiments, may have alternative dimensions. Non-blocking strips 1806a-1806g and blocking strips 1808a-1808g form a parallax barrier configuration for adaptable parallax barrier 1800. The spacing (and number) of parallel non-blocking strips 1806 in barrier element array 1802 may be selectable by choosing any number and combination of particular strips of barrier elements 1804 in barrier element array 1802 to be non-blocking, to be alternated with blocking strips 1808, as desired. For example, hundreds, thousands, or even larger numbers of non-blocking strips 1806 and blocking strips 1808 may be present in adaptable parallax barrier 1800.

FIG. 19 shows an alternative example of an adaptable parallax barrier 1900 that has also been configured to support a particular three-dimensional viewing configuration. Similarly to adaptable parallax barrier 1800 of FIG. 18, adaptable parallax barrier 1900 includes a barrier element array 1902, which includes a plurality of barrier elements 1904 arranged in a two-dimensional array (28×1 array). Barrier elements 1904 have widths (along the x-dimension) similar to the widths of barrier elements 1804 in FIG. 18, but have lengths that extend along the entire vertical length (y-dimension) of barrier element array 1902. As shown in FIG. 19, barrier element array 1902 includes parallel non-blocking strips 1906a-1906g alternated with parallel blocking strips 1908a-1908g. In the example of FIG. 19, parallel non-blocking strips 1906a-1906g and parallel blocking strips 1908a-1908g each have a width (along the x-dimension) of two barrier elements 1904, and have lengths that extend along the entire y-dimension (one barrier element 1904) of barrier element array 1902.

Each of adaptable parallax barriers 1800 and 1900, configured in the manner shown in FIGS. 18 and 19 respectively, filter light produced by a pixel array to form one or more three-dimensional views in a viewing space, thus supporting a three-dimensional viewing configuration. To achieve a two-dimensional viewing configuration, all of the barrier elements of either adaptable parallax barrier 1800 or 1900 can simply be placed in a non-blocking state. Additional details concerning how the adaptable parallax barriers operate to support such three-dimensional viewing may be found, for example, in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions."

In the adaptable parallax barrier configurations shown in FIGS. 18 and 19, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

For instance, FIG. 20 shows an arrangement of an adaptable parallax barrier 2000 that supports a viewing configuration that mixes two-dimensional and three-dimensional viewing regions according to example embodiments. Adaptable parallax barrier 2000 is similar to adaptable parallax barrier 1800 of FIG. 18, having barrier element array 1802 including a plurality of barrier elements 1804 arranged in a two-dimensional array. In FIG. 20, a first region 2002 of barrier element array 2002 includes a plurality of parallel non-blocking strips alternated with parallel blocking strips that together fill first region 2002. A second region 2004 of barrier element array 2002 is surrounded by first region 2002. Second region 2004 is a rectangular shaped region of barrier element array 1802 that includes a two-dimensional array of barrier elements 1804 that are non-blocking. Thus, in FIG. 20, barrier element array 1802 is configured to enable a three-dimensional image to be generated by pixels of a pixel array that are adjacent to barrier elements of first region 2002, and to enable a two-dimensional image to be generated by pixels of the pixel array that are adjacent to barrier elements inside of second region 2004. Note that alternatively, first region 2002 may include all non-blocking barrier elements 1802 to pass a two-dimensional image, and second region 2004 may include parallel non-blocking strips alternated with parallel blocking strips to pass a three-dimensional image. In further embodiments, adaptable parallax barrier 2000 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

For example, FIG. 21 shows an arrangement of an adaptable parallax barrier 2100 in which transparent slits have different orientations, according to an example embodiment. Adaptable parallax barrier 2100 is similar to adaptable parallax barrier 1800 of FIG. 18, having barrier element array 1802 including a plurality of barrier elements 1804 arranged in a two-dimensional array. A first region 2110 (e.g., a bottom half) of barrier element array 1802 includes a first plurality of parallel strips of barrier elements 1804 that are selected to be non-blocking to form a first plurality of parallel non-blocking strips 2102a-2102e (each having a width of two barrier elements 1804). As shown in FIG. 21, parallel non-blocking strips 2102a-2102e are alternated with parallel blocking strips 2104a-2104f of barrier elements 1804 (each having a width of three barrier elements 1804). Parallel non-blocking strips 2102a-2102e are oriented in a first direction (e.g., along a vertical axis).

Furthermore, as shown in FIG. 21, a second region 2112 (e.g., a top half) of barrier element array 1802 includes a second plurality of parallel strips of barrier elements 1804 that are selected to be non-blocking to form a second plurality of parallel non-blocking strips 2106a-2106d (each having a width of one barrier element 1804). As shown in FIG. 21, parallel non-blocking strips 2106a-2106d are alternated with parallel blocking strips 2108a-2108c of barrier elements 1804 (each having a width of two barrier elements 1804). Parallel non-blocking strips 2106a-2106d are oriented in a second direction (e.g., along a horizontal axis).

As such, in FIG. 21, first and second pluralities of parallel non-blocking strips 2102a-2102e and 2106a-2106d are present in barrier element array 1802 that are oriented perpendicularly to each other. The region of barrier element array 1802 that includes first plurality of parallel non-blocking strips 2102a-2102e may be configured to deliver a three-dimensional image in a viewing space to be viewable by a user whose body is oriented vertically (e.g., sitting upright or standing up). The region of barrier element array 1802 that includes second plurality of parallel non-blocking strips 2106a-2106d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

The foregoing adaptable parallax barriers and arrangements thereof have been described herein by way of example only. Additional adaptable parallax barriers and arrangements thereof may be used to support additional viewing configurations. For example, additional adaptable parallax barrier implementations and arrangements thereof are described in the aforementioned, incorporated U.S. patent application Ser. No. 12/845,440 filed on Jul. 28, 2010, and entitled "Adaptable Parallax Barrier Supporting Mixed 2D and Stereoscopic 3D Display Regions," and in the aforementioned, incorporated U.S. patent application Ser. No. 12/845,461, filed on Jul. 28, 2010, and entitled "Display Supporting Multiple Simultaneous 3D Views."

Returning now to the description of display system 1700 of FIG. 17, since a configuration of adaptable parallax barrier 1724 can be dynamically modified to support a particular viewing configuration, pixel array 1722 must also be controlled to support the same viewing configuration. In particular, the rendering of pixels of an image (also referred to herein as "image pixels") among the pixels of pixel array 1722 (also referred to herein as "display pixels") must be handled in a manner that is consistent with a current configuration of adaptable parallax barrier 1724. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 1724. Such changes may be implemented by a controller (not shown in FIG. 17) via delivery of appropriate control signals 1708 to pixel array driver circuitry 1712.

For example, in one embodiment, when a configuration of adaptable parallax barrier 1724 supports a first viewing configuration responsive to control signals 1708, pixel array driver circuitry 1712 sends drive signals 1752 in conformance with control signals 1708 such that the rendering of images to pixel array 1722 occurs in a manner that also supports the first viewing configuration. Furthermore, when the configuration of adaptable parallax barrier 1724 is modified to support a second viewing configuration responsive to control signals 1708, pixel array driver circuitry 1712 sends drive signals 1752 in conformance with the control signals 1708 such that the rendering of images to pixel array 1722 occurs in a manner that also supports the second viewing configuration.

FIG. 22 depicts a flowchart 2200 of an example method for controlling a pixel array to support the same viewing configuration as an adaptable light manipulator (such as adaptable parallax barrier 1724) in accordance with an embodiment. As shown in FIG. 22, the method of flowchart 2200 begins at step 2202. During step 2202, a configuration of an adaptable light manipulator, such as adaptable parallax barrier 1724, is modified. At step 2204, a number of display pixels in a pixel array, such as pixel array 1722, that represents each image pixel of a plurality of image pixels is changed in response to modifying the configuration of the adaptable light manipulator.

FIGS. 24 and 25 provide a simple illustration of an application of the method of flowchart 2200. As shown in FIG. 24, a portion of a pixel array 2400 includes a 16×16 array of display pixels. An example display pixel is shown as display pixel 2402. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 2404. In FIG. 24, the first image is intended to represent an image that is viewed when an adaptable light manipulator disposed proximate to the pixel array is configured to support a two-dimensional viewing configuration.

FIG. 25 is intended to represent the same portion of pixel array 2400 after the configuration of the adaptable light manipulator has been changed to support a three-dimensional viewing configuration. The three-dimensional viewing configuration requires the combined display of a first image and a second image across the same portion of pixel array 2400. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

FIG. 23 depicts a flowchart 2300 of another example method for controlling a pixel array to support the same viewing configuration as an adaptable light manipulator (such as adaptable parallax barrier 1724) in accordance with an embodiment. As shown in FIG. 23, the method of flowchart 2300 begins at step 2302. During step 2302, a plurality of image pixels is mapped to a plurality of respective first subsets of display pixels in a pixel array, such as pixel array 1722. At step 2304, a configuration of an adaptable light manipulator that is positioned proximate to the pixel array is changed. For example, in an embodiment in which the adaptable light manipulator includes adaptable parallax barrier 1724, a slit pattern, orientation, or the like, of adaptable parallax barrier 1724 may be changed. At step 2306, a mapping of the plurality of image pixels is changed from the plurality of respective first subsets of the display pixels to a plurality of respective second subsets of the display pixels in the pixel array to compensate for changing the configuration of the adaptable light manipulator.

FIGS. 25 and 26 provide a simple illustration of an application of the method of flowchart 2300. As shown in FIG. 25, a portion of a pixel array 2400 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 26 is intended to represent the same portion of pixel array 2400 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 26. Thus, for example, rather than rendering image pixel 2504 to the bottom-most two display pixels in the far-left column of array portion 2400, the same image pixel 2504 is now rendered to the bottom-most two display pixels in the second column from the left of array portion 2400.

Numerous other methods may be used to control the rendering of image pixels to display pixels in support of a desired two-dimensional and/or three-dimensional viewing configuration implemented by an adaptable parallax barrier or other adaptable light manipulator. Additional details concerning such control of a pixel array may be found in aforementioned, incorporated U.S. patent application Ser. No. 12/774,225, filed on May 5, 2010, and entitled "Controlling a Pixel Array to Support an Adaptable Light Manipulator."

FIG. 27 shows a block diagram of an example display system 2700, which is another example of a display system that utilizes an adaptable parallax barrier to support multiple viewing configurations. As shown in FIG. 27, display system 2700 includes driver circuitry 2702 and a screen 2704, wherein screen 2704 include a light generator 2722, an adaptable parallax barrier 2724 and a pixel array 2726. As further shown in FIG. 27, driver circuitry 2702 includes light generator driver circuitry 2712, adaptable parallax barrier driver circuitry 2714 and pixel array driver circuitry 2716.

Light generator 2722 emits light 2732. Adaptable parallax barrier 2724 is positioned proximate to light generator 2722. Barrier element array 2744 is a layer of adaptable parallax barrier 2724 that includes a plurality of barrier elements or blocking regions arranged in an array. Each barrier element of the array is configured to be selectively opaque or transparent. Barrier element array 2744 filters light 2732 received from light generator 2722 to generate filtered light 2734. Filtered light 2734 is configured to enable a two-dimensional image or a three-dimensional image (e.g., formed by a pair of two-dimensional images in filtered light 2734) to be formed based on images subsequently imposed on filtered light 2734 by pixel array 2726.

Pixel array 2726 includes a two-dimensional array of pixels (e.g., arranged in a grid or other distribution) like pixel array 1722 of FIG. 17. However, pixel array 2726 is not self-illuminating, and instead is a light filter that imposes images (e.g., in the form of color, grayscale, etc.) on filtered light 2734 from adaptable parallax barrier 2724 to generate filtered light 2736 to include one or more images. Each pixel of pixel array 2726 may be a separately addressable filter (e.g., a pixel of a plasma display, an LCD display, an LED display, or of other type of display). Each pixel of pixel array 2726 may be individually controllable to vary the color imposed on the corresponding light passing through, and/or to vary the intensity of the passed light in filtered light 2736. In an embodiment, each pixel of pixel array 726 may include a plurality of sub-pixels that correspond to separate color channels, such as a trio of red, green, and blue sub-pixels included in each pixel.

Driver circuitry 2702 receives control signals 2708 from control circuitry (not shown in FIG. 27). The control signals 2708 cause driver circuitry 2702 to place screen 2704 in a selected one of a plurality of different viewing configurations. In particular, based on control signals 2708, adaptable parallax barrier driver circuitry 2714 transmits drive signals 2754 that cause barrier element array 2744 to be placed in a state that supports the selected viewing configuration. Likewise, based on control signals 2708, pixel array driver circuitry 2716 transmits drive signals 2756 to cause pixels of one or more images (also referred to herein as "image pixels") to be rendered among the pixels of pixel array 2726 (also referred to herein as "display pixels") in a manner that is consistent with a current configuration of adaptable parallax barrier 2724. The selected viewing configuration may be a particular two-dimensional viewing configuration, a particular three-dimensional viewing configuration, or a viewing configuration that supports the display of different types of two-dimensional and/or three-dimensional content in different display regions.

As discussed in aforementioned, incorporated U.S. patent application Ser. No. 12/982,020, filed on even date herewith and entitled "Backlighting Array Supporting Adaptable Parallax Barrier," conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions," the use of a conventional backlight will result in a disparity in perceived brightness between the different simultaneously-displayed regions. This is because the number of visible pixels per unit area associated with a two-dimensional region will generally exceed the number of visible pixels per unit area associated with a particular three-dimensional or multi-view three-dimensional region (in which the pixels must be partitioned among different eyes/views).

To address this issue, light generator 2722 includes a backlight array 2742 which is a two-dimensional array of light sources. Such light sources may be arranged, for example, in a rectangular grid. Each light source in backlight array 2742 is individually addressable and controllable to select an amount of light emitted thereby. A single light source may comprise one or more light-emitting elements depending upon the implementation. In one embodiment, each light source in backlight array 2742 comprises a single light-emitting diode (LED) although this example is not intended to be limiting.

The amount of light emitted by the individual light sources that make up backlight array 2742 can selectively controlled by drive signals 2752 generated by light generator driver circuitry 2712 so that the brightness associated with each of a plurality of display regions of screen 2704 can also be controlled. This enables display system 2700 to provide a desired brightness level for each display region automatically and/or in response to user input. For example, backlight array 2742 can be controlled such that a uniform level of brightness is achieved across different simultaneously-displayed display regions, even though the number of perceptible pixels per unit area varies from display region to display region. As another example, backlight array 2742 can be controlled such that the level of brightness associated with a particular display region is increased or reduced without impacting (or without substantially impacting) the brightness of other simultaneously-displayed display regions.

To help illustrate this, FIG. 28 provides an exploded view of a display system 2800 that implements a controllable backlight array as described immediately above. Display system 2800 comprises one implementation of display system 2700. As shown in FIG. 28, display system 2800 includes a light generator 2802 that includes a backlight array 2812, an adaptable parallax barrier 2804 that includes a barrier element array 2822 and a display panel 2806 that includes a pixel array

2832. These elements may be aligned with and positioned proximate to each other to create an integrated display screen.

In accordance with the example configuration shown in FIG. 28, a first portion 2834 of pixel array 2832 and a first portion 2824 of barrier element array 2822 have been manipulated to create a first display region that displays multi-view three-dimensional content, a second portion 2836 of pixel array 2832 and a second portion 2826 of barrier element array 2822 have been manipulated to create a second display region that displays a three-dimensional image, and a third portion of 2838 of pixel array 2832 and a third portion 2828 of barrier element array 2822 have been manipulated to create a third display region that displays a two-dimensional image. To independently control the brightness of each of the first, second and third display regions, the amount of light emitted by light sources included within a first portion 2814, a second portion 2816 and a third portion 2818 of backlight array 2812 can respectively be controlled. For example, the light sources within first portion 2814 may be controlled to provide greater luminosity than the light sources within second portion 2816 and third portion 2818 as the number of perceivable pixels per unit area will be smallest in the first display region with which first portion 2814 is aligned. In further accordance with this example, the light sources within second portion 2816 may be controlled to provide greater luminosity than the light sources within third portion 2818 since the number of perceivable pixels per unit area will be smaller in the second display region with which second portion 2816 is aligned than the third display region with which third portion 2818 is aligned. Of course, if uniform luminosity is not desired across the various display regions then other control schemes may be used.

Of course, the arrangement shown in FIG. 28 provides only a single teaching example. It should be noted that a display system in accordance with an embodiment can dynamically manipulate pixel array 2832 and barrier element array 2822 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 2812 can also be dynamically manipulated in a coordinated fashion with pixel array 2832 and barrier element array 2822 to ensure that each display region is perceived at a desired level of brightness.

In the arrangement shown in FIG. 28, there is a one-to-one correspondence between each light source in backlight array 2812 and every display pixel in pixel array 2832. However, this need not be the case to achieve regional brightness control. For example, in certain embodiments, the number of light sources provided in backlight array 2812 is less than the number of pixels provided in pixel array 2832. For instance, in one embodiment, a single light source may be provided in backlight array 2812 for every N pixels provided in pixel array 2832, wherein N is an integer greater than 1. In an embodiment in which the number of light sources in backlight array 2812 is less than the number of pixels in pixel array 2832, each light source may be arranged so that it provides backlighting for a particular group of pixels in pixel array 2832, although this is only an example. In alternate embodiments, the number of light sources provided in backlight array 2812 is greater than the number of pixels provided in pixel array 2832.

Also, in the examples described above, light sources in backlight array 2812 are described as being individually controllable. However, in alternate embodiments, light sources in backlight array 2812 may only be controllable in groups. This may facilitate a reduction in the complexity of the control infrastructure associated with backlight array 2812. In still further embodiments, light sources in backlight array 2812 may be controllable both individually and in groups.

It is also noted that although FIGS. 27 and 28 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 29. In particular, FIG. 29 is a block diagram of a display system 2900 that includes a pixel array 2924 disposed between a light generator 2922 that includes a backlight array 2942 and an adaptable parallax barrier 2926 that includes a barrier element array 2944 to support the generation of two-dimensional and/or three-dimensional images perceivable in a viewing space 2906. In such alternate implementations, selective control of the luminosity of groups or individual ones of the light sources in backlight array 2942 may also be used to vary the backlighting luminosity associated with different display regions created by the interaction of backlight array 2942, pixel array 2924 and barrier element array 2944.

Other example display system implementations that utilize a backlight array of independently-controllable light sources are described in the aforementioned, incorporated U.S. patent application Ser. No. 12/982,020, filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 30 provides an exploded view of a display system 3000 that implements a regional brightness control scheme based on pixel intensity as described immediately above. As shown in FIG. 30, display system 3000 includes a display panel 3002 and an adaptable parallax barrier 3004. Display system 3000 also includes a backlight panel, although this element is not shown in FIG. 30. These elements may be aligned with and positioned proximate to each other to create an integrated display screen.

As further shown in FIG. 30, display panel 3002 includes a pixel array 3012. Each of the pixels in a first portion 3014 of pixel array 3012 is individually controlled by pixel array driver circuitry to pass a selected amount of light produced by a backlight panel (not shown in FIG. 30), thereby producing display-generated light representative of a single two-dimensional image. Each of the pixels in a second portion 3016 of pixel array 3012 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 3000, will be perceived as a single three-dimensional image.

Adaptable parallax barrier 3004 includes barrier element array 3022 that includes a first portion 3024 and a second portion 3026. Barrier element array 3022 is aligned with pixel array 3014 such that first portion 3024 of blocking region array 3022 overlays first portion 3014 of pixel array 3012 and second portion 3026 of blocking region array 3022 overlays second portion 3016 of pixel array 3012. Adaptable parallax barrier driver circuitry causes all the barrier elements within first portion 3024 of barrier element array 3022 to be transparent. Thus, the two-dimensional image generated by the pixels of first portion 3014 of pixel array 3012 will simply be passed through to a viewer in a viewing space in front of display system 3000. Furthermore, the adaptable parallax barrier driver circuitry manipulates the barrier elements within second portion 3026 of blocking region array 3022 to form a plurality of parallel transparent strips alternated with parallel opaque strips, thereby creating a parallax effect that enables the two two-dimensional images generated by the pixels of second portion 3016 of pixel array 3012 to be perceived as a three-dimensional image by a viewer in the viewing space in front of display system 3000.

Assume that a viewer is positioned such that he/she can perceive both the two-dimensional image passed by first portion 3024 of barrier element array 3022 and the three-dimensional image formed through parallax by second portion 3026 of barrier element 3022. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 3012.

To address this issue, drive signals may be transmitted to display panel 3002 that selectively cause the pixels included in first portion 3014 of pixel array 3012 to pass less light from the backlight panel (i.e., become less intense), thereby reducing the brightness of the two-dimensional image produced from the pixels in first portion 3014 of pixel array 3012. Alternatively or additionally, drive signals may be transmitted to display panel 3002 that selectively cause the pixels included in second portion 3016 of pixel array 3012 to pass more light from the backlight panel (i.e., become more intense), thereby increasing the brightness of the three-dimensional image produced from the pixels in second portion 3016 of pixel array 3012. By controlling the intensity of the pixels in portions 3014 and 3016 of pixel array 3012 in this manner, the brightness of the two-dimensional image produced from the pixels in first portion 3014 of pixel array 3012 and the brightness of the three-dimensional image produced from the pixels in second portion 3016 of pixel array 3012 can be kept consistent. Additionally, by providing independent control over the intensity of the pixels in portions 3014 and 3016 of pixel array 3012, independent control over the brightness of the two-dimensional and three-dimensional images generated therefrom can also be achieved.

Of course, the arrangement shown in FIG. 30 provides only a single teaching example. It should be noted that a display system in accordance with an embodiment can dynamically manipulate pixel array 3012 and blocking element array 3022 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 3012 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 31. FIG. 31 illustrates a front perspective view of a display panel 3100. Display panel 3100 includes a pixel array 3102 that includes a first portion 3104 and a second portion 3106, wherein each of first portion 3104 and second portion 3106 includes a different subset of the pixels in pixel array 3102. It is to be assumed that first portion 3104 of pixel array 3102 is illuminated by backlighting provided by an aligned first portion of a backlight array (not shown in FIG. 31), wherein the backlight array is similar to backlight array 2742 described above in reference to FIG. 27. Second portion 3106 of pixel array 3102 is illuminated by backlighting provided by an aligned second portion of the backlight array. In one example the amount of light emitted by each light source in the second portion of the backlight array to illuminate second portion 3106 of pixel array 3102 is controlled such that it is greater than the amount of light emitted by each light source in the first portion of the backlight array to illuminate first portion 3104 of pixel array 3102. This control scheme may be applied, for example, to cause a three-dimensional image formed by interaction between the pixels in second portion 3106 of pixel array 3102 and an adaptable parallax barrier to appear to have a uniform brightness level with respect to a two-dimensional image formed by interaction between the pixels in first portion 3104 of pixel array 3104 and the adaptable parallax barrier.

However, the difference in the amount of light emitted by each light source in the first and second portions of the backlight array to illuminate corresponding first and second portions 3104 and 3106 of pixel array 3102 may also give rise to undesired visual artifacts. In particular, the difference may cause pixels in boundary areas immediately outside of second portion 3106 of pixel array 3102 to appear brighter than desired in relation to other pixels in first portion 3104 of pixel array 3102. For example, as shown in FIG. 31, the pixels in boundary area 3112 immediately outside of second portion 3106 of pixel array 3102 may appear brighter than desired in relation to other pixels in first portion 3104 of pixel array 3102. This may be due to the fact that the increased luminosity provided by the light sources in the second portion of the backlight array has "spilled over" to impact the pixels in boundary area 3112, causing those pixels to be brighter than desired. Conversely, the difference may cause pixels in boundary areas immediately inside of second portion 3106 of pixel array 3102 to appear dimmer than desired in relation to other pixels in second portion 3106 of pixel array 3102. For example, as shown in FIG. 31, the pixels in boundary area 3114 immediately inside of second portion 3106 of pixel array 3102 may appear dimmer than desired in relation to other pixels in second portion 3106 of pixel array 3102. This may be due to the fact that the reduced luminosity of the light sources in the first portion of the backlight array has "spilled over" to impact the pixels in boundary area 3114, causing those pixels to be dimmer than desired.

To address this issue, an embodiment may selectively control the amount of light passed by the pixels located in boundary region 3112 or boundary region 3114 to compensate for the undesired visual effects. For example, driver circuitry associated with pixel array 3102 may selectively cause the pixels included in boundary area 3112 of pixel array 3102 to pass less light from the backlight panel (i.e., become less intense), thereby reducing the brightness of the pixels in boundary area 3112, thus compensating for an undesired increase in brightness due to "spill over" from light sources in the second portion of the backlight array. Alternatively or additionally, driver circuitry associated with pixel array 3102 may selectively cause the pixels included in boundary area 3114 of pixel array 3102 to pass more light from the backlight panel (i.e., become more intense), thereby increasing the brightness of the pixels in boundary area 3114, thus compensating for an undesired reduction in brightness due to "spill over" from light sources in the first portion of the backlight array. By controlling the intensity of the pixels in boundary areas 3112 and 3114 in this manner, the undesired visual effects described above that can arise from the use of a backlight array to provide regional brightness control can be mitigated or avoided entirely.

The illustration provided in FIG. 31 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Display system 1700 described above in reference to FIG. 17 may be representative of such a system, provided that pixel array 1722 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of display system 1700 can also be controlled. This enables display system 1700 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multiview three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier itself.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 32 illustrates two exemplary configurations of an adaptable light manipulator 3200 that includes an adaptable parallax barrier and a brightness regulation overlay implemented as a light manipulating LCD sandwich with manipulator grayscale pixels. In FIG. 32, the grayscale pixels map to the display pixels on a one-to-one basis, but that need not be the case.

A first exemplary configuration of adaptable light manipulator 3200 is shown above the section line denoted with reference numeral 3202. In accordance with the first exemplary configuration, a three-dimensional region 3204 is created with fully transparent or fully opaque manipulator pixels that provide parallax barrier functionality and a two-dimensional region 3206 is created having continuous medium gray manipulator pixels. The medium gray manipulator pixels operate to reduce the perceived brightness of two-dimensional region 3206 to better match that of three-dimensional region 3204. It is noted that in other example configurations, two-dimensional region 3206 could instead comprise a three-dimensional region having a number of views that is different than three-dimensional region 3204, thus also requiring brightness regulation.

In the first exemplary configuration, no boundary region compensation is performed. In the second exemplary configuration, which is shown below section line 3202, boundary region compensation is performed. For example, a boundary region 3210 within two-dimensional region 3206 may be "lightened" to a light gray to compensate for any diminution of light that might occur near the boundary with three-dimensional region 3204. In contrast, the grayscale level of an inner portion 3208 of two-dimensional region 3206 is maintained at the same medium gray level as in the portion of two-dimensional region 3206 above section line 3202. As a further example, a first boundary region 3212 and a second boundary region 3214 within three-dimensional region 3204 comprise darker and lighter gray transitional areas, respectively, to account for light dispersion from two-dimensional region 3206. In contrast, an inner portion 3216 of three-dimensional region 3204 includes only fully transparent or fully opaque manipulator pixels consistent with a parallax barrier configuration and no brightness regulation.

In one embodiment, the configuration of adaptable light manipulator 3200 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 3200 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 32), adaptable light manipulator 3200 is implemented as an integrated adaptable parallax barrier and brightness regulation overlay. However, in alternate embodiments, adaptable light manipulator 3200 is implemented using an adaptable parallax barrier panel and an independent brightness regulation overlay panel.

B. Example Display Systems Using Adaptable Lenticular Lenses

In display systems in accordance with further embodiments, rather than using an adaptable parallax barrier to perform light manipulation in support of multiple viewing configurations, an adaptable lenticular lens may be used. For example, with respect to example display system 1700 of FIG. 17, adaptable parallax barrier 1724 may be replaced with an adaptable lenticular lens. Likewise, with respect to example display system 2900 of FIG. 29, adaptable parallax barrier 2926 may be replaced with an adaptable lenticular lens.

FIG. 33 shows a perspective view of an adaptable lenticular lens 3300 in accordance with an embodiment. As shown in FIG. 33, adaptable lenticular lens 3300 includes a sub-lens array 3302. Sub-lens array 3302 includes a plurality of sub-lenses 3304 arranged in a two-dimensional array (e.g., arranged side-by-side in a row). Each sub-lens 3304 is shown in FIG. 33 as generally cylindrical in shape and having a substantially semi-circular cross-section, but in other embodiments may have other shapes. In FIG. 33, sub-lens array 3302 is shown to include eight sub-lenses for illustrative purposes and is not intended to be limiting. For instance, sub-lens array 3302 may include any number (e.g., hundreds, thousands, etc.) of sub-lenses 3304. FIG. 34 shows a side view of adaptable lenticular lens 3300. In FIG. 34, light may be passed through adaptable lenticular lens 3300 in the direction of dotted arrow 3402 to be diverted. Adaptable lenticular lens 3300 is adaptable in that it can be modified to manipulate light in different ways in order to accommodate different viewing configurations. For example, in one embodiment, adaptable lenticular lens is made from an elastic material and can be stretched or shrunk in one or more directions in response to generated drive signals.

Further description regarding the use of an adaptable lenticular lens to deliver three-dimensional views is provided in aforementioned, incorporated U.S. patent application Ser. No. 12/774,307, filed on May 5, 2010, and entitled "Display with Elastic Light Manipulator."

C. Example Display Systems Using Multiple Light Manipulators

Display systems in accordance with further embodiments may include multiple layers of light manipulators. Such display systems may enable multiple three-dimensional images to be displayed in a viewing space. The multiple light manipulating layers may enable spatial separation of the images. For instance, in accordance with one embodiment, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In fact, a display device that includes multiple light manipulator layers may be configured to display any number of spatially separated three-dimensional images as desired for a particular application (e.g., according to a number and spacing of viewers in the viewing space, etc.).

FIG. 35 is a block diagram of a display system 3500 that includes multiple light manipulator layers in accordance with an embodiment. As shown in FIG. 35, display system 3500 includes driver circuitry 3502 and a screen 3504, wherein screen 3504 includes a pixel array 3522, a first light manipulator 3524 and a second light manipulator 3526. As shown in FIG. 35, first light manipulator 3524 includes first light manipulator elements 3542 and second light manipulator 3526 includes second light manipulator elements 3544. Furthermore, as shown in FIG. 35, driver circuitry 3502 includes pixel array driver circuitry 3512 and light manipulator driver circuitry 3514.

Light 3532 is received at first light manipulator 3524 from pixel array 3522. Pixel array driver circuitry 3512 may generate drive signals 3552 based on a control signal 3508 received from control circuitry (not shown in FIG. 35) and drive signals 3552 may be received by pixel array 3522 to generate light 3532. Each pixel of pixel array 3522 may generate light that is received at first light manipulator 3524. In an embodiment, pixel array driver circuitry 3512 may generate drive signals 3552 to cause pixel array 3522 to emit light 3532 containing a plurality of images corresponding to the sets of pixels.

First light manipulator 3524 may be configured to manipulate light 3532 received from pixel array 3522. As shown in FIG. 35, first light manipulator 3524 includes light manipulator elements 3542 configured to perform manipulating (e.g., filtering, diverting, etc.) of light 3532 to generate manipulated light 3534. Light manipulator elements 3542 may optionally be configurable to adjust the manipulating performed by first light manipulator 3524. First light manipulator 3524 may perform filtering in a similar manner as an adaptable parallax barrier described above or in other manner. In another embodiment, first light manipulator 3524 may include a lenticular lens that diverts light 3532 to perform light manipulating, generating manipulated light 3534. In an embodiment, light manipulator driver circuitry 3514 may generate drive signals 3554 based on control signal 3508 received by driver circuitry 3502 to cause light manipulator elements 3542 to manipulate light 3532 as desired.

Manipulated light 3534 is received by second light manipulator 3526 to generate manipulated light 3536 that includes a plurality of three-dimensional images $3562_1$-$3562_n$ formed in a viewing space 3506. As shown in FIG. 35, second light manipulator 3526 includes light manipulator elements 3544 configured to perform manipulating of manipulated light 3534 to generate manipulated light 3536. Light manipulator elements 3544 may optionally be configurable to adjust the manipulating performed by second light manipulator 3526. In an embodiment, light manipulator driver circuitry 3514 may generate drive signals 3556 based on control signal 3508 to cause light manipulator elements 3544 to manipulate manipulated light 3534 to generate manipulated light 3536 including three-dimensional images $3562_1$-$3562_n$ as desired. In embodiments, second light manipulator 3526 may include an adaptable parallax barrier or lenticular lens configured to manipulate manipulated light 3534 to generate manipulated light 3536.

As such, screen 3504 of display system 3500 supports multiple viewers with media content in the form of three-dimensional images or views. Screen 3504 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 3524 and 3526 each cause three-dimensional media content to be presented to a corresponding viewer via a corresponding area of screen 3504, with each viewer being enabled to view corresponding media content without viewing media content directed to other viewers. Furthermore, the areas of screen 3504 that provide the various three-dimensional views of media content overlap each other at least in part. In the embodiment of FIG. 35, the areas may be the same area. As such, multiple three-dimensional views that are each viewable by a corresponding viewer may be delivered by a single screen. Embodiments of display system 3500 may also be configured to generate two-dimensional views, as well as any combination of one or more two-dimensional views simultaneously with one or more three-dimensional views.

FIG. 36 shows a block diagram of a display system 3600, which is a further example of a display system that includes multiple light manipulator layers. Like display system 3500 of FIG. 35, display system 3600 is configured to display multiple three-dimensional images $3662_1$-$3662_n$ in a viewing space 3606 in a spatially separated manner. As shown in FIG. 36, display system 3600 includes driver circuitry 3602 and a screen 3604, wherein screen 3604 includes a light generator 3622, a first light manipulator 3624, a second light manipulator 3626 and a pixel array 3628. As shown in FIG. 36, light generator 3622 optionally includes a backlight array 3642, first light manipulator 3624 includes first light manipulator elements 3644, and second light manipulator 3626 includes second light manipulator elements 3646. Furthermore, as shown in FIG. 36, driver circuitry 3602 receives control signals 3608 and includes light generator driver circuitry 3612, light manipulator driver circuitry 3614, and pixel array driver circuitry 3616. Light generator driver circuitry 3612, light manipulator driver circuitry 3614, and pixel array driver circuitry 3616 may generate drive signals to perform their respective functions based on control signals 3608. As shown in FIG. 36, first and second light manipulators 3624 and 3626 are positioned between light generator 3622 and pixel array 3628. In another embodiment, pixel array 3628 may instead be located between first and second light manipulators 3624 and 3626.

D. Example Display System Implementation with Control Circuitry

FIG. 37 is a block diagram of an example implementation of a display system 3700 that includes control circuitry 3702, driver circuitry 3704 and a screen assembly 3706.

As shown in FIG. 37, control circuitry 3702 includes a processing unit 3714, which may comprise one or more general-purpose or special-purpose processors or one or more processing cores. Processing unit 3714 is connected to a communication infrastructure 3712, such as a communication bus. Control circuitry 3702 may also include a primary or main memory (not shown in FIG. 37), such as random access memory (RAM), that is connected to communication infrastructure 3712. The main memory may have control logic stored thereon for execution by processing unit 3714 as well as data stored thereon that may be input to or output by processing unit 3714 during execution of such control logic.

Control circuitry 3702 may also include one or more secondary storage devices (not shown in FIG. 37) that are connected to communication infrastructure 3712, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 3714 as well as data that may be input to or output by processing unit 3714 during execution of such control logic.

Control circuitry 3702 further includes a user input interface 3718, a reference information generation circuitry interface (I/F) 3716, and a media interface 3720. User input interface 3718 is intended to generally represent any type of interface that may be used to receive user input, including but not limited to a remote control device, a traditional computer input device such as a keyboard or mouse, a touch screen, a gamepad or other type of gaming console input device, or one or more sensors including but not limited to video cameras, microphones and motion sensors.

Reference information generation circuitry interface 3716 is an interface that is suitable for connection to reference information generation circuitry 3708 and that allows control circuitry 3702 to communicate therewith. As discussed extensively above, reference information generation circuitry 3708 comprises circuitry that is configured to generate information about one or more aspects of one or more viewing references associated with one or more viewers of display system 3700.

Media interface 3720 is intended to represent any type of interface that is capable of receiving media content such as video content or image content. In certain implementations, media interface 3720 may comprise an interface for receiving media content from a remote source such as a broadcast media server, an on-demand media server, or the like. In such implementations, media interface 3720 may comprise, for example and without limitation, a wired or wireless internet or intranet connection, a satellite interface, a fiber interface, a coaxial cable interface, or a fiber-coaxial cable interface. Media interface 3720 may also comprise an interface for receiving media content from a local source such as a DVD or Blu-Ray® disc player, a personal computer, a personal media player, smart phone, or the like. Media interface 3720 may be capable of retrieving video content from multiple sources.

Control circuitry 3702 further includes a communication interface 3722. Communication interface 3722 enables control circuitry 3702 to send control signals via a communication medium 3752 to another communication interface 3730 within driver circuitry 3704, thereby enabling control circuitry 3702 to control the operation of driver circuitry 3704. Communication medium 3752 may comprise any kind of wired or wireless communication medium suitable for transmitting such control signals.

As shown in FIG. 37, driver circuitry 3704 includes the aforementioned communication interface 3730 as well as pixel array driver circuitry 3732 and adaptable light manipulator driver circuitry 3734. Driver circuitry 3704 also optionally includes light generator driver circuitry 3736. Each of these driver circuitry elements is configured to receive control signals from control circuitry 3702 (via the link between communication interface 3722 and communication interface 3730) and, responsive thereto, to send selected drive signals to a corresponding hardware element within screen assembly 3706, the drive signals causing the corresponding hardware element to operate in a particular manner. In particular, pixel array driver circuitry 3732 is configured to send selected drive signals to a pixel array 3742 within screen assembly 3706, adaptable light manipulator driver circuitry 3734 is configured to send selected drive signals to an adaptable light manipulator 3744 within screen assembly 3706, and optional light generator driver circuitry 3736 is configured to send selected drive signals to an optional light generator 3746 within screen assembly 3706.

In one example mode of operation, processing unit 3714 operates pursuant to control logic to receive video content via media interface 3720 and to generate control signals necessary to cause driver circuitry 3704 to render such video content to screen assembly 3706 in accordance with a selected viewing configuration. The viewing configuration may be selected based on, for example, reference information generated by and received from reference information generation circuitry 3708. The control logic that is executed by processing unit 3714 may be retrieved, for example, from a primary memory or a secondary storage device connected to processing unit 3714 via communication infrastructure 3712 as discussed above. The control logic may also be retrieved from some other local or remote source. Where the control logic is stored on a computer readable medium, that computer readable medium may be referred to herein as a computer program product.

Among other features, driver circuitry 3704 may be controlled in a manner described in aforementioned, incorporated U.S. patent application Ser. No. 12/982,031, filed on even date herewith and entitled "Coordinated Driving of Adaptable Light Manipulator, Backlighting and Pixel Array in Support of Adaptable 2D and 3D Displays" (the entirety of which is incorporated by reference herein) to send coordinated drive signals necessary for displaying two-dimensional content and three-dimensional content via screen assembly 3706. In certain operating modes, such content may be simultaneously displayed via different display regions of screen assembly 3706. The manner in which pixel array 3742, adaptable light manipulator 3744 (e.g., an adaptable parallax barrier), and light generator 3746 may be manipulated in a coordinated fashion to perform this function was described in the patent application referenced immediately above. Note that in accordance with certain implementations (e.g., implementations in which pixel array comprises a OLED/PLED pixel array), screen assembly 3706 need not include light generator 3746.

In one embodiment, at least part of the function of generating control signals necessary to cause pixel array 3742, adaptable light manipulator 3744 and light generator 3746 to render media content in accordance with a selected viewing configuration is performed by drive signal processing circuitry 3738 which is integrated within driver circuitry 3704. Such circuitry may operate, for example, in conjunction with and/or under the control of processing unit 3714 to generate the necessary control signals.

In certain implementations, control circuitry 3702, driver circuitry 3704 and screen elements 3706 are all included within a single housing. For example and without limitation, all these elements may exist within a television, a laptop computer, a tablet computer, or a telephone. In accordance with such an implementation, link 3750 formed between communication interfaces 3722 and 3730 may be replaced by a direction connection between driver circuitry 3704 and communication infrastructure 3712. In an alternate implementation, control circuitry 3702 is disposed within a first housing, such as set top box or personal computer, and driver circuitry 3704 and screen assembly 3706 are disposed within a second housing, such as a television or computer monitor. The set top box may be any type of set top box including but not limited to fiber, Internet, cable, satellite, or terrestrial digital.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. Processing circuitry that at least assists in the delivery of a three-dimensional presentation for a first viewer via a screen assembly, the first viewer having a first viewing reference, the processing circuitry comprising:
    first circuitry that at least assists in producing first reference data corresponding to at least one aspect of the first viewing reference of the first viewer;
    second circuitry connected to the first circuitry that delivers a first control signal, the first control signal relating at least in part to the first reference data; and
    third circuitry that at least assists in producing second reference data corresponding to at least one aspect of a second viewing reference of a second viewer;
    the second circuitry being further connected to the third circuitry and configured to deliver the first control signal and a second control signal to cause the modification of the adaptable display characteristic of the screen assembly, the second control signal relating at least in part to the second reference data.

2. The processing circuitry of claim 1, wherein the first circuitry comprises:
    a transmitter operable to transmit a location tracking signal, and
    at least two spatially-dispersed receivers operable to receive the location tracking signal, and
    triangulation circuitry operable to determine a location of the first viewer relative to the screen assembly based on characteristics of the received versions of the location tracking signal, the determined location of the first viewer comprising at least a portion of the first reference data.

3. The processing circuitry of claim 1, wherein the first circuitry comprises:
   at least two spatially-dispersed transmitters operable to transmit corresponding location tracking signals; and
   at least one receiver operable to receive the location tracking signals; and
   triangulation circuitry operable to determine a location of the first viewer relative to the screen assembly based on signals characteristics of the received location tracking signals, the determined location of the first viewer comprising at least a portion of the first reference data.

4. The processing circuitry of claim 1, wherein the first circuitry comprises:
   at least one magnetic field source; and
   at least one magnetic field sensor;
   wherein the magnetic field source(s) and magnetic field sensor(s) are operable in conjunction to generate information for tracking the location of the first viewer relative to the screen assembly, the tracked location of the first viewer comprising at least a portion of the first reference data.

5. The processing circuitry of claim 1, wherein the first circuitry comprises:
   at least one infrared (IR) transmitter; and
   at least one IR receiver,
   wherein the IR transmitter(s) and the IR receiver(s) are operable in conjunction to generate information for tracking the location of the first viewer relative to the screen assembly, the tracked location of the first viewer comprising at least a portion of the first reference data.

6. The processing circuitry of claim 1, wherein the first circuitry comprises at least one camera operable to capture images used for producing the first reference data.

7. The processing circuitry of claim 1, wherein the first circuitry comprises at least one sensor for determining a head orientation of the first viewer, the determined head orientation of the first viewer comprising at least a portion of the first reference data.

8. The processing circuitry of claim 1, wherein the first circuitry comprises at least one sensor for tracking an eye movement of the first viewer, the tracked eye movement of the first viewer comprising at least a portion of the first reference data.

9. The processing circuitry of claim 1, wherein the first circuitry comprises viewer-located circuitry and includes one or more speakers operable to deliver audio content associated with video content displayed on the screen assembly and viewable by the first viewer.

10. The processing circuitry of claim 1, wherein the first circuitry comprises viewer-located circuitry and includes a microphone operable to receive a voice command from the first viewer;
    wherein the second circuitry further delivers a second control signal to cause a modification of an adaptable display characteristic of the screen assembly, the second control signal relating at least in part to the voice command.

11. The processing circuitry of claim 1, wherein the first circuitry comprises viewer-located circuitry and includes lenses that controlling how video content that is rendered to the screen assembly is perceived by the first viewer.

* * * * *